US012776655B2

(12) United States Patent
Kobayashi et al.

(10) Patent No.: US 12,776,655 B2
(45) Date of Patent: Oct. 27, 2026

(54) CONTROL CIRCUIT AND ELECTRONIC DEVICE

(71) Applicant: Semiconductor Energy Laboratory Co., Ltd., Kanagawa-ken (JP)

(72) Inventors: Hidetomo Kobayashi, Isehara (JP); Yuto Yakubo, Atsugi (JP); Takayuki Ikeda, Atsugi (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 740 days.

(21) Appl. No.: 18/026,910

(22) PCT Filed: Sep. 13, 2021

(86) PCT No.: PCT/IB2021/058293

§ 371 (c)(1),
(2) Date: Mar. 17, 2023

(87) PCT Pub. No.: WO2022/064319

PCT Pub. Date: Mar. 31, 2022

(65) Prior Publication Data

US 2023/0336006 A1 Oct. 19, 2023

(30) Foreign Application Priority Data

Sep. 22, 2020 (JP) ................................. 2020-158043
Sep. 25, 2020 (JP) ................................. 2020-161089

(51) Int. Cl.
*H02J 7/52* (2026.01)
*H02J 7/61* (2026.01)
*H02J 7/63* (2026.01)

(52) U.S. Cl.
CPC .................. *H02J 7/52* (2026.01); *H02J 7/61* (2026.01); *H02J 7/63* (2026.01)

(58) Field of Classification Search
CPC ........ H02J 7/52; H02J 7/61; H02J 7/63; H02J 7/00; H02J 7/663; H01M 10/42; H01M 10/44; G01R 19/16542
See application file for complete search history.

(56) References Cited

U.S. PATENT DOCUMENTS 6,320,355 B1 11/2001 Terada
7,495,416 B2 2/2009 Sato et al.
(Continued)

FOREIGN PATENT DOCUMENTS

CN 101825688 A 9/2010
CN 101917035 B 2/2013
(Continued)

OTHER PUBLICATIONS

International Search Report (Application No. PCT/IB2021/058293) Dated Nov. 30, 2021.
(Continued)

*Primary Examiner* — Jared Fureman
(74) *Attorney, Agent, or Firm* — Husch Blackwell LL.P

(57) ABSTRACT

A protection circuit and a control circuit of a secondary battery are provided, for example. A circuit with low power consumption is provided. A circuit with a high degree of integration is provided. The control circuit includes a first resistance circuit, a second resistance circuit, a comparator, and a memory circuit. One terminal of the first resistance circuit is electrically connected to a positive electrode of a secondary battery; the other terminal of the first resistance circuit is electrically connected to a first input terminal of the comparator and one terminal of the second resistance circuit; the memory circuit has a function of retaining first data; the control circuit has a function of generating a first signal and a second signal by using the first data, a function of adjusting the resistance of the first resistance circuit by supplying the first signal to the first resistance circuit, a function of
(Continued)

adjusting the resistance of the second resistance circuit by supplying the second signal to the second resistance circuit, and a function of stopping one of charging and discharging of the secondary battery in accordance with output from the comparator; and the memory circuit includes a capacitor that includes a ferroelectric layer as a dielectric layer.

19 Claims, 26 Drawing Sheets

(56) References Cited

U.S. PATENT DOCUMENTS

| | | | | |
|---|---|---|---|---|
| 7,829,354 | B2 | 11/2010 | Tsukamoto et al. | |
| 8,274,259 | B2 | 9/2012 | Ashida | |
| 8,558,515 | B2 | 10/2013 | Baba et al. | |
| 8,610,482 | B2 | 12/2013 | Kaneyasu | |
| 8,723,527 | B2 | 5/2014 | Kudo et al. | |
| 9,041,358 | B2 | 5/2015 | Kato et al. | |
| 9,404,975 | B2 | 8/2016 | Kudo et al. | |
| 9,425,634 | B2 | 8/2016 | Imamura et al. | |
| 9,774,194 | B2 * | 9/2017 | Fukuchi | H02J 7/50 |
| 10,037,075 | B2 * | 7/2018 | Griffith | G06F 1/3296 |
| 10,202,041 | B2 | 2/2019 | Kudo et al. | |
| 10,741,834 | B2 | 8/2020 | Zhang et al. | |
| 10,903,363 | B2 * | 1/2021 | Yoo | G11C 11/223 |
| 10,937,808 | B2 * | 3/2021 | Lee | H10D 64/517 |
| 11,482,868 | B2 | 10/2022 | Yamashita et al. | |
| 11,815,557 | B2 * | 11/2023 | Gering | G01R 31/392 |
| 11,950,429 | B2 * | 4/2024 | Jeon | H10B 53/00 |
| 12,266,957 | B2 | 4/2025 | Isa et al. | |
| 12,520,498 | B2 * | 1/2026 | Jeon | H10B 53/00 |
| 2002/0110736 | A1 | 8/2002 | Kweon et al. | |
| 2003/0104279 | A1 | 6/2003 | Miyazaki et al. | |
| 2004/0142241 | A1 | 7/2004 | Nagayama | |
| 2006/0263690 | A1 | 11/2006 | Suhara et al. | |
| 2007/0117014 | A1 | 5/2007 | Saito et al. | |
| 2008/0241693 | A1 | 10/2008 | Fukuchi et al. | |
| 2008/0248601 | A1 | 10/2008 | Tsukamoto et al. | |
| 2009/0051329 | A1 | 2/2009 | Ashida | |
| 2009/0087362 | A1 | 4/2009 | Sun et al. | |
| 2009/0104532 | A1 | 4/2009 | Hosoya | |
| 2010/0086854 | A1 | 4/2010 | Kumar et al. | |
| 2010/0244847 | A1 | 9/2010 | Kudo et al. | |
| 2010/0247986 | A1 | 9/2010 | Toyama et al. | |
| 2011/0267726 | A1 | 11/2011 | Ikeuchi et al. | |
| 2012/0299639 | A1 | 11/2012 | Kaneyasu | |
| 2013/0052534 | A1 | 2/2013 | Fujiki et al. | |
| 2013/0257379 | A1 * | 10/2013 | Kato | H02J 7/64 327/564 |
| 2013/0323596 | A1 | 12/2013 | Morita et al. | |
| 2014/0212759 | A1 | 7/2014 | Blangero et al. | |
| 2015/0008364 | A1 | 1/2015 | Endo | |
| 2015/0236530 | A1 | 8/2015 | Kato et al. | |
| 2016/0006032 | A1 | 1/2016 | Paulsen et al. | |
| 2016/0013478 | A1 | 1/2016 | Satow et al. | |
| 2016/0013668 | A1 * | 1/2016 | Fukuchi | H02J 7/50 320/134 |
| 2016/0156032 | A1 | 6/2016 | Lee et al. | |
| 2016/0268601 | A1 | 9/2016 | Paulsen et al. | |
| 2016/0276659 | A1 | 9/2016 | Choi et al. | |
| 2018/0013130 | A1 | 1/2018 | Ochiai et al. | |
| 2018/0145317 | A1 | 5/2018 | Momma et al. | |
| 2018/0145368 | A1 | 5/2018 | Ochiai et al. | |
| 2019/0245199 | A1 | 8/2019 | Zeng et al. | |
| 2020/0091742 | A1 | 3/2020 | Yamashita et al. | |
| 2020/0176770 | A1 | 6/2020 | Takahashi et al. | |
| 2020/0220173 | A1 | 7/2020 | Jo et al. | |
| 2020/0286685 | A1 * | 9/2020 | Lin | H10D 1/68 |
| 2021/0083281 | A1 | 3/2021 | Mikami et al. | |
| 2021/0202508 | A1 * | 7/2021 | Jeon | H10B 53/00 |
| 2021/0313571 | A1 | 10/2021 | Momma et al. | |
| 2022/0131146 | A1 | 4/2022 | Saito et al. | |
| 2022/0359870 | A1 | 11/2022 | Mikami et al. | |
| 2025/0105282 | A1 | 3/2025 | Liu et al. | |

FOREIGN PATENT DOCUMENTS

| | | | | | |
|---|---|---|---|---|---|
| CN | 102163839 | B | | 5/2014 | |
| CN | 105655554 | A | | 6/2016 | |
| CN | 103944242 | B | | 3/2017 | |
| CN | 110896212 | A | | 3/2020 | |
| CN | 113140726 | A | | 7/2021 | |
| EP | 1531535 | A | | 5/2005 | |
| EP | 2 224 257 | A2 | | 9/2010 | |
| EP | 2360806 | A | | 8/2011 | |
| EP | 2757655 | A | | 7/2014 | |
| JP | 2000-203842 | A | | 7/2000 | |
| JP | 2002-216760 | A | | 8/2002 | |
| JP | 3922553 | B2 | * | 5/2007 | |
| JP | 2008-198775 | A | | 8/2008 | |
| JP | 2009-055652 | A | | 3/2009 | |
| JP | 2010-080407 | A | | 4/2010 | |
| JP | 2010-249793 | A | | 11/2010 | |
| JP | 2013-172532 | A | | 9/2013 | |
| JP | 2013-211974 | A | | 10/2013 | |
| JP | 2015-099722 | A | | 5/2015 | |
| JP | 2017-175688 | A | | 9/2017 | |
| JP | 2020-043733 | A | | 3/2020 | |
| JP | 6675243 | B2 | | 4/2020 | |
| KR | 2020-0031024 | A | | 3/2020 | |
| TW | 202011656 | | | 3/2020 | |
| WO | WO-2019235092 | A1 | * | 12/2019 | H10B 51/00 |
| WO | WO-2020/174299 | | | 9/2020 | |

OTHER PUBLICATIONS

Written Opinion (Application No. PCT/IB2021/058293) Dated Nov. 30, 2021.

Zhang.J et al., "Trace doping of multiple elements enables stable battery cycling of LiCoO2 at 4.6 V", Nature Energy, Jun. 17, 2019, vol. 4, pp. 594-603.

Hirooka.M et al., "Improvement of float charge durability for LiCoO2 electrodes under high voltage and storage temperature by suppressing O1-Phase transition", Journal of Power Sources, Jul. 1, 2020, vol. 463, pp. 228127-1-228127-8, Elsevier.

Wang.L et al., "A Novel Bifunctional Self-Stabilized Strategy Enabling 4.6 V LiCoO2 with Excellent Long-Term Cyclability and High-Rate Capability", Adv. Sci. (Advanced Science), Apr. 24, 2019, vol. 6, No. 12, pp. 1900355-1-1900355-11.

Okumura.T et al., "Correlation of lithium ion distribution and X-ray absorption near-edge structure in O3- and O2-lithium cobalt oxides from first-principle calculation", J. Mater. Chem. (Journal of Materials Chemistry), 2012, vol. 22, pp. 17340-17348.

Yano.A et al., "LiCoO2 Degradation Behavior in the High-Voltage Phase Transition Region and Improved Reversibility with Surface Coating", J. Electrochem. Soc. (Journal of the Electrochemical Society), Nov. 12, 2016, vol. 164, No. 1, pp. A6116-A6122.

Wang.Z et al., "EELS analysis of cation valence states and oxygen vacancies in magnetic oxides", Micron, Oct. 1, 2000, vol. 31, No. 5, pp. 571-580, Elsevier.

Chung.K et al., "Structural Studies on the Effects of ZrO2 Coating on LiCoO2 during Cycling Using In Situ X-Ray Diffraction Technique", J. Electrochem. Soc. (Journal of the Electrochemical Society), Sep. 20, 2006, vol. 153, No. 11, pp. A2152-A2157.

Chen.Z et al., "Staging Phase Transitions in LixCoO2", J. Electrochem. Soc. (Journal of the Electrochemical Society), Oct. 29, 2002, vol. 149, No. 12, pp. A1604-A1609.

Ohzuku.T et al., "Solid-State Redox Reactions of LiCoO2 (R-3m) for 4 Volt Secondary Lithium Cells", J. Electrochem. Soc. (Journal of the Electrochemical Society), Nov. 1, 1994, vol. 141, No. 11, pp. 2972-2977.

Zou.M et al., "Synthesis and Electrochemical Performance of High Voltage Cycling LIM0.05Co0.95O2 as Cathode Material for Lithium Rechargeable Cells", Electrochemical and Solid-State Letters, Apr. 26, 2004, vol. 7, No. 7, pp. A176-A179.

Kim.Y et al., "Suppression of Cobalt Dissolution from the LiCoO2 Cathodes with Various Metal-Oxide Coatings", J. Electrochem. Soc. (Journal of the Electrochemical Society), Nov. 5, 2003, vol. 150, No. 12, pp. A1723-A1725.

(56) References Cited

OTHER PUBLICATIONS

Liu.A et al., "Synthesis of Mg and Mn Doped LiCoO2 and Effects on High Voltage Cycling", J. Electrochem. Soc. (Journal of the Electrochemical Society), Jun. 2, 2017, vol. 164, No. 7, pp. A1655-A1664.

Shim.J et al., "Effects of MgO Coating on the Structural and Electrochemical Characteristics of LiCoO2 as Cathode Materials for Lithium Ion Battery", Chem. Mater. (Chemistry of Materials), Mar. 24, 2014, vol. 26, No. 8, pp. 2537-2543.

Wang.Z et al., "Mg doping and zirconium oxyfluoride coating co-modification to enhance the high-voltage performance of LiCoO2 for lithium ion battery", Journal of Alloys and Compounds, Oct. 5, 2014, vol. 621, pp. 212-219.

Shim.J et al., "Synergistic effects of coating and doping for lithium ion battery cathode materials: synthesis and characterization of lithium titanate-coated LiCoO2 with Mg doping", Electrochimica Acta, Nov. 11, 2015, vol. 186, pp. 201-208, Elsevier.

Taguchi.N et al., "Characterization of MgO-coated-LiCoO2 particles by analytical transmission electron microscopy", Journal of Power Sources, Aug. 10, 2016, vol. 328, pp. 161-166, Elsevier.

Amatucci.G et al., "CoO2, The End Member of the LixCoO2 Solid Solution", J. Electrochem. Soc. (Journal of the Electrochemical Society), Mar. 1, 1996, vol. 143, No. 3, pp. 1114-1123.

Qian.J et al., "Electrochemical surface passivation of LiCoO2 particles at ultrahigh voltage and its applications in lithium-based batteries", Nature Communications, Nov. 21, 2018, vol. 9, pp. 4918-1-4918-11.

Yin.R et al., "In Situ XRD Investigation and Thermal Properties of Mg Doped LiCoO2 for Lithium Ion Batteries", J. Electrochem. Soc. (Journal of the Electrochemical Society), Jan. 3, 2012, vol. 159, No. 3, pp. A253-A258.

Shao-horn. Y. et al., "Probing Lithium and Vacancy Ordering in O3 Layered Lix CoO2 (x=0.5) : An Electron Diffraction Study", J. Electrochem. Soc. (Journal of the Electrochemical Society), Feb. 6, 2003, vol. 150, No. 3, pp. A366-A373.

Kalluri.S et al., "Surface Engineering Strategies of Layered LiCoO2 Cathode Material to Realize High-Energy and High-Voltage Li-Ion Cells", Advanced Energy Materials, Oct. 12, 2016, vol. 7, No. 1, pp. 1601507-1-1601507-21.

Zhang.S et al., "Surface engineering of LiCoO2 by a multifunctional nanoshell for stable 4.6V electrochemical performance", Energy Storage Materials, Feb. 21, 2023, vol. 57, pp. 289-298.

Yano.A et al., "Capability and Reversibility of LiCoO2 during Charge/Discharge with O3/H1-3 Layered Structure Change", J. Electrochem. Soc. (Journal of the Electrochemical Society), May 11, 2021, vol. 168, No. 5, pp. 050517-1-050517-11.

* cited by examiner

CONTROL CIRCUIT AND ELECTRONIC DEVICE

This application is a 371 of international application PCT/IB2021/058293 filed on Sep. 13, 2021 which is incorporated herein by reference.

TECHNICAL FIELD

One embodiment of the present invention relates to a control circuit and the like. One embodiment of the present invention specifically relates to, for example, a control circuit of a secondary battery. One embodiment of the present invention relates to a protection circuit of a secondary battery.

Note that one embodiment of the present invention is not limited to the above technical field. Examples of the technical field of one embodiment of the present invention disclosed in this specification and the like include a semiconductor device, an image capturing device, a display device, a light-emitting device, a power storage device, a memory device, a display system, an electronic device, a lighting device, an input device, an input/output device, a driving method thereof, and a manufacturing method thereof. Note that a semiconductor device generally means a device that utilizes semiconductor characteristics, and a control circuit of a secondary battery is a semiconductor device.

BACKGROUND ART

Secondary batteries (also referred to as power storage devices) have been utilized in a wide range of areas from small electronic devices to automobiles.

The secondary battery is provided with a control circuit for charging and discharging management to prevent abnormality in charging and discharging, such as overdischarging, overcharging, an overcurrent, or a short circuit. The control circuit obtains data such as a voltage and a current for charging and discharging management of the secondary battery. The control circuit controls charging and discharging on the basis of the observed data.

Patent Document 1 discloses a protection monitoring circuit functioning as a control circuit of a secondary battery. Patent Document 1 discloses the protection monitoring circuit that detects abnormality in charging and discharging by comparing, using a plurality of comparators provided inside, a reference voltage and the voltage of a terminal to which a secondary battery is connected.

Patent Document 2 discloses a control device performing trickle charging for compensation for a decrease in capacity that is due to self-discharging of the secondary battery. Patent Document 2 discloses the control device that sets the upper limit voltage and the lower limit voltage, and performs control for repeating a charged state and a cutoff state within the set voltage range.

Patent Document 3 discloses the structure in which a reference voltage is adjusted by adjusting a resistance value in a charging circuit of a battery in order to accurately control a charging current of the battery.

A fuse trimming method is known as a method for adjusting a resistance value. Patent Document 4 discloses a semiconductor integrated circuit provided with a fuse element capable of adjustment by laser trimming.

REFERENCE

Patent Document

[Patent Document 1] United States Patent Application Publication No. 2011/267726
[Patent Document 2] Japanese Published Patent Application No. 2017-175688
[Patent Document 3] Japanese Published Patent Application No. 2009-55652
[Patent Document 4] Japanese Published Patent Application No. 2008-198775

SUMMARY OF THE INVENTION

Problems to be Solved by the Invention

In the case where resistance is adjusted by a fuse trimming method, a fuse element for adjustment by laser trimming is placed, which sometimes increases the circuit area. In the case where a high current flows to the fuse element, the power consumption of a circuit sometimes increases.

An object of one embodiment of the present invention is to provide, for example, a novel protection circuit of a secondary battery. Another object of one embodiment of the present invention is to provide, for example, a novel control circuit of a secondary battery. Another object of one embodiment of the present invention is to provide, for example, a control circuit or a protection circuit of a secondary battery that has a novel structure and can have reduced power consumption. Another object of one embodiment of the present invention is to provide, for example, a control circuit or a protection circuit of a secondary battery that has a novel structure and can be integrated.

Note that the objects of embodiments of the present invention are not limited to the objects listed above. The objects listed above do not preclude the existence of other objects. Note that the other objects are objects that are not described in this section and will be described below. The objects that are not described in this section are derived from the description of the specification, the drawings, and the like and can be extracted as appropriate from the description by those skilled in the art. Note that one embodiment of the present invention is to solve at least one of the objects listed above and/or the other objects.

Means for Solving the Problems

One embodiment of the present invention is a control circuit which includes a first resistance circuit, a second resistance circuit, a comparator, and a memory circuit and in which the comparator includes a first input terminal, a second input terminal, and a first output terminal outputting a comparison result of the first input terminal and the second input terminal; one terminal of the first resistance circuit is electrically connected to a positive electrode of a secondary battery; the other terminal of the first resistance circuit is electrically connected to the first input terminal and one terminal of the second resistance circuit; the memory circuit has a function of retaining first data; the control circuit has a function of generating a first signal and a second signal by using the first data, a function of adjusting resistance of the first resistance circuit by supplying the first signal to the first resistance circuit, a function of adjusting resistance of the second resistance circuit by supplying the second signal to the second resistance circuit, and a function of stopping one of charging and discharging of the secondary battery in accordance with output from the first output terminal; and the memory circuit includes a capacitor that includes a ferroelectric layer.

In the above structure, the first resistance circuit preferably includes a plurality of pairs of one resistor and one switch; the one switch of the pair of the one resistor and the one switch preferably has a function of changing a current flowing in the one resistor; and the control circuit preferably has a function of controlling, by using the first signal, operation of the switch of each of the plurality of pairs.

In the above structure, the second input terminal is preferably supplied with a signal corresponding to the upper limit of a charging voltage or a signal corresponding to the lower limit of a discharging voltage.

The above structure preferably further includes a third resistance circuit and a second comparator; the second comparator preferably includes a third input terminal, a fourth input terminal, and a second output terminal outputting a comparison result of the third input terminal and the fourth input terminal; the other terminal of the second resistance circuit is preferably electrically connected to the third input terminal and one terminal of the third resistance circuit; the other terminal of the third resistance circuit is preferably electrically connected to a negative electrode of the secondary battery; and the control circuit preferably has a function of generating a third signal by using the first data, a function of adjusting resistance of the third resistance circuit by supplying the third signal to the third resistance circuit, and a function of stopping the other of the charging and the discharging of the secondary battery in accordance with output from the second output terminal.

In the above structure, it is preferable that one of a signal corresponding to the upper limit of a charging voltage and a signal corresponding to the lower limit of a discharging voltage be supplied to the second input terminal and the other be supplied to the fourth input terminal.

Another embodiment of the present invention is a control circuit which includes a first terminal electrically connected to a positive electrode of a secondary battery, a second terminal electrically connected to a negative electrode of the secondary battery, a third terminal electrically connected to a gate of a power transistor controlling electrical connection between the secondary battery and a charger or a load, a detection portion electrically connected to the first terminal and the second terminal, a control portion electrically connected to the detection portion, and a memory circuit electrically connected to the control portion and in which the memory circuit includes a memory cell including a ferroelectric layer between a pair of electrodes, a transistor electrically connected to the memory cell, and a decoder to which a signal from the memory cell is output; the detection portion includes a resistance circuit whose resistance has been adjusted in accordance with data stored in the memory circuit; and the control portion has a function of determining that the secondary battery is overdischarged in accordance with a result of comparing a reference potential input from the detection portion and the potential of the first terminal or the potential of the second terminal, and a function of outputting a signal with which the power transistor is brought into an off state to the third terminal when the secondary battery is determined to be overdischarged.

Another embodiment of the present invention is a control circuit which includes a first terminal electrically connected to a positive electrode of a secondary battery, a second terminal electrically connected to a negative electrode of the secondary battery, a third terminal electrically connected to a gate of a power transistor controlling electrical connection between the secondary battery and a charger or a load, a detection portion electrically connected to the first terminal and the second terminal, a control portion electrically connected to the detection portion, and a memory circuit electrically connected to the control portion and in which the memory circuit includes a memory cell including a ferroelectric layer between a pair of electrodes, a transistor electrically connected to the memory cell, and a decoder to which a signal from the memory cell is output; the detection portion includes a resistance circuit whose resistance has been adjusted in accordance with data stored in the memory circuit; and the control portion has a function of determining that the secondary battery is overcharged in accordance with a result of comparing a reference potential input from the detection portion and the potential of the first terminal or the potential of the second terminal, and a function of outputting a signal with which the power transistor is brought into an off state to the third terminal when the secondary battery is determined to be overcharged.

In one embodiment of the present invention, data is written to the memory circuit by supply of a signal from outside of the control circuit, and the control circuit includes a fourth terminal to which the signal from the outside is input.

In one embodiment of the present invention, a ferroelectric material of the ferroelectric layer of the memory circuit includes an oxide containing hafnium and zirconium.

In one embodiment of the present invention, the ferroelectric material of the ferroelectric layer has an orthorhombic crystal structure.

In one embodiment of the present invention, the pair of electrodes of the memory circuit include titanium nitride.

In one embodiment of the present invention, the transistor is a Si transistor.

One embodiment of the present invention is an electronic device that includes a secondary battery and any of the above control circuits.

Effect of the Invention

According to one embodiment of the present invention, for example, a novel protection circuit of a secondary battery can be provided. According to one embodiment of the present invention, for example, a novel control circuit of a secondary battery can be provided. According to one embodiment of the present invention, for example, a control circuit of a secondary battery or a protection circuit of a secondary battery that has a novel structure and can have reduced power consumption can be provided. According to one embodiment of the present invention, for example, a control circuit of a secondary battery or a protection circuit of a secondary battery that has a novel structure and can be integrated can be provided.

Note that the effects of one embodiment of the present invention are not limited to the effects listed above. The effects listed above do not preclude the existence of other effects. Note that the other effects are effects that are not described in this section and will be described below. The effects that are not described in this section are derived from the description of the specification, the drawings, and the like and can be extracted from the description by those skilled in the art. Note that one embodiment of the present invention has at least one of the effects listed above and/or the other effects. Accordingly, depending on the case, one embodiment of the present invention does not have the effects listed above in some cases.

MODE FOR CARRYING OUT THE INVENTION

Figure 1:
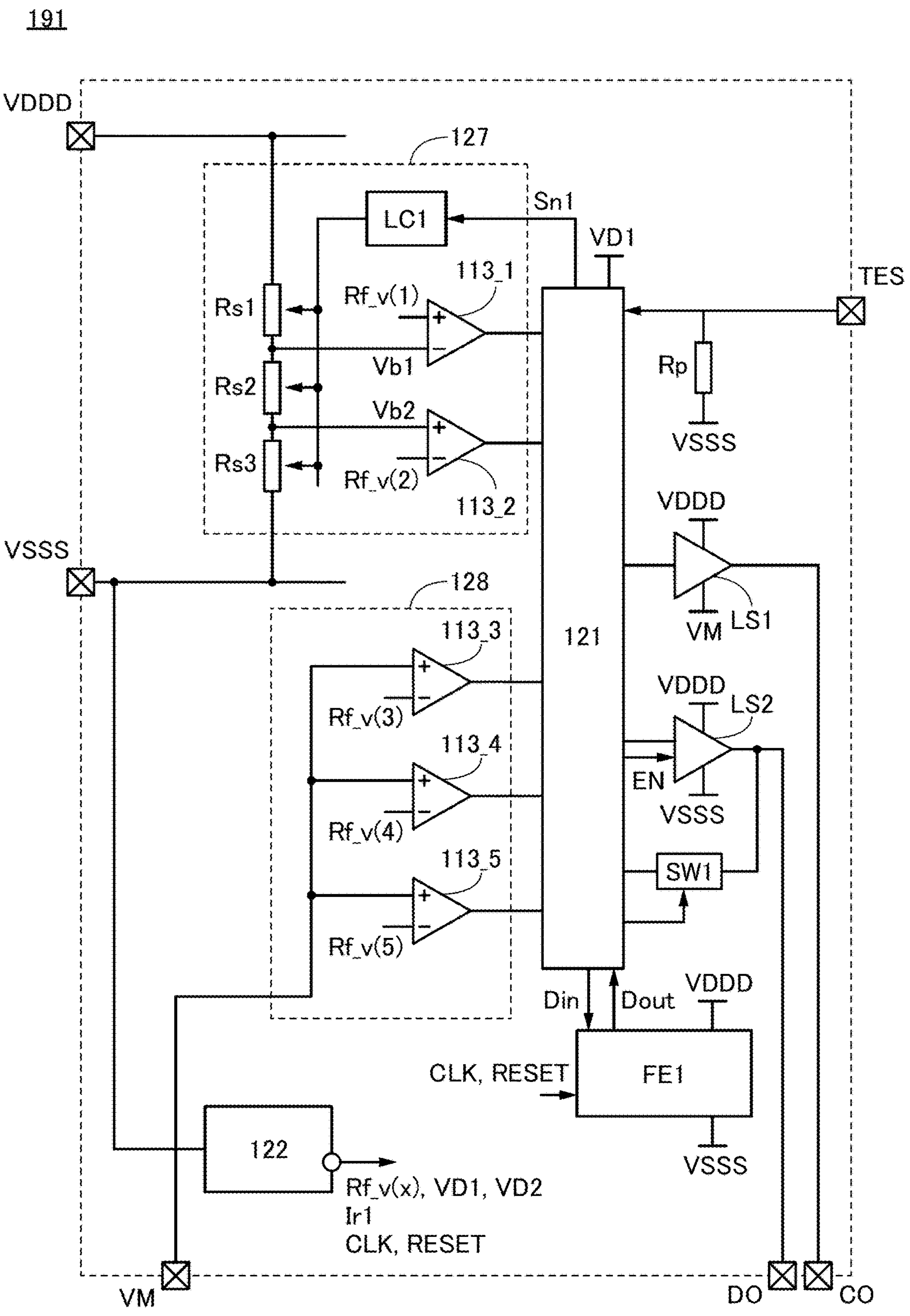
FIG. 1 is a diagram showing a structure example of a control circuit.

Embodiments will be described below with reference to the drawings. Note that the embodiments can be implemented with many different modes, and it is readily understood by those skilled in the art that modes and details thereof can be changed in various ways without departing from the spirit and scope thereof. Thus, the present invention should not be construed as being limited to the following description of the embodiments.

In addition, ordinal numbers such as "first", "second", and "third" in this specification and the like are used to avoid confusion among components. Thus, the ordinal numbers do not limit the number of components. Furthermore, the ordinal numbers do not limit the order of components. For example, a "first" component in one embodiment in this specification and the like can be referred to as a "second" component in other embodiments, or the scope of claims. For another example, a "first" component in one embodiment in this specification and the like can be omitted in other embodiments, or the scope of claims.

Note that in the drawings, the same elements, elements having similar functions, elements formed of the same material, elements formed at the same time, or the like are sometimes denoted by the same reference numerals, and repeated description thereof is omitted in some cases.

In this specification and the like, a metal oxide is an oxide of a metal in a broad sense. Metal oxides are classified into an oxide insulator, an oxide conductor (including a transparent oxide conductor), an oxide semiconductor (also simply referred to as an OS), and the like. For example, in the case where a metal oxide is used in an active layer of a transistor, the metal oxide is referred to as an oxide semiconductor in some cases. That is, when a metal oxide can form a channel formation region of a transistor that has at least one of an amplifying function, a rectifying function, and a switching function, the metal oxide can be referred to as a metal oxide semiconductor. In the case where an OS FET or an OS transistor is mentioned, it can also be referred to as a transistor including a metal oxide or an oxide semiconductor.

Embodiment 1

In this embodiment, a control circuit of one embodiment of the present invention and a power storage system that includes the control circuit of one embodiment of the present invention are described.

FIG. 1 illustrates a control circuit 191 of one embodiment of the present invention. The control circuit 191 includes a control portion 121, a voltage generation portion 122, a detection portion 127, a detection portion 128, a memory circuit FE1, a level shifter LS1, a level shifter LS2, and the like.

The control circuit 191 includes a terminal VDDD, a terminal VSSS, a terminal CO, a terminal DO, a terminal VM, and a terminal TES. Connecting the terminal VDDD and the terminal VSSS respectively to a positive electrode of a secondary battery and a negative electrode of the secondary battery allows the control circuit 191 to function as a protection circuit of the secondary battery, in which case the signals corresponding to the state of the secondary battery are output from the terminal CO and the terminal DO. The terminal TES can be used as a terminal for inputting signals from outside the control circuit 191 to the control portion 121.

The detection portion 127 has a function of detecting overcharging and overdischarging of the secondary battery. The detection portion 127 includes a comparator 113_1, a comparator 113_2, a resistance circuit Rs1, a resistance circuit Rs2, a resistance circuit Rs3, and a logic circuit LC1. The resistance circuits Rs1, Rs2, and Rs3 are electrically connected to each other in series and are connected in this order between the terminal VDDD and the terminal VSSS.

To one input terminal of the comparator 113_1 is input the potential obtained by resistance division of the potential between the terminal VDDD and the terminal VSSS, and to the other input terminal of the comparator 113_1 is input a reference potential Rf_v(1). In the example shown in FIG. 1, the reference potential Rf_v(1) is input to the non-inverting input terminal of the comparator 113_1, and a potential Vb1 that is the potential between the resistance circuit Rs1 and the resistance circuit Rs2 is input to the inverting input terminal of the comparator 113_1.

The comparator of one embodiment of the present invention has a function of comparing the reference potential supplied to the one input terminal and the potential supplied to the other and outputting a comparison result to the control portion.

In the control circuit 191 functioning as a protection circuit of a secondary battery, when the potential Vb1 exceeds the reference potential Rf_v(1), the secondary battery is determined to be in an overcharged state and a signal for blocking charging is output from the terminal CO via the control portion 121. Alternatively, a signal for changing charging conditions may be output.

To one input terminal of the comparator 113_2 is input the potential obtained by resistance division of the potential between the terminal VDDD and the terminal VSSS, and to the other input terminal of the comparator 113_2 is input a reference potential Rf_v(2). In the example shown in FIG. 1, a potential Vb2 that is the potential between the resistance circuit Rs2 and the resistance circuit Rs3 is input to the non-inverting input terminal of the comparator 113_2, and the reference potential Rf_v(2) is input to the inverting input terminal of the comparator 113_2.

In the control circuit 191 functioning as a protection circuit of a secondary battery, when the potential Vb2 falls below the reference potential Rf_v(2), the secondary battery is determined to be in an overdischarged state and a signal for blocking discharging is output from the terminal DO via the control portion 121. Alternatively, a signal for changing discharging conditions may be output.

Here, a resistance value sometimes varies between a plurality of resistance circuits used for resistance division. For example, in the case where the resistance circuits each include a resistor formed using a thin film, the resistance values sometimes vary owing to a variation in the thickness, film quality, or the like. The variation in the resistance value between the resistors causes variations in the potential Vb1 and the potential Vb2.

In some cases, the characteristics of the comparator vary owing to a variation in the characteristics of a semiconductor element included in the comparator. The comparator sometimes includes a semiconductor element such as a transistor or a capacitor, for example. The variation in the characteristics of the comparator sometimes causes a deviation between the signal output from the comparator and the relationship between the potentials supplied to the two input terminals of the comparator.

The accuracy of the control circuit of one embodiment of the present invention can be increased by, after the fabrication process of the control circuit, adjusting the resistance value of the resistance circuit used for resistance division such that the influence of the variation in the resistance value of the resistance circuit and the variation in the characteristics of the comparator is compensated for.

In the control circuit of one embodiment of the present invention, the voltage detection accuracy of the detection portion 127 and the like can be increased by adjusting the resistance value of the resistance circuit. The resistance value can be adjusted by supplying an electrical signal to the detection portion. In the control circuit of one embodiment of the present invention, the resistance value adjusted in the detection portion can be stored even when power supply to the control circuit is stopped.

Adjustment of the resistance value of the resistance circuit will be described later.

The detection portion 128 includes a comparator 113_3, a comparator 113_4, and a comparator 113_5. In the structure example shown in FIG. 1, the detection portion 128 is electrically connected to the terminal VM. A potential corresponding to a current of the secondary battery is input to the one input terminal of each comparator, and a reference potential is input to the other input terminal of each comparator, so that the detection portion 128 can detect a charging overcurrent, a discharging overcurrent, and a short circuit current in the secondary battery. For example, a reference potential Rf_v(3) corresponding to a charging overcurrent is input to the comparator 113_3, a reference potential Rf_v(4) corresponding to a discharging overcurrent is input to the comparator 113_4, and a reference potential Rf_v(5) corresponding to a short circuit current is input to the comparator 113_5.

The voltage generation portion 122 has a function of generating a reference potential Rf_v(x) (x=1, 2, 3, 4, or 5), a potential VD1, a potential VD2, a current Ir1, a clock signal CLK, a reset signal RESET, and the like. The potential, current, and signal generated in the voltage generation portion 122 are supplied to the circuits and elements included in the control circuit 191. Details of the voltage generation portion 122 will be described with reference to FIG. 2A.

The control portion 121 has a function of supplying a signal to the level shifter LS1 and the level shifter LS2 with the use of signals supplied from the detection portion 127 and the detection portion 128. The level shifter LS1 has a function of converting the signal supplied from the control portion 121 and supplying the signal obtained by the conversion to the terminal CO. The level shifter LS2 has a function of converting the signal supplied from the control portion 121 and supplying the signal obtained by the conversion to the terminal DO. A switch SW1 has a function of controlling electrical connection between the control portion 121 and the terminal DO.

As will be described later with reference to FIG. 5, it is preferable that the terminal CO and the terminal DO be electrically connected to gates of power transistors. The level shifter LS1 and the level shifter LS2 preferably convert signals from the control portion 121 into appropriate potentials as gate voltages for driving the power transistors. Here, the conversion of a signal means, for example, increasing or reducing the potential of the signal or increasing the amplitude of the signal.

The control portion 121 has a function of supplying a signal Sn1 to the detection portion 127 to adjust the resistance value of the resistance circuit of the detection portion 127. The adjustment here means changing the resistance value to a desired value, for example. In the detection portion 127, the signal Sn1 is supplied to the logic circuit LC1. The logic circuit LC1 changes the resistance values of the resistance circuit Rs1, the resistance circuit Rs2, and the resistance circuit Rs3 with the use of the signal Sn1 that is supplied. Note that the resistance values are not necessarily changed in the case where the resistance values do not need to be changed.

The memory circuit FE1 preferably includes data for generating the signal Sn1. The memory circuit FE1 is preferably nonvolatile. It is preferable that rewriting in the memory circuit FE1 can be performed at a low voltage, e.g., a voltage of lower than or equal to 4 V. Details of the memory circuit FE1 will be described with reference to FIG. 2B.

When a signal EN is supplied to the level shifter LS2, output from the level shifter LS2 is blocked and the switch SW1 is brought into a conducting state, so that the signal from the control portion 121 can be output to the terminal DO. For example, the data stored in the memory circuit FE1 can be output from the terminal DO via the control portion 121.

<Resistance Circuit>

The resistance values of the resistance circuit Rs1, the resistance circuit Rs2, and the resistance circuit Rs3 can be adjusted or specifically, reduced, by switching the on state and off state of switches.

The resistance circuit of one embodiment of the present invention includes a plurality of pairs of one resistor and one switch, for example. In the pair of the one resistor and the one switch, the one switch has a function of varying the current flowing in the one resistor. The resistance of the resistance circuits can be adjusted by supplying signals to the switches and thereby controlling operation of the switches.

Figure 2A:
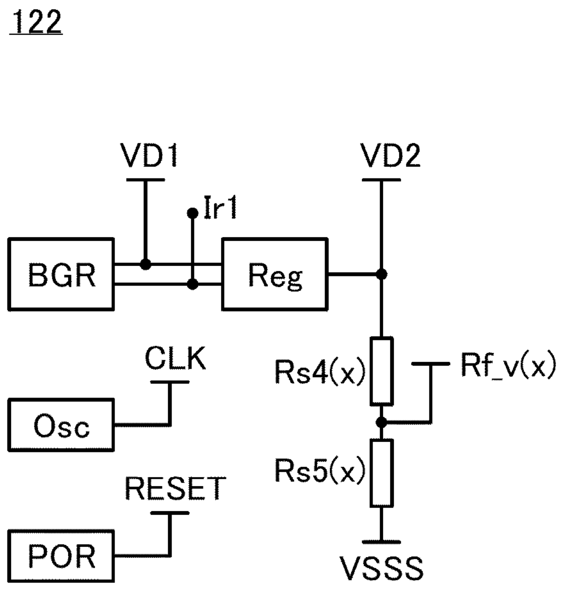
FIG. 2A is a diagram showing a structure example of a voltage generation portion.
Figure 2B:
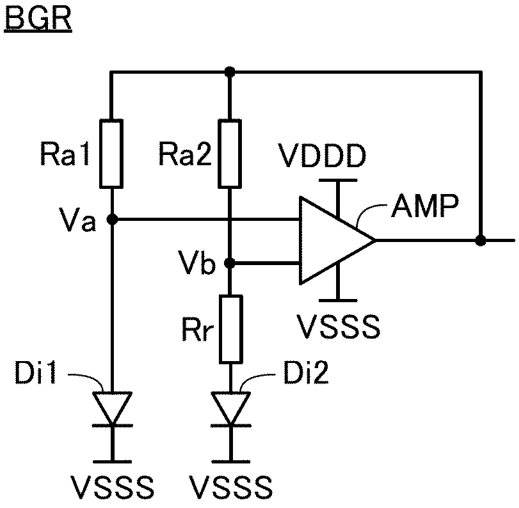
FIG. 2B is a diagram showing a structure example of a band gap reference circuit.
Figure 2C:
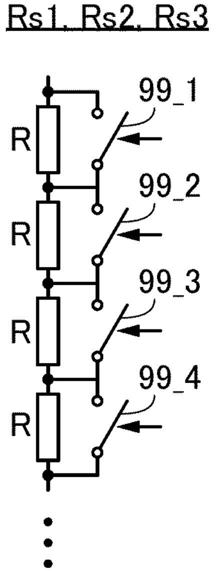
FIG. 2C and FIG. 2D are diagrams showing structure examples of resistance circuits.

FIG. 2C shows an example of the structure that can be used for each of the resistance circuit Rs1, the resistance circuit Rs2, and the resistance circuit Rs3. In FIG. 2C, a plurality of resistors (denoted as resistors R in the diagram) are electrically connected to each other in series, and switches are electrically connected in parallel to the respective resistors. In the diagram, the resistors denoted as the resistors R may have the same resistance value or different resistance values. The switches can be opened and closed with electrical signals. The resistance value of the case where the switch is in an off state is considerably lower than the resistance value of the resistor that is electrically connected in parallel. Although FIG. 2C shows an example in which four or more resistors are electrically connected to each other in series and switches 99 (switches 99_1, 99_2, 99_3, and 99_4 in FIG. 2C) are electrically connected in parallel to the respective resistors R, the number of resistors electrically connected to each other in series may be less than four or more than or equal to five.

The resistance value of the resistance circuit is lower in the case where one or more of the switches 99 are in an on state than in the case where four of the switches 99 are all in an off state.

The resistance circuit shown in FIG. 2C is sometimes referred to as a resistor ladder circuit or a ladder resistor circuit.

Figure 2D:
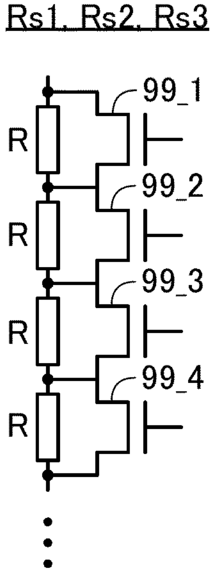

A transistor can be used as the switch 99, for example. FIG. 2D shows a structure in which a transistor is employed as a specific example of each switch in FIG. 2C. By supplying a signal to a gate of the transistor, switching of the on state and off state of the switch can be controlled.

As described with reference to FIG. 2C and FIG. 2D, the resistance values of the resistance circuit Rs1, the resistance circuit Rs2, and the resistance circuit Rs3 can be adjusted by supplying signals to the switches included in the resistance circuits.

The logic circuit LC1 has a function of supplying signals to the switches of the resistance circuits in accordance with the signal Sn1.

As described above, in the control circuit of one embodiment of the present invention, the voltage detection accuracy of the detection portion can be increased by adjusting the resistance value of the resistance circuit. In addition, the memory circuit FE1 can store data relating to the signal to be supplied to the switch of the resistance circuit, so that the control circuit of one embodiment of the present invention can store a signal for controlling the resistance value of the resistance circuit even when power supply to the control circuit is stopped.

In the control circuit of one embodiment of the present invention, the resistance value can be changed to a desired value with the use of an electrical signal. In the control circuit of one embodiment of the present invention, the accuracy of the potential generated by resistance division can be increased. In the control circuit of one embodiment of the present invention, the potential generated by resistance division can have a desired value.

The voltage of a battery determined to be in an overcharged state may be changed in accordance with the SOH (also referred to as State Of Health) of the secondary battery. The SOH of a brand new secondary battery is set to 100, and the SOH becomes a value smaller than 100 as the deterioration of the secondary battery progresses. The voltage of the battery determined to be in an overcharged state may be reduced as the SOH decreases, for example.

Since the resistance value can be changed with the use of an electrical signal in the control circuit of one embodiment of the present invention, the criteria of the detection portion 127 and the detection portion 128 can be changed in accordance with the state of a battery. More specifically, the threshold values for determining an overcharging voltage, an overdischarging voltage, a charging overcurrent, a discharging overcurrent, and a short circuit current can be changed.

<Voltage Generation Portion>

FIG. 2A shows an example of the structure of the voltage generation portion 122.

The voltage generation portion 122 includes a band gap reference circuit BGR, an oscillator Osc, a power on reset circuit POR, and a regulator circuit Reg.

The band gap reference circuit BGR has a function of generating the potential VD1 and the current Ir1. The potential VD1 is a constant potential, for example. The current Ir1 is a constant current, for example.

The regulator circuit Reg has a function of stepping up the potential VD1 to generate the potential VD2.

The oscillator Osc has a function of generating the clock signal CLK.

The power on reset circuit POR has a function of resetting the circuit included in the voltage generation portion 122 at the start of power supply to the voltage generation portion 122. The data stored in the memory circuit FE1 is read immediately after resetting by the power on reset circuit POR, for example.

The voltage generation portion 122 has a function of generating the reference potential Rf_v(x) with the use of the potential VD2. Each reference potential can be generated by resistance division of the potential VD2 using a resistance circuit Rs4(*x*) and a resistance circuit Rs5(*x*) as shown in FIG. 2A, for example.

The resistance circuit Rs4(*x*) and the resistance circuit Rs5(*x*) may have any of the structures of the resistance circuits shown in FIG. 2C and FIG. 2D. In that case, the resistance values may be adjusted by supplying signals from the control portion 121 to the switches of the resistance circuit Rs4(*x*) and the resistance circuit Rs5(*x*).

FIG. 2B shows an example of the structure of the band gap reference circuit BGR. The band gap reference circuit BGR includes two resistors Ra (Ra1 and Ra2), a resistor Rr, a diode element Di1, a diode element Di2, and an amplifier AMP. To the amplifier AMP are input a potential Va between the resistor Ra1 and the diode element Di1 and a potential Vb between the resistor Ra2 and the resistor Rr.

<Memory Circuit>

Figure 4A:
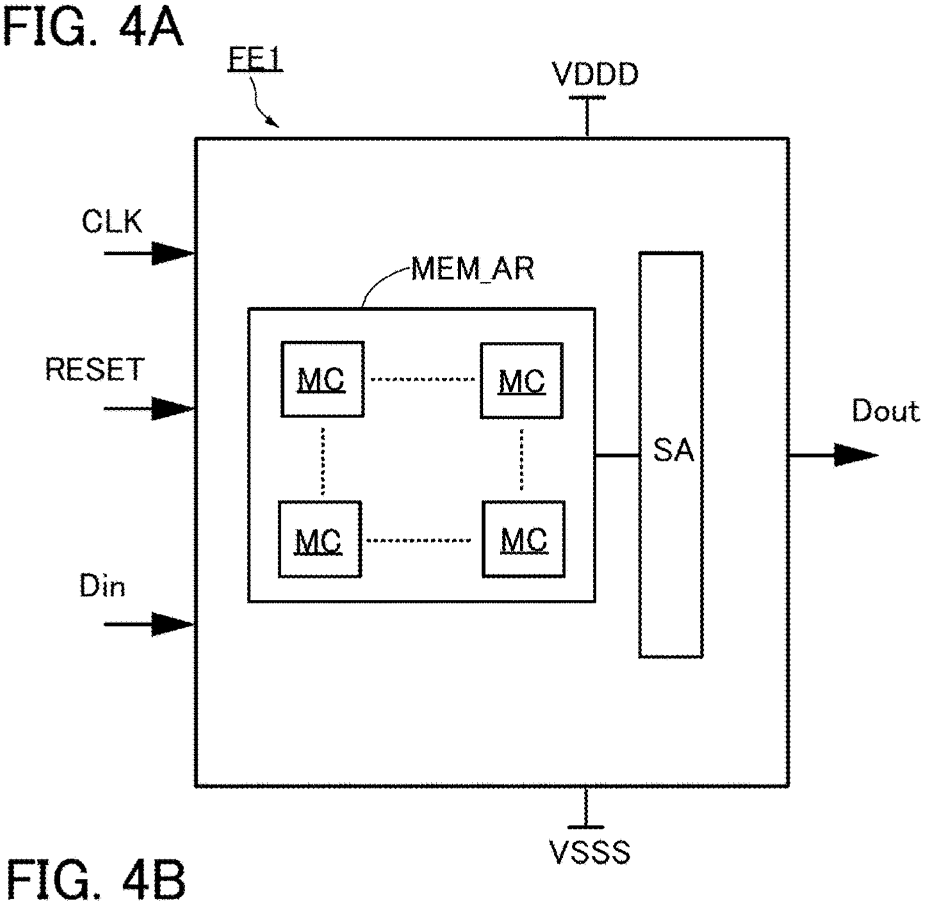
FIG. 4A and FIG. 4B are diagrams showing a structure example of a memory circuit.
Figure 4B:
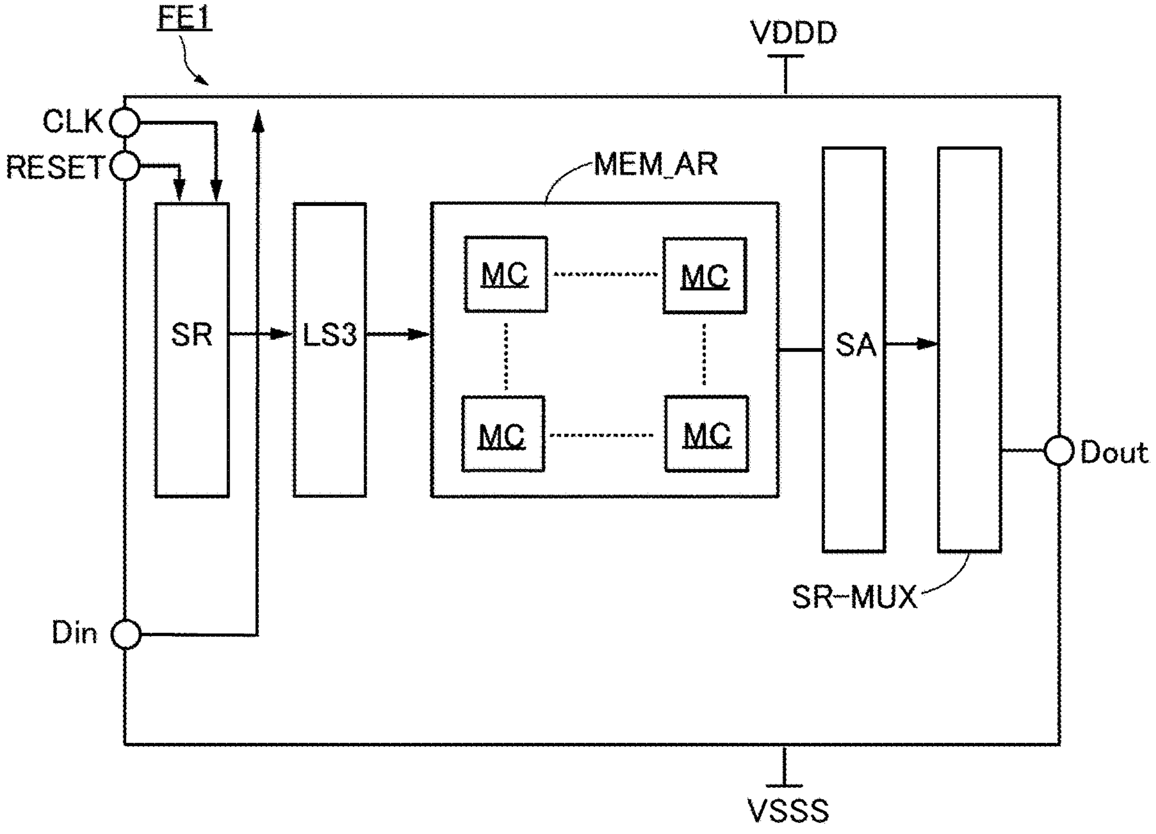

FIG. 4A and FIG. 4B show an example of the structure of the memory circuit FE1. The memory circuit FE1 stores data for generating a signal for control of the resistance value of each resistance circuit included in the control circuit 191.

The memory circuit FE1 is preferably a nonvolatile memory. As the memory circuit FE1, a memory such as a FeRAM (Ferroelectric Random Access Memory), a NAND flash memory, a NOR flash memory, a MRAM (Magnetoresistive RAM), a PRAM (Phase change RAM), or a ReRAM (Resistive RAM) can be used. A FeRAM is sometimes referred to as a ferroelectric memory.

The power consumption of the memory circuit FE1 can be reduced by lowering the operation voltage of the memory circuit FE1, a specific example of which is a voltage used for rewriting operation. In the case where the control circuit of one embodiment of the present invention is used as a protection circuit of a secondary battery, the memory circuit FE1 preferably operates at a voltage lower than or equal to the voltage of the secondary battery, for example. In the case where the memory circuit FE1 operates at a voltage lower than or equal to the voltage of the secondary battery, the voltage of the secondary battery does not need to be stepped up, whereby power that would be consumed by stepping-up in a step-up circuit can be saved. Also in the case where the voltage of the secondary battery is stepped-up, the memory circuit FE1 preferably operates at a lower voltage to reduce power consumption.

A FeRAM can operate at an extremely low voltage, e.g., a voltage lower than the voltage of a lithium ion battery. It is thus particularly preferable that a FeRAM be used as the memory circuit of one embodiment of the present invention.

Data can be written to the memory circuit FE1 by supplying a signal from the outside with the use of a terminal. Here, two signals of a data signal (Din) and the clock signal (CLK) can be written to the memory circuit FE1 with the use of the respective terminals, i.e., two terminals.

Alternatively, writing to the memory circuit FE1 can be performed using only one terminal. In the case where the control circuit 191 includes a large number of terminals, not only the circuit area but also the capacity of wirings connected to the terminals increase, whereby the footprint and volume of the control circuit 191 are increased. When the number of terminals is large, the arrangement flexibility for the control circuit 191 and other circuits is sometimes limited. When the number of terminals is large, the design flexibility of the control circuit 191 is sometimes limited. It is thus preferable that writing to the memory circuit FE1 in the control circuit 191 of one embodiment of the present invention be performed using only one terminal, which is the terminal TES here.

Description is made on the case where writing to the memory circuit FE1 is performed by supplying a data signal (hereinafter referred to as a data signal Smem) to the terminal TES in the control circuit 191. The data signal Smem is an asynchronous signal that is asynchronous with the signals generated inside the control circuit 191. Thus, a signal that changes in a cycle slower than that of the clock signal CLK generated in the voltage generation portion 122 is used as the data signal Smem, for example. The control circuit 191 may include a circuit for synchronizing the data signal supplied from the terminal TES.

Figure 3A:
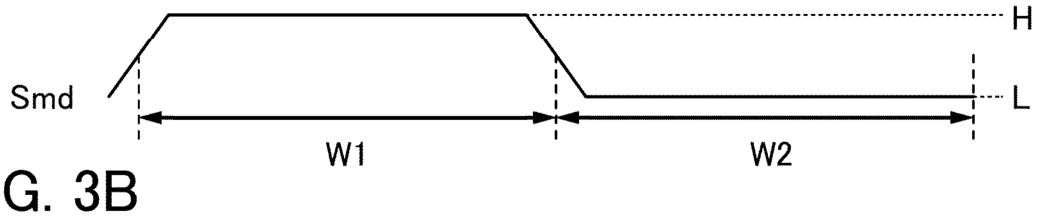
FIG. 3A to FIG. 3F are diagrams showing operation examples of a control circuit.
Figure 3B:
Figure 3C:
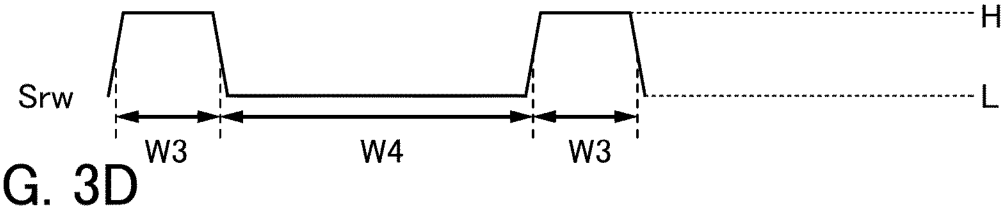

FIG. 3A to FIG. 3C show examples of signals input to the terminal TES. To the terminal TES, not only the data signal Smem but also a data signal for determining whether the mode is a test mode or a normal mode (hereinafter referred to as a signal Smd) and a data signal for determining whether the mode is a reading mode or a writing mode (hereinafter referred to as a signal Srw) are supplied as data signals.

The signal Smd is described with reference to FIG. 3A and FIG. 3B. FIG. 3A shows the signal Smd of the case where the mode is determined to be the test mode, and FIG. 3B shows the signal Smd of the case where the mode is determined to be the normal mode. In the case where the signal keeps being L (a low potential signal) as shown in FIG. 3B, the mode is determined to be the normal mode. In the case where the signal is H (a high potential signal) in any period as shown in FIG. 3A, the mode is determined to be the test mode.

In the test mode, the resistance circuit is adjusted, for example.

In the normal mode, data stored in the memory circuit FE1 is read to the control portion 121 and is supplied to the resistance circuit via the logic circuit LC1. In the normal mode, for example, a secondary battery is electrically connected to the control circuit and the secondary battery is monitored and protected.

The period W1 in which the signal is H and the period W2 in which the signal is L in the test mode are each preferably greater than or equal to 16 times as long as the cycle of the clock signal generated by the voltage generation portion 122.

Figure 3D:
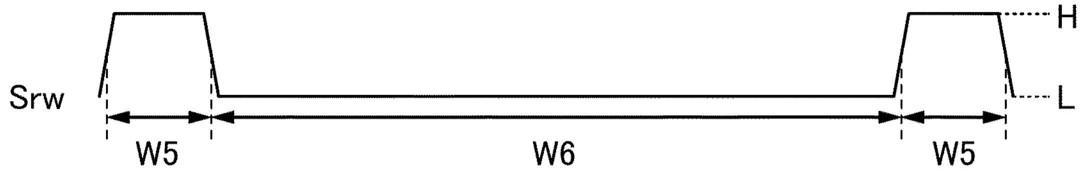

The signal Srw is described with reference to FIG. 3C and FIG. 3D. FIG. 3C shows the signal Srw of the case where the mode is determined to be the writing mode, and FIG. 3D shows the signal Srw of the case where the mode is determined to be the reading mode. The duration of the period in which the signal is L is different between the writing mode and the reading mode. It is preferable that the cycle of a signal for setting the writing mode be greater than or equal to four times as long as the cycle of the clock signal in a period W3 in which the signal is H, and be greater than or equal to four times and less than or equal to 16 times as long as the cycle of the clock signal in a period W4 in which the signal is L. It is preferable that the cycle of a signal for setting the reading mode be greater than or equal to four times as long as the cycle of the clock signal in a period W5 in which the signal is H, and be greater than or equal to 20 times and less than or equal to 32 times as long as the cycle of the clock signal in a period W6 in which the signal is L.

Figure 3E:
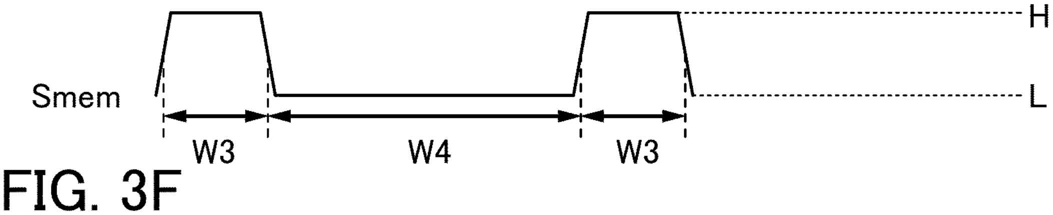
Figure 3F:
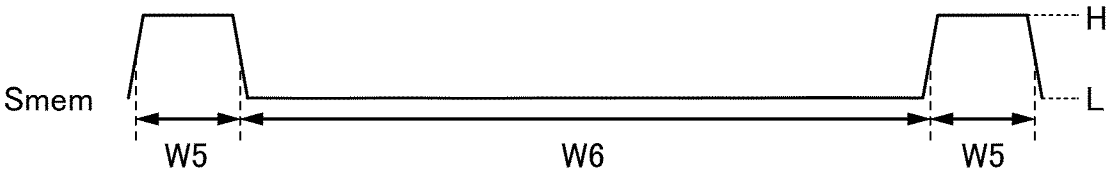

The data signal Smem is described with reference to FIG. 3E and FIG. 3F. The data signal Smem is composed of a binary signal. FIG. 3E shows a signal indicating a signal "1", and FIG. 3F shows a signal indicating a signal "0". The duration of the period in which the signal is L is different between the signal indicating the signal "1" and the signal indicating the signal "0". It is preferable that the cycle of the signal indicating the signal "1" be greater than or equal to four times as long as the cycle of the clock signal in the period W3 in which the signal is H, and be greater than or equal to four times and less than or equal to 16 times as long as the cycle of the clock signal in the period W4 in which the signal is L. It is preferable that the cycle of the signal indicating the signal "0" be greater than or equal to four times as long as the cycle of the clock signal in the period W5 in which the signal is H, and be greater than or equal to 20 times and less than or equal to 32 times as long as the cycle of the clock signal in the period W6 in which the signal is L.

The data signal Smem undergoes conversion in the control portion 121 to be in a format such that the digital signal can be supplied to the memory circuit FE1, and is then supplied to the memory circuit FE1.

The data stored in the memory circuit FE1 can be read from the terminal DO.

The signal EN is supplied to the level shifter LS2 to stop output from the level shifter LS2 and bring the switch SW1 into a conducting state, so that the data stored in the memory circuit FE1 can be output to the terminal DO. In the case where data writing to the memory circuit FE1 is not performed properly, processing is performed in which writing conditions are changed or the bit in the memory circuit FE1 that fails to be normally written is replaced with a redundant bit, for example. An unwritable bit may be set. Such processing or setting can increase the yield of the memory circuit FE1. Moreover, the reliability of the memory circuit FE1 can be high.

<Structure Example of Memory Circuit>

FIG. 4A shows a structure example of the memory circuit of one embodiment of the present invention.

The memory circuit FE1 shown in FIG. 4A includes a memory cell array MEM_AR and a sense amplifier SA.

Data is supplied from the control portion 121 to the memory circuit FE1 (Din). The data supplied is stored in the memory cell array MEM_AR.

Description is made on reading of the data stored in the memory cell array MEM_AR. The data stored is amplified by the sense amplifier SA and output to the control portion 121 (Dout).

A memory cell composed of one transistor and one capacitor (a 1T1C memory cell) can be used as each memory cell of the memory cell array MEM_AR, for example; when a ferroelectric layer is used as a dielectric layer of the capacitor, the memory circuit FE1 can function as a FeRAM.

<Power Storage System>

Figure 5:
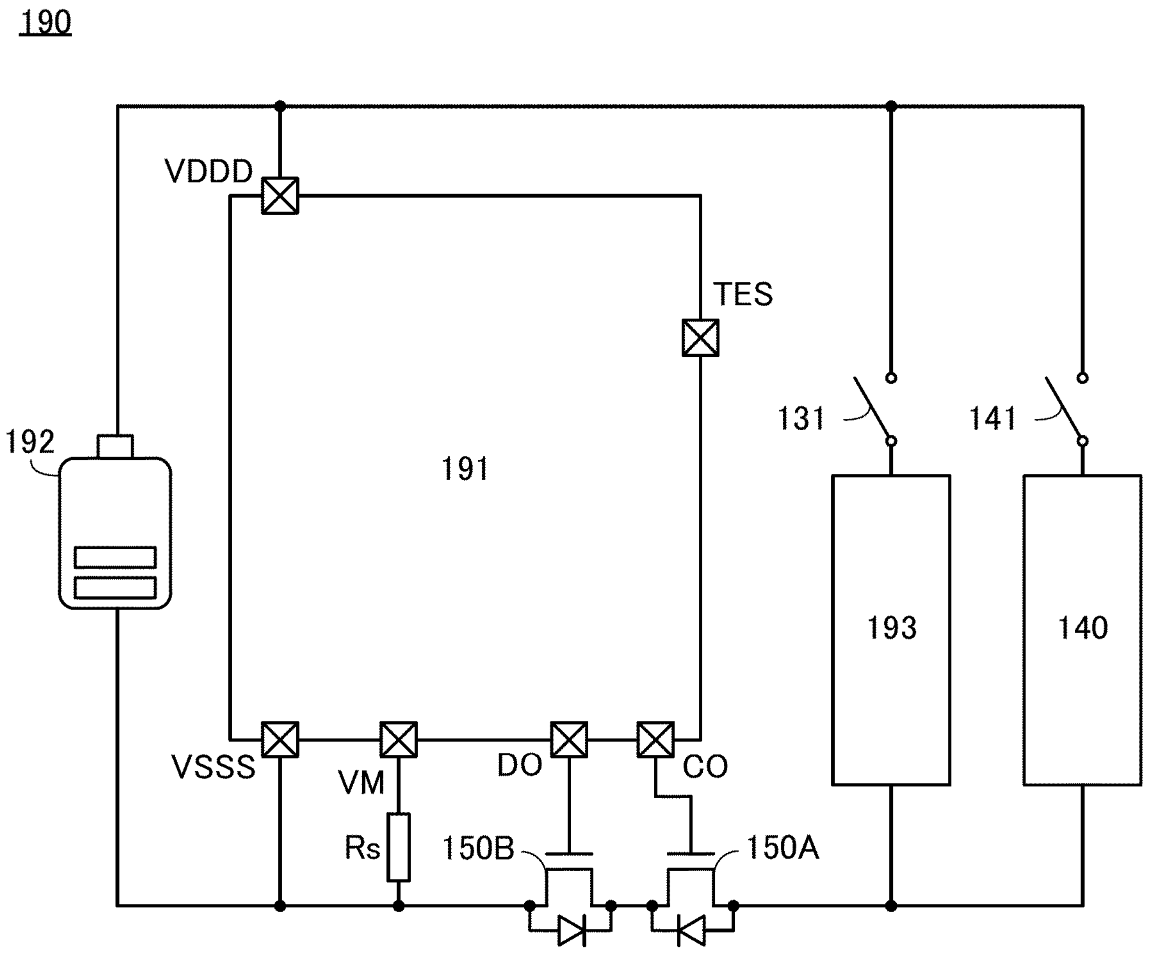
FIG. 5 is a diagram showing a structure example of a power storage system.

FIG. 5 shows an example of a power storage system 190 that includes the control circuit 191 described above.

The power storage system 190 includes a secondary battery 192, the control circuit 191, a load 193, a charger 140, a power transistor 150A, and a power transistor 150B. FIG. 5 also shows a switch 131 making a current flow to the load 193 with discharging of the secondary battery 192 and a switch 141 making a current flow from the charger 140 for charging of the secondary battery 192. In addition, FIG. 5 shows a terminal on the positive electrode side of the load 193 and the charger 140 as VDDD and a terminal on the negative electrode side as VSSS. The control circuit 191 can function as a protection circuit of the secondary battery.

The terminal CO of the control circuit 191 is electrically connected to a gate of the power transistor 150A. The terminal DO is electrically connected to a gate of the power transistor 150B.

The power transistor 150A and the power transistor 150B are electrically connected to each other in series. The power transistor 150A and the power transistor 150B each include a parasitic diode.

The power transistor 150A and the power transistor 150B have a function of blocking a current between the terminal VSSS and the charger 140 and a current between the terminal VSSS and the load 193. The control circuit 191 has a function of monitoring the secondary battery 192 and, depending on the state of the secondary battery 192, controlling the on state or off state of the gates of the power transistor 150A and the power transistor 150B to protect the secondary battery 192.

A resistor Rs is provided between the terminal VM and the terminal VSSS. The current distributed by the resistor Rs is supplied to the terminal VM of the control circuit 191.

Figure 6A:
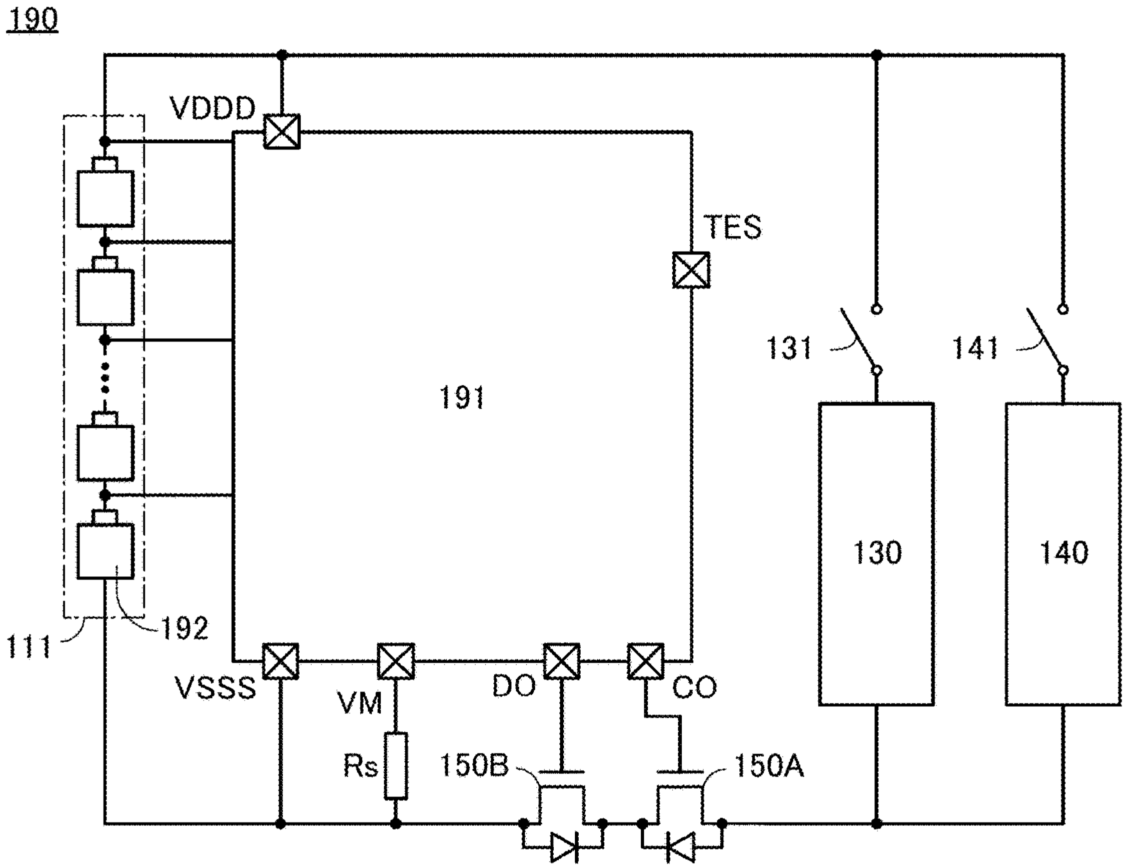
FIG. 6A is a diagram showing a structure example of a power storage system.
Figure 6B:
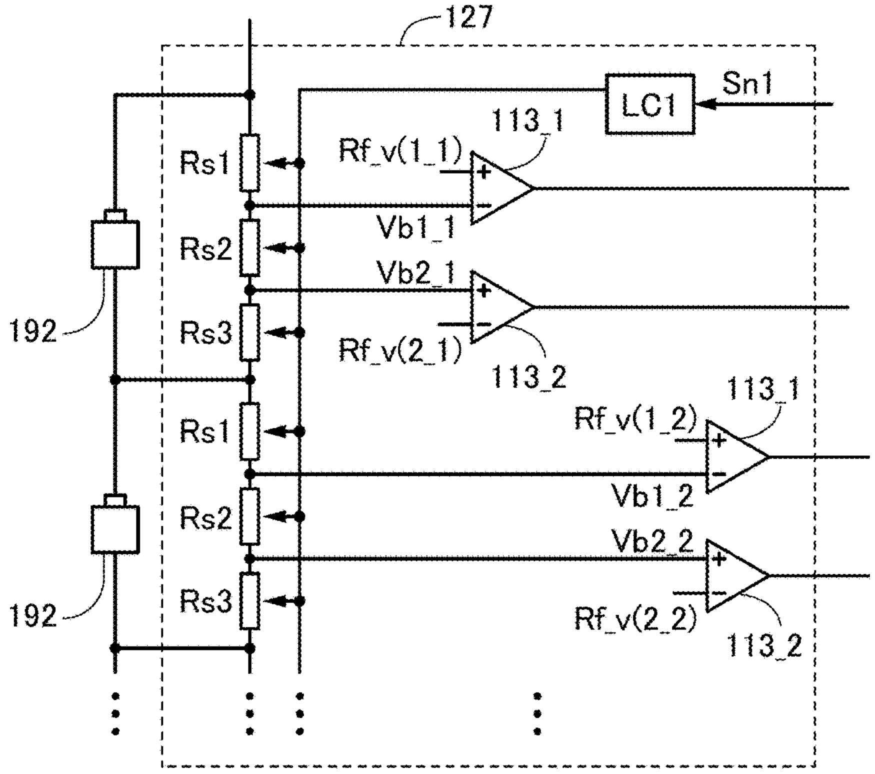
FIG. 6B is a diagram showing a structure example of part of a power storage system.

FIG. 6A shows an example of the power storage system 190 in which a secondary battery includes an assembled battery 111 formed using a plurality of the secondary batteries 192. FIG. 6B shows examples of the detection portion 127 usable for the structure in FIG. 6A and the secondary batteries 192 electrically connected to the detection portion 127. In FIG. 6B, the resistance circuit Rs1 to the resistance circuit Rs3 may be used to block charging or discharging of the secondary batteries 192. For example, the time it takes to complete charging is different between the plurality of secondary batteries 192 in some cases. For example, in some cases, even when charging of a first secondary battery among the plurality of secondary batteries 192 is not completed, charging of a second secondary battery is completed. In such a case, the resistance of the resistance circuit electrically connected in parallel to the second secondary battery may be adjusted to limit the charging current flowing to the second secondary battery. That enables independent control of charging and discharging of the secondary batteries, which inhibits deterioration of the secondary batteries and extends the lifetimes thereof.

<Adjustment of Resistance Value of Resistance Circuit>

Figure 7:
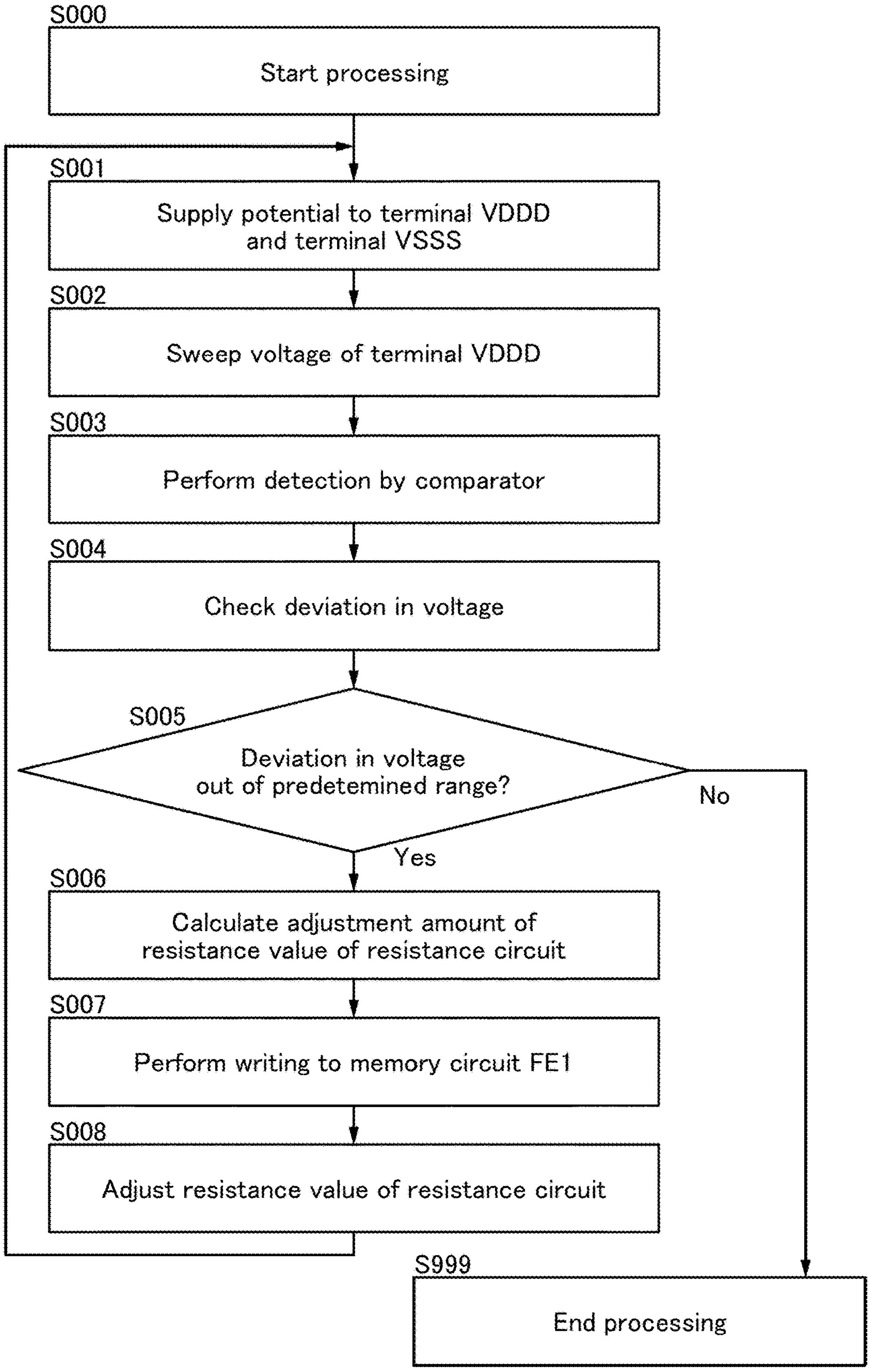
FIG. 7 is a diagram showing an operation example of a control circuit.

An example of a method for adjusting the resistance values of the resistance circuits in the control circuit of one embodiment of the present invention is described with reference to the flowchart in FIG. 7.

First, processing starts in Step S000.

Then, in Step S001, potentials are supplied to the terminal VDDD and the terminal VSSS. A variable potential is preferably supplied to the terminal VDDD. A variable potential or a constant potential may be supplied to the terminal VSSS. For example, a voltage source capable of sweeping (scanning) a voltage is electrically connected to the terminal VDDD, and the ground potential is supplied to the terminal VSSS. Here, the voltage supplied to the terminal VDDD is a voltage Vswp, and the voltage supplied to the terminal VSSS is V0. In the case where operation of the comparator 113_1 is checked, for example, the potential difference between the voltage Vswp and the voltage V0 in Step S001 is set to a value smaller than the upper voltage limit of the secondary battery; in the case where operation of the comparator 113_2 is checked, for example, the potential difference between the voltage Vswp and the voltage V0 in Step S001 is set to a value larger than the lower voltage limit of the secondary battery.

Next, the value of the voltage Vswp is swept in Step S002. In the case where operation of the comparator 113_1 is checked, for example, the value of the voltage Vswp is swept to be higher; in the case where operation of the comparator 113_2 is checked, for example, the value of the voltage Vswp is swept to be lower.

Then, in Step S003, the comparator checked (the comparator 113_1 or the comparator 113_2) performs detection. The comparator outputs a detection signal to the control portion 121 upon performing detection. In the case of the comparator 113_1, the signal output to the control portion 121 is switched from one of a high potential signal H and a low potential signal L to the other when the voltage Vb1 exceeds the reference potential Rf_v(1). In the case of the comparator 113_2, the signal output to the control portion 121 is switched from one of the high potential signal H and the low potential signal L to the other when the voltage Vb2 falls below the reference potential Rf_v(2).

When the signal that is output to the control portion 121 from the comparator checked is switched, the control portion 121 determines that an abnormal event has occurred. Specifically, in the case where output from the comparator 113_1 is switched, the control portion 121 determines that overcharging has occurred; in the case where output from the comparator 113_2 is switched, the control portion 121 determines that overdischarging has occurred. In the case where the control portion 121 determines that overcharging has occurred, a signal for bringing the power transistor 150A into an off state is supplied to the terminal CO via the level shifter LS1. In the case where the control portion 121 determines that overdischarging has occurred, a signal for bringing the power transistor 150B into an off state is supplied to the terminal DO via the level shifter LS2.

Note that in an actual control circuit, an output signal from the comparator checked is sometimes switched at a voltage deviated from the designed voltage owing to a variation in the resistance value between the resistors of the resistance circuits and a variation between semiconductor elements used in the comparators.

In Step S004, a deviation in voltage is checked.

In Step S005, the process proceeds to Step S006 in the case where the results of checking in Step S004 show that the voltage at the time of the detection operation of the comparator in Step S003 is out of the designed voltage range; the process proceeds to Step S999 and the processing ends in the case where the voltage is not deviated.

In Step S006, the adjustment amounts of the resistance values of the resistance circuits are calculated. Specifically, in accordance with the deviation in voltage, the adjustment amounts of the resistance values of the resistance circuit Rs1 to the resistance circuit Rs3 for compensating for the deviation are calculated. In accordance with the adjustment amounts calculated, the signals (the data signal Smem) to be supplied to the switches of the resistance circuit Rs1 to the resistance circuit Rs3 are determined.

Then, in Step S007, writing to the memory circuit FE1 is performed. Writing to the memory circuit FE1 can be performed in the following manner: the data signal Smem is supplied from the terminal TES to the control portion 121 and a signal based on the data signal Smem is supplied from the control portion 121 to the memory circuit FE1 (Din). The data signal Smem relates to the signals supplied to the switches of the resistance circuit Rs1 to the resistance circuit Rs3.

Here, data in the memory circuit FE1 may be read. The data in the memory circuit FE1 can be read with the use of the terminal DO. By performing this reading, whether data has been properly written to the memory circuit FE1 in Step S007 can be checked.

Next, in Step S008, the resistance values of the resistance circuits are adjusted. The resistance values are adjusted in the following manner: the signal based on the data signal Smem is supplied from the memory circuit FE1 to the control portion 121 (Dout), the signal Sn1 is supplied from the control portion 121 to the logic circuit LC1, and signals are supplied from the logic circuit LC1 to the switches of the resistance circuit Rs1 to the resistance circuit Rs3 in accordance with the signal Sn1. The control portion 121 receives the signal based on the data signal Smem from the memory circuit FE1, and uses the signal to generate the signal Sn1.

Then, the process goes back to Step S001.

Through the above process, the resistance values of the resistance circuits can be adjusted in the control circuit of one embodiment of the present invention.

The structure described in this embodiment can be combined as appropriate with the structure described in any of the other embodiments.

Embodiment 2

In this embodiment, a memory circuit of one embodiment of the present invention will be described.

FIG. 4B shows details of FIG. 4A referred to in Embodiment 1.

As shown in FIG. 4B, the memory circuit FE1 includes a memory cell MC. A plurality of the memory cells MC are arranged in an array to constitute a memory element region MEM_AR. The memory circuit FE1 includes a driver circuit around the memory element region MEM_AR. The driver circuit is also referred to as a peripheral circuit and can include, for example, a row circuit and a column circuit. The driver circuit shown in FIG. 4B includes row circuits and column circuits. The row circuit corresponds to a circuit that controls an input side of the memory element region MEM_AR, and the column circuit corresponds to a circuit that controls an output side of the memory element region MEM_AR. As the row circuits, a level shifter LS3, a shift register SR, and the like are included. The level shifter LS3 has a function of changing the potential level of the signal to be input to the memory element region MEM_AR. The shift register SR includes a plurality of flip-flops and the like and has a function of sequentially shifting input signals in synchronization with the clock signals (CLK). An internal circuit is initialized with the reset signal RESET as necessary. The signals (Din) output from the control circuit 191 are sequentially shifted by the shift register SR, the potential levels of the signals are changed by the level shifter LS3, and the resultant signals are input to the memory element region MEM_AR. With such row circuits, signals can be sequentially written to the memory cells MC of the memory element region MEM_AR. Accordingly, an address signal or the like is not necessarily input. It is preferable that no address signal be input to prevent the row circuits from becoming complicated. An address signal is needed in the case where a signal is to be input to a freely selected memory cell MC of the memory element region MEM_AR.

As shown in FIG. 4B, a sense amplifier circuit SA, a decoder SR-MUX, and the like are included as the column circuits. The sense amplifier SA has a function of amplifying the voltage of an output signal from the memory element region MEM_AR. The voltage of the output signal can be amplified to be suitable for the circuit to which the output signal from the memory element region MEM_AR is to be supplied. A differential sense amplifier or a latch sense amplifier can be applied to the sense amplifier SA. The decoder SR-MUX has a function of sequentially outputting, to the control circuit 191, the memory data amplified by the sense amplifier SA. The signal (Dout) from the decoder SR-MUX is input to the control circuit 191.

Figure 8A:
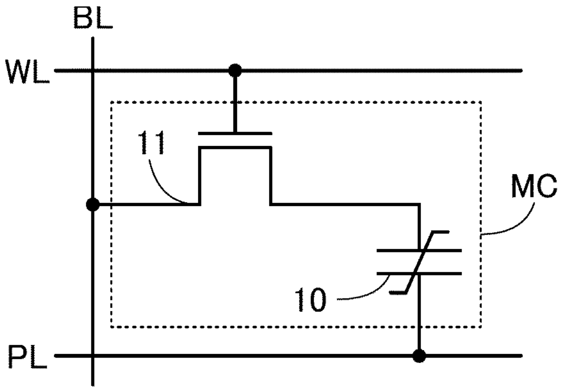
FIG. 8A is a diagram showing a circuit diagram of a memory cell MC.

Next, the memory cell MC of the memory circuit FE1 is described. FIG. 8A shows a circuit diagram of the memory cell MC. The memory cell MC, which is a 1T1C-type memory cell, includes a transistor 11 serving as a switching element and a capacitor 10. The 1T1C-type memory cells each include a small number of elements, whereby the memory cells MC can be arranged densely and memory capacity can be increased. Needless to say, the memory cell MC may include other elements.

A gate of the transistor 11 is electrically connected to a wiring WL. The wiring WL has a function of a word line, and on/off of the transistor 11 can be controlled by controlling the potential of the wiring WL. For example, setting the potential of the wiring WL to a high potential (H) can bring the transistor 11 into an on state; setting the potential of the wiring WL to a low potential (L) can bring the transistor 11 into an off state. The wiring WL is electrically connected to the driver circuit. Specifically, the wiring WL is electrically connected to the level shifter LS3 shown in FIG. 4B, for example. Owing to the function of the level shifter LS3, the wirings WL are sequentially selected and on/off of the transistors 11 is controlled.

One of a source and a drain of the transistor 11 is electrically connected to a wiring BL. The wiring BL has a function of a bit line. When the transistor 11 is in an on state, a potential corresponding to the potential of the wiring BL is supplied to one electrode of the capacitor 10. The wiring BL is electrically connected to the sense amplifier SA shown in FIG. 4B, and the data output from the memory cell MC can be read via the sense amplifier SA.

The other electrode of the capacitor 10 is electrically connected to a wiring PL. The wiring PL has a function of a plate line, and the potential of the wiring PL can be set to the potential of the other electrode of the capacitor 10. When the potential of the wiring BL has a constant value, a voltage is applied to the wiring PL, so that data can be read.

A Si transistor is preferably used as the transistor 11. Cross-sectional views and the like of memory cells that include Si transistors will be described later with reference to FIG. 11A, FIG. 11B, FIG. 12, and the like.

An OS transistor may be used as the transistor 11. An OS transistor includes a metal oxide in its semiconductor layer, and the metal oxide is sometimes referred to as an oxide semiconductor (which is also simply referred to as OS).

An OS transistor has a feature of a high breakdown voltage. Thus, in the case where the transistor 11 is an OS transistor, a high voltage can be applied to the transistor 11 even when the transistor 11 is scaled down. The transistor 11 is preferably scaled down to reduce the area occupied by the memory cell MC. For example, the area occupied by one memory cell MC can be ⅓ to ⅙ of the area occupied by one SRAM cell. Accordingly, the memory cells MC can be arranged densely and memory capacity can be increased.

Figure 8B:
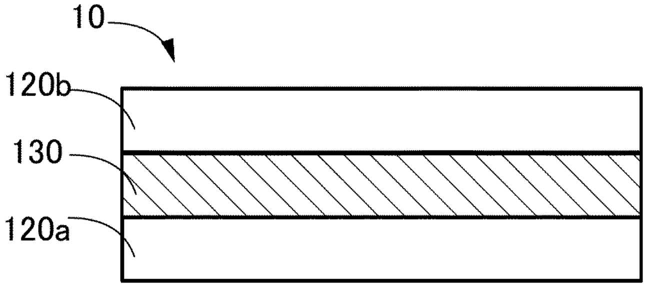
FIG. 8B is a diagram showing a cross section of a capacitor of the memory cell MC.

FIG. 8B shows a cross-sectional view of the capacitor 10. The capacitor 10 includes an insulator 130 between a lower electrode 120*a* and an upper electrode 120*b*. The insulator 130 includes a ferroelectric material as a dielectric layer. A dielectric layer containing a ferroelectric material is sometimes referred to as a ferroelectric layer.

Examples of the ferroelectric material include hafnium oxide, zirconium oxide, $HfZrO_X$ (X is a real number larger than 0), a material in which an element J1 (the element J1 is zirconium (Zr), silicon (Si), aluminum (Al), gadolinium (Gd), yttrium (Y), lanthanum (La), strontium (Sr), or the like) is added to hafnium oxide, and a material in which an element J2 (the element J2 is hafnium (Hf), silicon (Si), aluminum (Al), gadolinium (Gd), yttrium (Y), lanthanum (La), strontium (Sr), or the like) is added to zirconium oxide. That is, the ferroelectric material preferably contains an oxide containing hafnium and zirconium.

Another example of the ferroelectric material is a piezoelectric ceramic having a perovskite structure, such as $PbTiO_X$, barium strontium titanate (BST), strontium titanate, lead zirconate titanate (PZT), strontium bismuth tantalate (SBT), bismuth ferrite (BFO), or barium titanate.

Another example of the ferroelectric material is a mixture or a compound that contains a plurality of materials selected from the materials given above.

The materials given above each exhibit ferroelectricity in some cases and exhibit other properties in other cases depending on their crystal structures or additives; however, these materials are in the category of the ferroelectric material in this specification and the like. In other words, the ferroelectric material includes, in its category, materials that have ferroelectricity and materials that can have ferroelectricity.

The insulator 130 can have a single-layer structure or a multilayer structure. In the insulator 130 having a multilayer structure, materials selected from the materials given above can be sequentially stacked.

Figure 9:
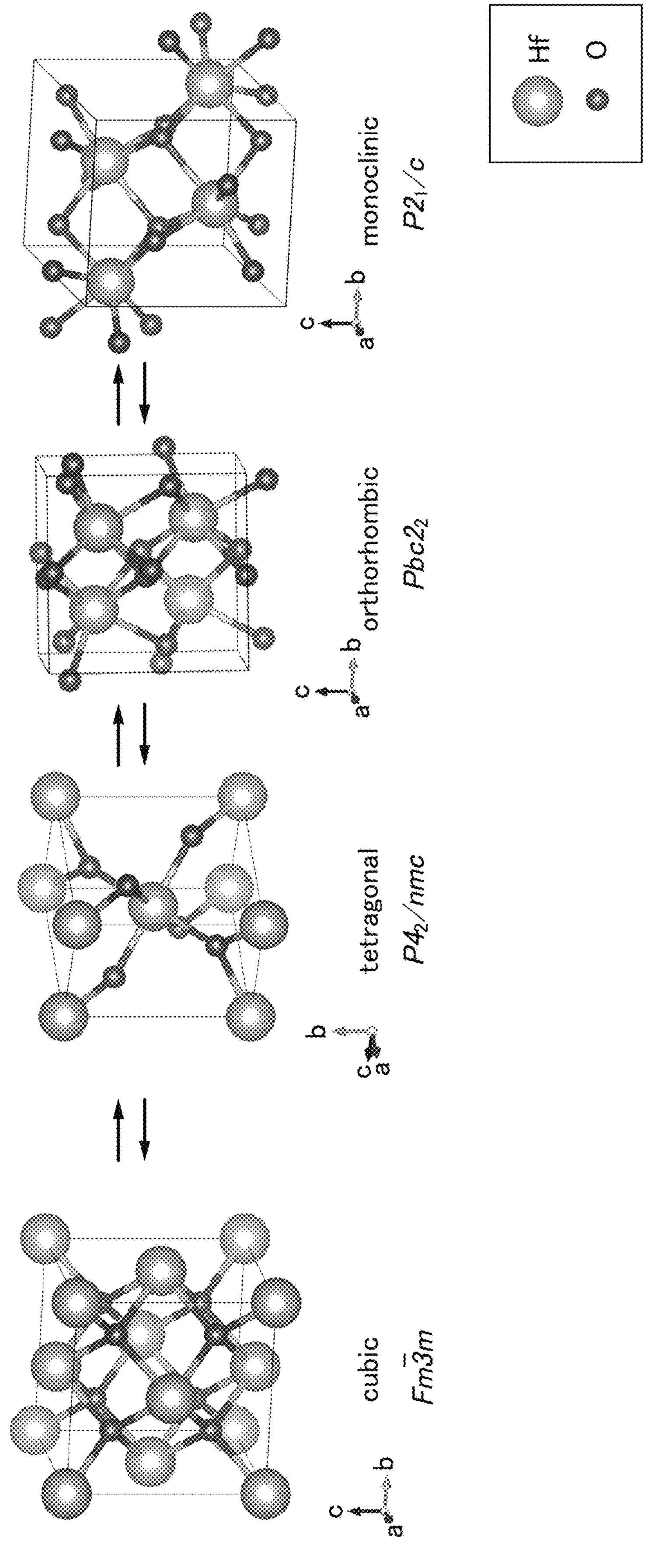
FIG. 9 is a model diagram illustrating crystal structures of hafnium oxide.

Next, physical properties such as a crystal structure and ferroelectricity are described with hafnium oxide given as an example. FIG. 9 is a model diagram illustrating crystal structures of hafnium oxide ($HfO_2$). Hafnium oxide is known to take on various crystal structures and, for example, can take on crystal structures illustrated in FIG. 9 such as cubic (space group: Fm-3m), tetragonal (space group: $P4_2$/nmc), orthorhombic (space group: $Pbc2_2$), and monoclinic (space group: $P2_1/c$) crystal structures. Hafnium oxide is a high dielectric when having a monoclinic crystal structure, is a ferroelectric when having an orthorhombic crystal structure, and is an antiferroelectric when having a tetragonal crystal structure. Thus, it can be said that when used in the ferroelectric layer, hafnium oxide preferably has an orthorhombic crystal structure.

As indicated by the arrows in FIG. 9, a phase change between the crystal structures of hafnium oxide can occur. The phase change is sometimes caused by heat treatment or the like.

To exhibit ferroelectricity, hafnium oxide is doped with an additive in a method. As the additive, zirconium (Zr), silicon (Si), aluminum (Al), gadolinium (Gd), yttrium (Y), lanthanum (La), or strontium (Sr) can be used.

The above control of the crystal structure and the above doping of an additive can be performed independently or combined.

For example, the crystal structure of hafnium oxide can be changed from a monoclinic crystal structure to an orthorhombic crystal structure when the hafnium oxide is doped with zirconium. As already described above, hafnium oxide having an orthorhombic crystal structure exhibits ferroelectricity and is thus preferably used for the ferroelectric layer. In the case where hafnium oxide is doped with zirconium, a composite is sometimes formed, which is sometimes referred to as a composite material or a mixed crystal of hafnium oxide and zirconium oxide.

In an example different from the above composite material, the ferroelectric layer may have a stacked-layer structure in which a hafnium oxide film and a zirconium oxide film are alternately formed such that a composition hafnium oxide:zirconium oxide=1:1 is achieved. An ALD method is preferably employed, in which case the hafnium oxide film and the zirconium oxide film can each be as thin as greater than or equal to 5 nm and less than or equal to 25 nm and the stacked-layer structure can accordingly have a thickness of greater than or equal to 50 nm and less than or equal to 100 nm. This stacked-layer structure preferably includes at least hafnium oxide with an orthorhombic crystal structure to exhibit ferroelectricity and to be suitable for the ferroelectric layer.

The crystal state of the above stacked-layer structure sometimes has an amorphous structure just after the formation. Heating may be performed to change the amorphous structure into an orthorhombic crystal structure. Depending on the heating temperature or the like, the orthorhombic crystal structure is changed into a monoclinic crystal structure in some cases. When exhibiting ferroelectricity, hafnium oxide preferably has an orthorhombic crystal structure rather than a monoclinic crystal structure; thus, it is preferable that the heating temperature be higher than or equal to 300° C. and lower than or equal to 500° C.

As long as the insulator 130 exhibits ferroelectricity, there is no particular limitation on the crystal structure of the insulator 130. For example, the insulator 130 may have an amorphous structure or may be a single crystal. Furthermore, the insulator 130 may have a structure (composite structure) in which one material layer has both an amorphous structure and the above crystal structure.

In the case where a composite material containing hafnium oxide and zirconium oxide ($HfZrO_x$) is used as the insulator 130, a thermal ALD method is preferably used for the formation. In an ALD method, which is also called an atomic layer deposition method, control at an atomic level can be performed and a film as thin as greater than or equal to 5 nm and less than or equal to nm can be obtained. An ALD method is preferable because it enables a high film formation rate. The composition of a composite material containing hafnium oxide and zirconium oxide ($HfZrO_x$) can be, for example, Hf:Zr:O=0.5:0.5:2 or Hf:Zr:O=0.25:0.75:2.

In the case where the insulator 130 is formed by a thermal ALD method, a material that does not contain a hydrocarbon (also referred to as Hydro Carbon or HC) is suitably used as a precursor. In the case where the insulator 130 contains one or both of hydrogen and carbon, crystallization of the insulator 130 might be inhibited; thus, a material that does not contain a hydrocarbon is preferred. In the case where a precursor that does not contain a hydrocarbon is used as described above, the insulator 130 has a reduced concentration(s) of one or both of hydrogen and carbon to be highly purified and intrinsic. Examples of the precursor that does not contain a hydrocarbon include a chlorine-based material. Note that in the case where a material containing hafnium oxide and zirconium oxide ($HfZrO_x$) is used as the insulator 130, one or more selected from $HfCl_4$ and $ZrCl_4$ is used as the chlorine-based precursor.

In the case where the insulator 130 contains much hydrogen and much carbon, a step of removing hydrogen and carbon is performed. In the step of removing hydrogen and carbon, a layer for capturing hydrogen and carbon is formed and heating is performed. This removal step is sometimes referred to as gettering.

In the case where the insulator 130 is formed by a thermal ALD method, $H_2O$ or $O_3$ can be used as an oxidizer. As the oxidizer in the thermal ALD method, $O_3$ is more suitably used than $H_2O$ to reduce the concentration of hydrogen in the film. However, the oxidizer in the thermal ALD method is not limited thereto. For example, the oxidizer in the thermal ALD method may contain any one or more selected from $O_2$, $O_3$, $N_2O$, $NO_2$, $H_2O$, and $H_2O_2$.

As shown in FIG. 8B, the capacitor 10 includes the lower electrode 120*a* and the upper electrode 120*b* in addition to the insulator 130. The upper electrode 120*b* and the lower electrode 120*a* can be formed using the same material in the same step. The upper electrode 120*b* and the lower electrode 120*a* each independently or both contain titanium nitride, tantalum nitride, or any other metal nitride. The upper electrode 120*b* and the lower electrode 120*a* each independently or both contain platinum, aluminum, copper, or any other conductive material. The upper electrode 120*b* and the lower electrode 120*a* each independently or both contain indium oxide, gallium oxide, zinc oxide, tin oxide, indium tin oxide (ITO), or indium zinc oxide (IZO). The upper electrode 120*b* and the lower electrode 120*a* may each independently or both contain a solid solution containing two or more kinds of materials among the above materials. A stable voltage can be applied to the ferroelectric layer.

The upper electrode 120*b*, which is formed after the insulator 130, is preferably formed by an ALD method, a CVD method, or the like. For example, for the upper electrode 120*b*, a titanium nitride film is formed by a thermal ALD method. Here, the upper electrode 120*b* is preferably formed by a method in which a film is formed while a substrate is heated, like a thermal ALD method. A film is formed with the lower limit of the substrate temperature set to higher than or equal to room temperature, preferably higher than or equal to 300° C., further preferably higher than or equal to 325° C., still further preferably higher than or equal to 350° C., for example. Furthermore, a film is formed with the upper limit of the substrate temperature set to lower than or equal to 500° C., preferably lower than or equal to 450° C., for example.

The formation of the upper electrode 120*b* within the above-described temperature range enables the insulator 130 to have ferroelectricity even without high-temperature heat treatment (e.g., heat treatment at a temperature of higher than or equal to 400° C. or higher than or equal to 500° C.) after the formation of the upper electrode 120*b*. When the upper electrode 120*b* is formed by an ALD method, which causes relatively little damage to a base, as described above, the crystal structure of the insulator 130 can be inhibited from being broken excessively, which allows the insulator 130 to have higher ferroelectricity or keep having high ferroelectricity.

In the case where the upper electrode 120*b* is formed by a sputtering method or the like, the insulator 130 can be damaged. For example, in the case where a composite material containing hafnium oxide and zirconium oxide ($HfZrO_x$) is used as the insulator 130 and the upper electrode 120*b* is formed by a sputtering method, $HfZrO_x$ is damaged by the sputtering method and the crystal structure of $HfZrO_x$ (typically, an orthorhombic crystal structure or the like) can be broken. There is a method in which heat treatment is performed after the sputtering method to recover the damage to the crystal structure of $HfZrO_x$; however, in some cases, the damage in $HfZrO_x$ formed by the sputtering method, e.g., a dangling bond (e.g., O*) in $HfZrO_x$, is bonded to hydrogen contained in $HfZrO_x$, and thus the damage in the crystal structure of $HfZrO_x$ cannot be recovered.

Thus, a material that does not contain hydrogen or has an extremely low hydrogen content is suitably used as the insulator 130, which is $HfZrO_x$ here. For example, the concentration of hydrogen contained in the insulator 130 is preferably less than or equal to $5\times10^{20}$ atoms/cm$^3$, further preferably less than or equal to $1\times10^{20}$ atoms/cm$^3$. The concentration of hydrogen can be measured by secondary ion mass spectrometry (SIMS). The lower limit of the above concentration is the lower detection limit of SIMS.

Furthermore, as described above, in order to reduce the concentration of hydrogen in the insulator 130, the material that does not contain a hydrocarbon is suitably used as the precursor. In that case, the insulator 130 may be a film that does not contain a hydrocarbon as a main component or that has an extremely low hydrocarbon content. For example, the concentration of carbon of the hydrocarbon contained in the insulator 130 is preferably less than or equal to $5\times10^{20}$ atoms/cm$^3$, further preferably less than or equal to $1\times10^{20}$ atoms/cm$^3$. The concentration of hydrocarbon can be measured by SIMS. The lower limit of the above concentration is the lower detection limit of SIMS.

Moreover, in the case where the material that does not contain a hydrocarbon is used as the precursor in the formation of the insulator 130, the insulator 130 may be a film that does not contain carbon as a main component or that has an extremely low carbon content. For example, the concentration of carbon contained in the insulator 130 is preferably less than or equal to $5\times10^{20}$ atoms/cm$^3$, further preferably less than or equal to $1\times10^{20}$ atoms/cm$^3$. The concentration of carbon can be measured by SIMS. The lower limit of the above concentration is the lower detection limit of SIMS.

As the insulator 130, a material in which the content of at least one of hydrogen, a hydrocarbon, and carbon is extremely low is suitably used. Significantly reducing the hydrocarbon content and the carbon content is especially important. Hydrocarbon molecules and carbon atoms, which are heavier than hydrogen, are difficult to remove in a later step. Therefore, it is preferable to thoroughly remove a hydrocarbon and carbon in the formation of the insulator 130.

When a material which at least contains none of hydrogen, a hydrocarbon, and carbon or in which the content of at least one of hydrogen, a hydrocarbon, and carbon is extremely low is used as the insulator 130 as described above, the insulator 130 can have improved crystallinity and high ferroelectricity.

When an impurity in the film of the insulator 130, which is at least one of hydrogen, a hydrocarbon, and carbon here, is thoroughly removed, a highly purified intrinsic film having ferroelectricity can be formed. In addition, a capacitor that includes a highly purified intrinsic film having ferroelectricity can be formed.

In the above-described manner, as the insulator 130, the ferroelectric layer is formed by a thermal ALD method using an oxidizer (typically $O_3$) and a precursor that does not contain a hydrocarbon (typically, a chlorine-based precursor). After that, the upper electrode 120*b* is formed with the substrate temperature set to, typically, higher than or equal to 400° C. Setting the substrate temperature to higher than or equal to 400° C. eliminates the need for performing heating for crystallization of the insulator 130 after the formation of the upper electrode 120*b*. In other words, the crystallinity or ferroelectricity of the insulator 130 can be improved by utilizing the temperature during the formation of the upper electrode 120*b*. Note that increasing the crystallinity or ferroelectricity of the insulator 130 by utilizing the temperature during the formation of the upper electrode 120*b* without performing heating after the formation of the upper electrode 120*b* is referred to as self-annealing, in some cases.

It is preferable that the insulator 130 be formed as a thin film by the above method. The thickness of the insulator 130 is preferably less than or equal to 100 nm, preferably less than or equal to 50 nm, further preferably less than or equal to 20 nm, still further preferably less than or equal to 10 nm. Combining the scaled-down transistor 11 with the thinned insulator 130 improves the degree of integration of a memory device. Hafnium oxide or a composite material of hafnium oxide and zirconium oxide is preferable because it can have ferroelectric even when being thinned to several nanometers.

A property of the ferroelectric material included in the insulator 130 is that internal polarization occurs by application of an electric field and is maintained even after the electric field is set to zero. Thus, a capacitor that includes the material as a dielectric can be a nonvolatile memory element. A capacitor that includes a ferroelectric material is sometimes referred to as a ferroelectric capacitor, and a nonvolatile memory element that includes a ferroelectric capacitor is sometimes referred to as a FeRAM (Ferroelectric Random Access Memory), a ferroelectric memory, or the like. That is, the memory cell MC can function as a ferroelectric memory.

Note that the insulator 130 preferably has a stacked-layer structure of a ferroelectric layer containing a ferroelectric material and a layer of a material having high dielectric strength. Examples of the material having high dielectric strength include silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, and a resin. When a layer of such an insulator having high dielectric strength is stacked with a ferroelectric layer, the dielectric strength is increased and a leakage current of the capacitor 10 can be reduced.

Next, the lower electrode 120*a* shown in FIG. 8B is described. The lower electrode 120*a* can be formed using a step and a material similar to those of the upper electrode 120*b*. That is, the lower electrode 120*a* can be formed by an ALD method. Unlike the upper electrode 120*b*, the lower electrode 120*a* is formed before the formation of the insulator 130; thus, the lower electrode 120*a* can also be formed by a sputtering method, a CVD method, or the like instead of an ALD method. The lower electrode 120*a* preferably contains titanium nitride.

The upper electrode 120*b* can have a single-layer structure or a stacked-layer structure that includes a conductive film. The lower electrode 120*a* can have a single-layer structure or a stacked-layer structure that includes a conductive film. The upper electrode 120*b* may have a stacked-layer structure of titanium nitride, aluminum, and copper. The lower electrode 120*a* may have a stacked-layer structure of titanium nitride, aluminum, and copper. The upper electrode 120*b* or the lower electrode 120*a* having a stacked-layer structure can inhibit leakage.

Figure 10A:
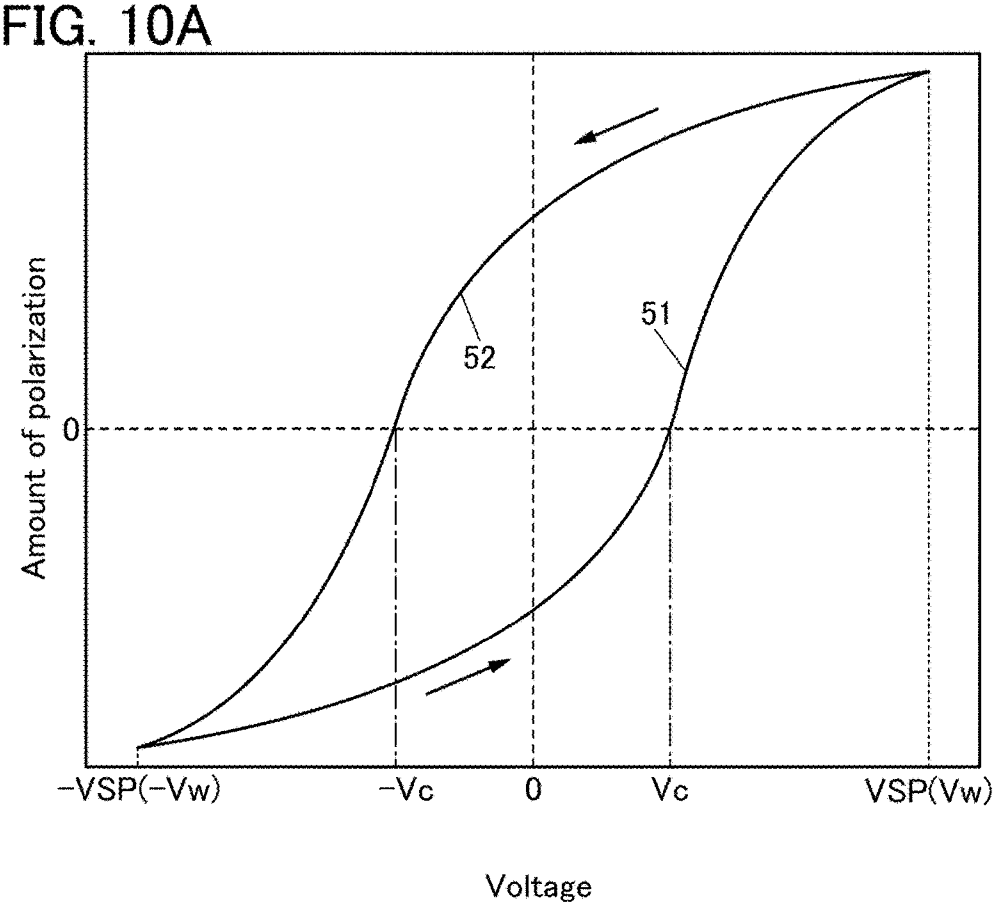
FIG. 10A is a graph showing hysteresis characteristics of a ferroelectric layer of the memory cell MC.

Next, FIG. 10A shows examples of the hysteresis characteristics of the ferroelectric layer. The horizontal axis in FIG. 10A represents the voltage applied to the ferroelectric layer.

The vertical axis in FIG. 10A represents the amount of polarization of the ferroelectric layer and shows that positive charge is biased to the one electrode of the capacitor 10 and negative charge is biased to the other electrode of the capacitor 10 when the amount of polarization has a positive value. In contrast, when the amount of polarization has a negative value, it shows that positive charge is biased to the other electrode of the capacitor 10 and negative charge is biased to the one electrode of the capacitor 10.

Note that the voltage represented by the horizontal axis of the graph of FIG. 10A may be the difference between the potential of the other electrode of the capacitor 10 and the potential of the one electrode of the capacitor 10. Moreover, the amount of polarization represented by the vertical axis of the graph of FIG. 10A may have a positive value when positive charge is biased to the other electrode of the capacitor 10 and negative charge is biased to the one electrode of the capacitor 10, and may have a negative value when positive charge is biased to the one electrode of the capacitor 10 and negative charge is biased to the other electrode of the capacitor 10.

As shown in FIG. 10A, the hysteresis characteristics of the ferroelectric layer can be represented by a curve 51 and a curve 52. Voltages at intersection points of the curve 51 and the curve 52 are referred to as VSP and −VSP. The polarities of VSP and −VSP can be said to be different.

After a voltage lower than or equal to −VSP is applied to the ferroelectric layer, the voltage applied to the ferroelectric layer is increased, so that the amount of polarization of the ferroelectric layer is increased according to the curve 51. In contrast, after a voltage higher than or equal to VSP is applied to the ferroelectric layer, the voltage applied to the ferroelectric layer is reduced, so that the amount of polarization of the ferroelectric layer is decreased according to the curve 52. Therefore, VSP and −VSP can be referred to as saturated polarization voltages. For example, VSP and −VSP may be called a first saturated polarization voltage and a second saturated polarization voltage, respectively. Although the absolute value of the first saturated polarization voltage and the absolute value of the second saturated polarization voltage are equal to each other in FIG. 10A, they may be different from each other.

Here, in the case where the amount of polarization of the ferroelectric layer is varied according to the curve 51, the voltage applied to the ferroelectric layer at the time when the amount of polarization of the ferroelectric layer is 0 is referred to as Vc. When the amount of polarization of the ferroelectric layer is varied according to the curve 52, the voltage applied to the ferroelectric layer at the time when the amount of polarization of the ferroelectric layer is 0 is referred to as −Vc. Vc and −Vc can be referred to as coercive voltages. The value of Vc and the value of −Vc can be values between −VSP and VSP. Note that Vc and −Vc may be called a first coercive voltage and a second coercive voltage, respectively. Although the absolute value of the first coercive voltage and the absolute value of the second coercive voltage are equal to each other in FIG. 10A, they may be different from each other. A lower coercive voltage allows the memory cell MC to operate at a low voltage.

As described above, the voltage applied to the ferroelectric layer included in the capacitor can be represented by the difference between the potential of the one electrode of the capacitor 10 and the potential of the other electrode of the capacitor 10. In addition, as described above, the other electrode of the capacitor 10 is electrically connected to the wiring PL. Thus, it is possible to control the voltage applied to the ferroelectric layer by controlling the potential of the wiring PL.

Figure 10B:
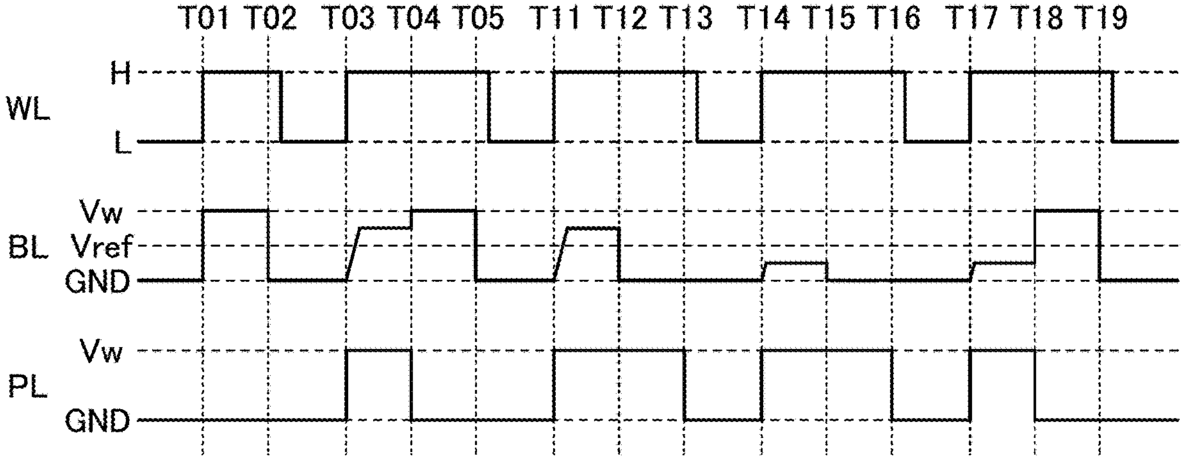
FIG. 10B is a diagram showing a driving method of the memory cell MC.

FIG. 10B illustrates an example of a method for driving the memory cell MC whose circuit structure is shown in FIG. 8A. In the following description, the voltage applied to the ferroelectric layer of the capacitor 10 represents the difference between the potential of the one electrode of the capacitor 10 and the potential of the other electrode of the capacitor 10 (the wiring PL). The polarity of the transistor 11 is an n-channel type.

FIG. 10B is a timing chart showing an example of a method for driving the memory cell MC in FIG. 8A. In the example shown in FIG. 10B, binary digital data is written to and read from the memory cell MC. Specifically, in the example shown in FIG. 10B, data "1" is written to the memory cell MC in the period from Time T01 to Time T02, reading and rewriting are performed in the period from Time T03 to Time T05, reading and writing of data "0" to the memory cell MC are performed in the period from Time T11 to Time T13, reading and rewriting are performed in the period from Tim T14 to Time T16, and reading and writing of data "1" to the memory cell MC are performed in the period from Time T17 to Time T19.

The sense amplifier SA electrically connected to the wiring BL is supplied with Vref as a reference potential. In the reading operation shown in FIG. 10B, when the potential of the wiring BL is higher than Vref, data "1" is read by the column circuit. On the other hand, when the potential of the wiring BL is lower than Vref, data "0" is read by the column circuit.

In the period from Time T01 to Time T02, the potential of the wiring WL is set to a high potential. Thus, the transistor 11 is brought into an on state. In addition, the potential of the wiring BL is set to Vw. Since the transistor 11 is in an on state, the potential of the one electrode of the capacitor 10 becomes Vw. Furthermore, the potential of the wiring PL is set to GND. Thus, the voltage applied to the ferroelectric layer of the capacitor 10 becomes "Vw-GND". Accordingly, data "1" can be written to the memory cell MC. Consequently, the period from Time T01 to Time T02 can be referred to as a write operation period.

Here, Vw is preferably higher than or equal to VSP, and is preferably equal to VSP, for example. GND can be set to the ground potential, for example; however, GND is not necessarily the ground potential as long as the memory cell MC can be driven enough to achieve an object of one embodiment of the present invention. For example, when the absolute value of the first saturated polarization voltage and the absolute value of the second saturated polarization voltage are different from each other and the absolute value of the first coercive voltage and the absolute value of the second coercive voltage are different from each other, GND can be a potential other than the ground potential.

In the period from Time T02 to Time T03, the potential of the wiring BL and the potential of the wiring PL are each set to GND. Accordingly, the voltage applied to the ferroelectric layer of the capacitor 10 becomes 0 V. Since the voltage "Vw-GND" applied to the ferroelectric layer of the capacitor 10 can be higher than or equal to VSP in the period from Time T01 to Time T02, the amount of polarization of the ferroelectric layer of the capacitor 10 is varied according to the curve 52 shown in FIG. 10A in the period from Time T02 to Time T03. Thus, no polarization inversion occurs in the ferroelectric layer of the capacitor 10 in the period from Time T02 to Time T03.

After the potential of the wiring BL and the potential of the wiring PL are set to GND, the potential of the wiring WL is set to a low potential. Accordingly, the transistor 11 is brought into an off state. Thus, the writing operation is completed and the data "1" is retained in the memory cell MC. Note that the potentials of the wiring BL and the wiring PL can each be any potential as long as no polarization inversion occurs in the ferroelectric layer of the capacitor 10, i.e., the voltage applied to the ferroelectric layer of the capacitor 10 is higher than or equal to −Vc that is the second coercive voltage.

In the period from Time T03 to Time T04, the potential of the wiring WL is set to a high potential. Thus, the transistor 11 is brought into an on state. Furthermore, the potential of the wiring PL is set to Vw. With the potential of the wiring PL set to Vw, the voltage applied to the ferroelectric layer of the capacitor 10 becomes "GND-Vw". As described above, the voltage applied to the ferroelectric layer of the capacitor 10 is "Vw-GND" in the period from Time T01 to Time T02. Accordingly, polarization inversion occurs in the ferroelectric layer of the capacitor 10. At the time of the polarization inversion, a current flows through the wiring BL, whereby the potential of the wiring BL becomes higher than Vref. Thus, the column circuit can read the data "1" retained in the memory cell MC. Therefore, the period from Time T03 to Time T04 can be referred to as a read operation period. Note that although Vref is higher than GND and lower than Vw, Vref may be higher than Vw, for example.

Since the above-described reading is destructive reading, the data "1" retained in the memory cell MC is lost. Thus, the potential of the wiring BL is set to Vw and the potential of the wiring PL is set to GND in the period from Time T04 to Time T05. Thus, data "1" is rewritten to the memory cell MC. Consequently, the period from Time T04 to Time T05 can be referred to as a rewrite operation period.

The potential of the wiring BL and the potential of the wiring PL are set to GND in the period from Time T05 to Time T11. After that, the potential of the wiring WL is set to a low potential. Thus, the rewrite operation is completed, and the data "1" is retained in the memory cell MC.

The potential of the wiring WL is set to a high potential and the potential of the wiring PL is set to Vw in the period from Time T11 to Time T12. Since the data "1" is retained in the memory cell MC, the potential of the wiring BL becomes higher than Vref, and the data "1" retained in the memory cell MC is read. Accordingly, the period from Time T11 to Time T12 can be referred to as a read operation period.

The potential of the wiring BL is set to GND in the period from Time T12 to Time T13. Since the transistor 11 is in an on state, the potential of the one electrode of the capacitor 10 is GND. In addition, the potential of the wiring PL is Vw. Accordingly, the voltage applied to the ferroelectric layer of the capacitor 10 becomes "GND-Vw". Thus, data "0" can be written to the memory cell MC. Consequently, the period from Time T12 to Time T13 can be referred to as a write operation period.

In the period from Time T13 to Time T14, the potential of the wiring BL and the potential of the wiring PL are each set to GND. Accordingly, the voltage applied to the ferroelectric layer of the capacitor 10 becomes 0 V. Since the voltage "GND-Vw" applied to the ferroelectric layer of the capacitor 10 can be lower than or equal to −VSP in the period from Time T12 to Time T13, the amount of polarization of the ferroelectric layer of the capacitor 10 is varied according to the curve 51 shown in FIG. 10A in the period from Time T13 to Time T14. Thus, no polarization inversion occurs in the ferroelectric layer of the capacitor 10 in the period from Time T13 to Time T14.

After the potential of the wiring BL and the potential of the wiring PL are set to GND, the potential of the wiring WL is set to a low potential. Accordingly, the transistor 11 is brought into an off state. Thus, the writing operation is completed and the data "0" is retained in the memory cell MC. Note that the potentials of the wiring BL and the wiring PL can each be any potential as long as no polarization inversion occurs in the ferroelectric layer of the capacitor 10, i.e., the voltage applied to the ferroelectric layer of the capacitor 10 is lower than or equal to Vc that is the first coercive voltage.

In the period from Time T14 to Time T15, the potential of the wiring WL is set to a high potential. Thus, the transistor 11 is brought into an on state. Furthermore, the potential of the wiring PL is set to Vw. With the potential of the wiring PL set to Vw, the voltage applied to the ferroelectric layer of the capacitor 10 becomes "GND-Vw". As described above, the voltage applied to the ferroelectric layer of the capacitor 10 is "GND-Vw" in the period from Time T12 to Time T13. Accordingly, no polarization inversion occurs in the ferroelectric layer of the capacitor 10. Thus, the amount of current flowing through the wiring BL is smaller than that in the case where polarization inversion occurs in the ferroelectric layer of the capacitor 10. Accordingly, an increase in the potential of the wiring BL is smaller than that in the case where polarization inversion occurs in the ferroelectric layer of the capacitor 10; specifically, the potential of the wiring BL becomes lower than or equal to Vref. Consequently, the column circuit can read the data "0" retained in the memory cell MC. Therefore, the period from Time T14 to Time T15 can be referred to as a read operation period.

The potential of the wiring BL is set to GND in the period from Time T15 to Time T16. The potential of the wiring PL is Vw. Thus, data "0" is rewritten to the memory cell MC. Therefore, the period from Time T15 to Time T16 can be referred to as a rewrite operation period.

The potential of the wiring BL and the potential of the wiring PL are set to GND in the period from Time T16 to Time T17. After that, the potential of the wiring WL is set to a low potential. Thus, the rewrite operation is completed, and the data "0" is retained in the memory cell MC.

The potential of the wiring WL is set to a high potential and the potential of the wiring PL is set to Vw in the period from Time T17 to Time T18. Since the data "0" is retained in the memory cell MC, the potential of the wiring BL becomes lower than Vref, and the data "0" retained in the memory cell MC is read. Therefore, the period from Time T17 to Time T18 can be referred to as a read operation period.

The potential of the wiring BL is set to Vw in the period from Time T18 to Time T19. Since the transistor 11 is in an on state, the potential of the one electrode of the capacitor 10 becomes Vw. In addition, the potential of the wiring PL is set to GND. Accordingly, the voltage applied to the ferroelectric layer of the capacitor 10 becomes "Vw-GND". Thus, data "1" can be written to the memory cell MC. Therefore, the period from Time T18 to Time T19 can be referred to as a write operation period.

From Time T19, the potential of the wiring BL and the potential of the wiring PL are set to GND. Then, the potential of the wiring WL is set to a low potential. Thus, the write operation is completed, and the data "1" is retained in the memory cell MC. The memory cell MC that includes the ferroelectric layer can retain data by using two voltage values, e.g., VSP and –VSP. The memory cell MC can function as a nonvolatile memory which is capable of high-speed rewriting and the number of times of rewriting of which is greater than or equal to $10^{10}$ and less than or equal to $10^{12}$. The memory cell MC can operate at a low voltage.

Next, FIG. 11 shows cross-sectional structures of the memory cell MC. In the cross-sectional structures, the capacitor 10 is placed above the transistor 11.

Figure 11A:
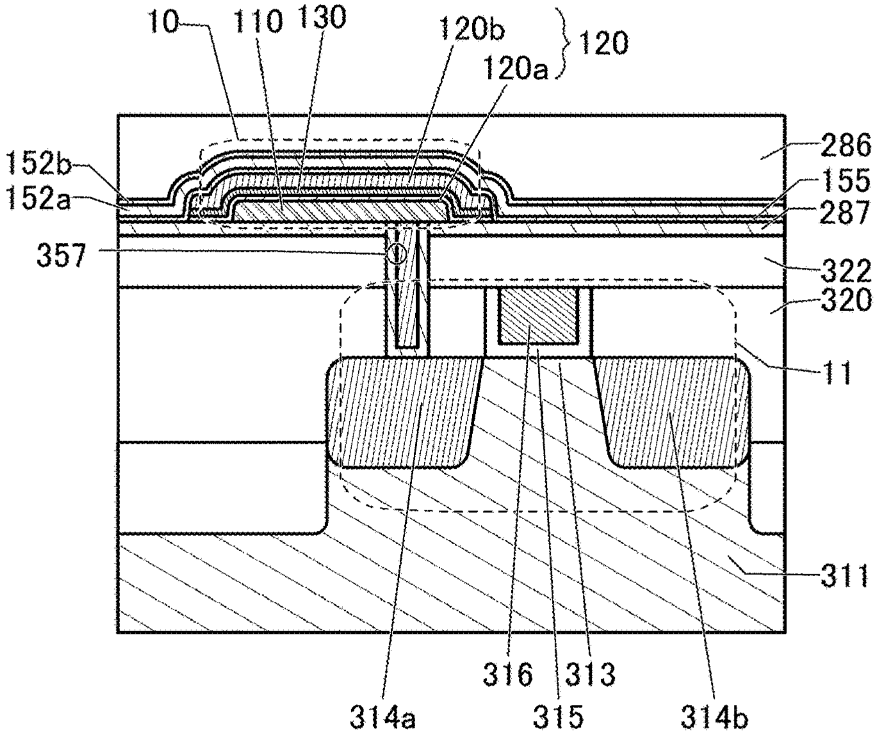
FIG. 11A and FIG. 11B are diagrams showing cross-sectional views of the memory cell MC.

The transistor 11 shown in FIG. 11A is provided on a substrate 311 and includes a conductor 316 functioning as a gate, an insulator 315 functioning as a gate insulator, a semiconductor region 313 formed of part of the substrate 311, and a low-resistance region 314*a* and a low-resistance region 314*b* functioning as a source region and a drain region. As the transistor 11, either a p-channel transistor or an n-channel transistor may be used.

In the transistor 11, the semiconductor region 313 (part of the substrate 311) where the channel is formed has a protruding shape. Thus, the conductor 316 can be provided to cover the side surface and top surface of the semiconductor region 313 with the insulator 315 positioned therebetween, in the channel width direction and the like. Such a transistor 11 is also referred to as a FIN-type transistor because it utilizes a protruding portion of a semiconductor substrate. Note that an insulator functioning as a mask for forming the protruding portion may be included in contact with an upper portion of the protruding portion. Furthermore, although the case where the protruding portion is formed by processing part of the semiconductor substrate is described here, a semiconductor film having a protruding shape may be formed by processing an SOI substrate.

Note that the transistor 11 is an example and the structure is not limited thereto; an appropriate transistor can be used in accordance with a circuit structure or a driving method.

A wiring layer provided with an interlayer film, a wiring, a plug, and the like may be provided between the transistor 11 and the capacitor 10. A plurality of wiring layers can be provided in accordance with design. Here, a plurality of conductors functioning as plugs or wirings are collectively denoted by the same reference numeral in some cases. In this specification and the like, a wiring and a plug electrically connected to the wiring may be formed continuously, without separating their formation steps. That is, part of a conductor functions as a wiring in some cases and part of a conductor functions as a plug in other cases.

For example, an insulator 320 and an insulator 322 are sequentially stacked over the transistor 11 as interlayer films. Furthermore, an insulator 287 functioning as a barrier insulating film against hydrogen is preferably provided. The insulator 287 preferably contains silicon nitride or aluminum oxide. This is because silicon nitride or aluminum oxide has a good hydrogen-blocking property.

In the insulator 320, the insulator 322, and the insulator 287, a conductor 357 electrically connecting the capacitor 10 to the transistor 11, and the like are embedded. Note that the conductor 357 has a function of a plug, a function of a wiring, or functions of a plug and a wiring.

The insulators functioning as interlayer films may also function as planarization films that cover uneven shapes therebelow. For example, the top surface of the insulator 322 may be planarized by planarization treatment using a chemical mechanical polishing (CMP) method or the like to have improved planarity.

Figure 11B:
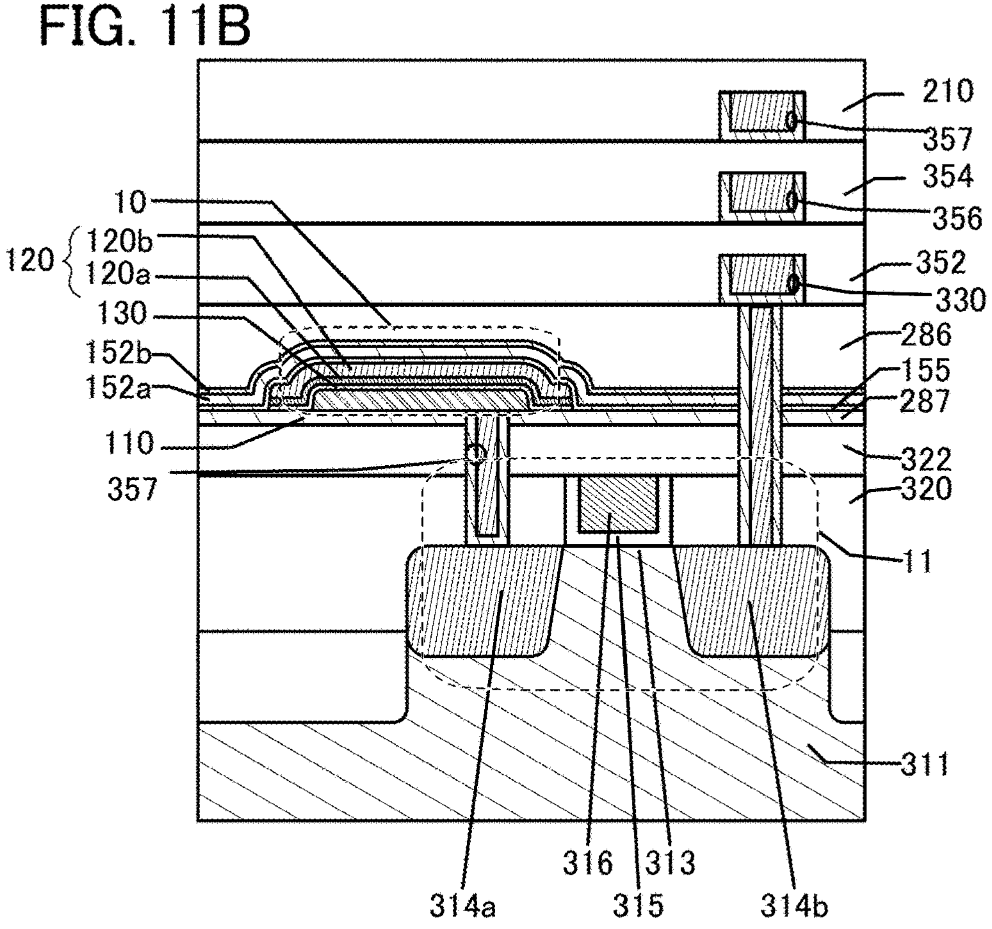

The wiring layer may be provided over the capacitor 10. In FIG. 11B, a conductor 330, a conductor 356, and the conductor 357 as the wiring layers are provided over the capacitor 10. An insulator 352 is provided to cover the conductor 330. An insulator 354 is provided to cover the conductor 356. An insulator 210 is provided to cover the conductor 357. The wiring layer has a multilayer structure that includes two or more conductors.

The wiring layer may be provided between the transistor 11 and the capacitor 10. For example, in FIG. 12, the wiring layer can be provided in the following manner: the insulator 320 and the insulator 322 are formed, a conductor 328 is embedded to form part of the wiring layer, an insulator 324 and an insulator 326 are formed, the conductor 330 is embedded to form another part of the wiring layer, an insulator 350, the insulator 352, and the insulator 354 are formed, the conductor 356 is embedded to form another part of the wiring layer, the insulator 210 and the insulator 287 are formed, and the conductor 357 is embedded to form another part of the wiring layer. The insulator 287 preferably functions as a barrier insulating film against hydrogen. In the wiring layer, four layers of conductors are stacked. The conductor 328, the conductor 330, the conductor 356, and the conductor 357 each have a function of a plug, a function of a wiring, or functions of a plug and a wiring.

Examples of the above-described insulator include an insulating oxide, an insulating nitride, an insulating oxynitride, an insulating nitride oxide, an insulating metal oxide, an insulating metal oxynitride, and an insulating metal nitride oxide.

When a material with a low dielectric constant is used for the above insulator, the parasitic capacitance between wirings can be reduced. Thus, a material is preferably selected depending on the function of the insulator.

The above insulator preferably includes an insulator with a low dielectric constant. For example, the insulator preferably includes silicon oxide to which fluorine is added, silicon oxide to which carbon is added, silicon oxide to which carbon and nitrogen are added, porous silicon oxide, a resin, or the like. Alternatively, the insulator preferably has a stacked-layer structure of a resin and silicon oxide, silicon oxynitride, silicon nitride oxide, silicon nitride, silicon oxide to which fluorine is added, silicon oxide to which carbon is added, silicon oxide to which carbon and nitrogen are added, or porous silicon oxide. When silicon oxide and silicon oxynitride, which are thermally stable, are combined with a resin, the stacked-layer structure can have thermal stability and a low dielectric constant. Examples of the resin include polyester, polyolefin, polyamide (nylon, aramid, or the like), polyimide, polycarbonate, and acrylic.

The conductor can be used as the wiring or the plug. For the conductor, a material containing one or more kinds of metal elements selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, and the like can be used. Alternatively, a semiconductor having high electrical conductivity, typified by polycrystalline silicon containing an impurity element such as phosphorus, or a silicide such as nickel silicide may be used.

For example, for the above conductor, a single layer or stacked layers of a conductive material such as a metal material, an alloy material, a metal nitride material, or a metal oxide material that is formed using the above material can be used. It is preferable to use a high-melting-point material that has both heat resistance and conductivity, such as tungsten or molybdenum, and it is preferable to use tungsten. Alternatively, a low-resistance conductive material such as aluminum or copper is preferably used. The use of a low-resistance conductive material can reduce wiring resistance.

Figure 12:
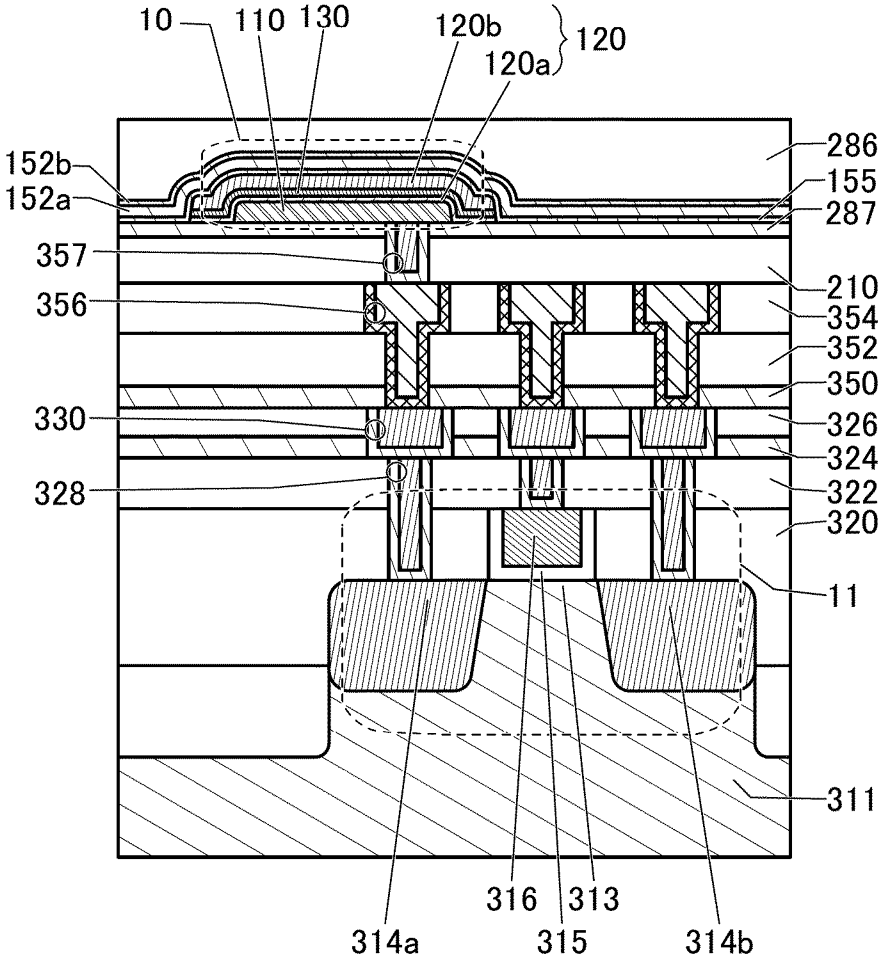
FIG. 12 is a diagram showing a cross-sectional view of the memory cell MC.

In the capacitor 10 shown in FIG. 11A, FIG. 11B, and FIG. 12, the upper electrode 120*b* is formed by a method with substrate heating, such as a thermal ALD method, whereby the ferroelectricity of the insulator 130 can be enhanced even without performing high-temperature baking after the formation. Therefore, since a semiconductor device can be manufactured without performing high-temperature baking, it is possible to use a low-resistance conductive material with a low melting point, such as copper.

The top surface of the conductor 357 is in contact with the bottom surface of a conductor 110. The top surface of the conductor 110 is in contact with at least the bottom surface of the lower electrode 120*a* of the capacitor 10. In this manner, the lower electrode 120*a* functioning as the lower electrode of the capacitor 10 and the low-resistance region 314*a* functioning as one of the source and the drain of the transistor 11 are electrically connected to each other through at least the conductor 357.

In the memory device shown in FIG. 11A, FIG. 11B, and FIG. 12, the capacitor 10 is sealed with the insulator 287 that is provided below the capacitor 10 and an insulator 152*a* and an insulator 152*b* that are provided above the capacitor 10. Diffusion of hydrogen to the capacitor from outside of the insulator 287 and the insulator 152*b* can be inhibited to reduce the hydrogen concentration of the insulator 130 of the capacitor 10 or to maintain the state with the reduced hydrogen concentration. Therefore, the ferroelectricity of the insulator 130 can be enhanced. The insulator 152*a* and the insulator 152*b* each preferably contain silicon nitride or aluminum oxide.

An insulator 155 is preferably provided below the insulator 152*a*. As the insulator 155, an insulator having a function of capturing and fixing hydrogen is preferably used. For example, aluminum oxide or the like is preferably used. When such an insulator 155 is provided to cover the capacitor 10, hydrogen contained in the insulator 130 of the capacitor 10 can be captured and fixed and the hydrogen concentration in the insulator 130 can be reduced. In that case, the ferroelectricity of the insulator 130 can be enhanced. Moreover, a leakage current between the conductor 110 and a conductor 120 can be reduced. Note that the structure is not limited thereto, and the insulator 155 may be omitted.

In FIG. 11A, FIG. 11B, and FIG. 12, an insulator 286 is further provided to cover the insulator 152*b*. The insulator 286 can contain the same material as the insulator 320 and the insulator 322.

The memory cell MC having the cross-sectional structure shown in any of FIG. 11A, FIG. 11B, and FIG. 12 enables a higher degree of integration, higher-speed driving, higher endurance, or lower power consumption of memory circuits.

At least part of the structure, method, and the like described in this embodiment can be implemented in appropriate combination with any of the other embodiments, the other examples, and the like described in this specification.

Embodiment 3

In this embodiment, an example of a secondary battery to be protected using the control circuit of one embodiment of the present invention is described.

Structure Example 1 of Secondary Battery

Hereinafter, a secondary battery in which a positive electrode, a negative electrode, and an electrolyte solution are wrapped in an exterior body is described as an example.

[Positive Electrode]

The positive electrode includes a positive electrode active material layer and a positive electrode current collector. The positive electrode active material layer includes a positive electrode active material, and may include a conductive material and a binder.

Examples of the positive electrode active material include a composite oxide with an olivine crystal structure, a composite oxide with a layered rock-salt crystal structure, and a composite oxide with a spinel crystal structure. For example, a compound such as $LiFePO_4$, $LiFeO_2$, $LiNiO_2$, $LiMn_2O_4$, $V_2O_5$, $Cr_2O_5$, or $MnO_2$ can be used.

A material with the layered rock-salt crystal structure, such as lithium cobalt oxide ($LiCoO_2$), is known to have a high discharging capacity and excel as a positive electrode active material of a secondary battery. As an example of the material with the layered rock-salt crystal structure, a composite oxide represented by $LiMO_2$ is given. As an example of the element M, one or more elements selected from Co, Ni, and Mn can be given. As another example of the element M, in addition to one or more elements selected from Co, Ni, and Mn, one or more elements selected from Al and Mg can be given.

As a positive electrode active material, it is preferable to add lithium nickel oxide ($LiNiO_2$ or $LiNi_{1-x}M_xO_2$ ($0<x<1$) (M=Co, Al, or the like)) to a lithium-containing material with a spinel crystal structure which contains manganese, such as $LiMn_2O_4$, because the secondary battery including such a material can have improved characteristics.

As the positive electrode active material, a lithium-manganese composite oxide that can be represented by a composition formula $Li_aMn_bM_cO_d$ can be used. Here, the element M is preferably silicon, phosphorus, or a metal element other than lithium and manganese, further preferably nickel. In the case where the whole particles of a lithium-manganese composite oxide are measured, it is preferable to satisfy the following at the time of discharging: $0<a/(b+c)<2$; $c>0$; and $0.26\leq(b+c)/d<0.5$. Note that the proportions of metals, silicon, phosphorus, and other elements in the whole particles of a lithium-manganese composite oxide can be measured with, for example, an ICP-MS (inductively coupled plasma mass spectrometer). The proportion of oxygen in the whole particles of a lithium-manganese composite oxide can be measured by, for example, EDX (energy dispersive X-ray spectroscopy). Alternatively, the proportion of oxygen can be measured by ICPMS combined with fusion gas analysis and valence evaluation of XAFS (X-ray absorption fine structure) analysis. Note that the lithium-manganese composite oxide is an oxide containing at least lithium and manganese, and may contain at least one selected from chromium, cobalt, aluminum, nickel, iron, magnesium, molybdenum, zinc, indium, gallium, copper, titanium, niobium, silicon, phosphorus, and the like.

[Negative Electrode]

The negative electrode includes a negative electrode active material layer and a negative electrode current collector. The negative electrode active material layer may contain a conductive material and a binder.

As the negative electrode active material, for example, at least one of an alloy-based material, a carbon-based material, and the like can be used.

For the negative electrode active material, an element that enables charging and discharging reactions by an alloying reaction and a dealloying reaction with lithium can be used. For example, a material containing at least one of silicon, tin, gallium, aluminum, germanium, lead, antimony, bismuth, silver, zinc, cadmium, indium, and the like can be used. Such elements have higher capacity than carbon. In particular, silicon has a high theoretical capacity of 4200 mAh/g. For this reason, silicon is preferably used for the negative electrode active material. Alternatively, a compound containing any of the above elements may be used. Examples of the compound include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn. Here, an element that enables charging and discharging reactions by an alloying reaction and a dealloying reaction with lithium, a compound containing the element, and the like may be referred to as an alloy-based material.

In this specification and the like, SiO refers, for example, to silicon monoxide. Note that SiO can alternatively be expressed as $SiO_x$. Here, x preferably has an approximate value of 1. For example, x is preferably greater than or equal to 0.2 and less than or equal to 1.5, further preferably greater than or equal to 0.3 and less than or equal to 1.2.

As the carbon-based material, graphite, graphitizing carbon (soft carbon), non-graphitizing carbon (hard carbon), carbon nanotube, graphene, carbon black, or the like can be used.

Examples of graphite include artificial graphite and natural graphite. Examples of artificial graphite include mesocarbon microbeads (MCMB), coke-based artificial graphite, and pitch-based artificial graphite. As artificial graphite, spherical graphite having a spherical shape can be used. For example, MCMB is preferably used because it may have a spherical shape. Moreover, MCMB may preferably be used because it can relatively easily have a small surface area. Examples of natural graphite include flake graphite and spherical natural graphite.

Graphite has a low potential substantially equal to that of a lithium metal (higher than or equal to 0.05 V and lower than or equal to 0.3 V vs. $Li/Li^+$) when lithium ions are inserted into graphite (while a lithium-graphite intercalation compound is formed). For this reason, a lithium-ion secondary battery can have a high operating voltage. In addition, graphite is preferred because of its advantages such as a relatively high capacity per unit volume, relatively small volume expansion, low cost, and a higher level of safety than that of a lithium metal.

As the negative electrode active material, an oxide such as titanium dioxide ($TiO_2$), lithium titanium oxide ($Li_4Ti_5O_{12}$), a lithium-graphite intercalation compound ($Li_xC_6$), niobium pentoxide ($Nb_2O_5$), tungsten oxide ($WO_2$), or molybdenum oxide ($MoO_2$) can be used.

Alternatively, as the negative electrode active material, $Li_{3-x}M_xN$ (M is Co, Ni, or Cu) with a $Li_3N$ structure, which is a composite nitride containing lithium and a transition metal, can be used. For example, $Li_{2.6}Co_{0.4}N_3$ is preferable because of high charging and discharging capacity (900 mAh/g and 1890 $mAh/cm^3$).

A composite nitride containing lithium and a transition metal is preferably used, in which case lithium ions are contained in the negative electrode active material and thus the negative electrode active material can be used in combination with a material for a positive electrode active material that does not contain lithium ions, such as $V_2O_5$ or $Cr_3O_8$. Note that in the case of using a material containing lithium ions as a positive electrode active material, the composite nitride containing lithium and a transition metal can be used as the negative electrode active material by extracting the lithium ions contained in the positive electrode active material in advance.

Alternatively, a material that causes a conversion reaction can be used for the negative electrode active material; for example, a transition metal oxide that does not form an alloy with lithium, such as cobalt oxide (CoO), nickel oxide (NiO), or iron oxide (FeO), may be used as the negative electrode active material. Other examples of the material that causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

For the conductive material and the binder that can be included in the negative electrode active material layer, materials similar to those of the conductive material and the binder that can be included in the positive electrode active material layer can be used.

[Current Collector]

A material that is not alloyed with carrier ions of lithium or the like is preferably used for the positive electrode current collector and the negative electrode current collector. For the current collectors, aluminum, copper, titanium, or the like can be used.

[Electrolyte]

As the electrolyte, a solution containing a solvent and a salt can be used. As the solvent, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, ethyl acetate, methyl propionate, ethyl propionate, propyl propionate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination at an appropriate ratio.

Alternatively, the use of one or more ionic liquids (room temperature molten salts) that are unlikely to burn and volatize as the solvent can prevent a secondary battery from exploding or catching fire even when the secondary battery internally shorts out or the internal temperature increases owing to overcharging or the like. An ionic liquid contains a cation and an anion, specifically, an organic cation and an anion. Examples of the organic cation used for the electrolyte solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolyte solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

As the salt dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2Bi_2Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9S_{02})(CF_3SO_2)$, and $LiN(C_2F_5SO_2)_2$ can be used, or two or more of these lithium salts can be used in an appropriate combination at an appropriate ratio.

The solution that is used as the electrolyte used for the secondary battery is preferably a highly purified solution in which the contents of dust particles and elements other than the constituent elements of the electrolyte solution (hereinafter, also simply referred to as impurities) are low. Specifically, the weight ratio of impurities to the solution is preferably less than or equal to 1%, further preferably less than or equal to 0.1%, still further preferably less than or equal to 0.01%.

Furthermore, an additive agent such as vinylene carbonate, propane sultone (PS), tert-butylbenzene (TBB), fluoroethylene carbonate (FEC), lithium bis(oxalate)borate (LiBOB), or a dinitrile compound such as succinonitrile or adiponitrile may be added to the solution. The concentration of the material to be added in the whole solvent is, for example, higher than or equal to 0.1 wt % and lower than or equal to 5 wt %.

Alternatively, a polymer gel electrolyte obtained by swelling a polymer with a solution may be used.

When a polymer gel electrolyte is used, safety against liquid leakage and the like is improved. Moreover, the secondary battery can be thinner and more lightweight.

As a polymer that undergoes gelation, a silicone gel, an acrylic gel, an acrylonitrile gel, a polyethylene oxide-based gel, a polypropylene oxide-based gel, a fluorine-based polymer gel, or the like can be used.

Examples of the polymer include a polymer having a polyalkylene oxide structure, such as polyethylene oxide (PEO); PVDF; polyacrylonitrile; and a copolymer containing any of them. For example, PVDF-HFP, which is a copolymer of PVDF and hexafluoropropylene (HFP), can be used. The formed polymer may be porous.

Instead of the electrolyte solution, a solid electrolyte including an inorganic material such as a sulfide-based or oxide-based inorganic material, or a solid electrolyte including a polymer material such as a polyethylene oxide (PEO)-based polymer material may alternatively be used. When a solid electrolyte is used, the need for providing at least one of a separator and a spacer is eliminated. Furthermore, the battery can be entirely solidified; therefore, there is no possibility of liquid leakage and thus the safety of the battery is dramatically improved.

As the electrolyte, a solid electrolyte can be used. As a solid electrolyte, a sulfide-based solid electrolyte, an oxide-based solid electrolyte, or a halide-based solid electrolyte can be used, for example.

Examples of the sulfide-based solid electrolyte include a thio-LISICON-based material (e.g., $Li_{10}GeP_2S_{12}$ and $Li_{3.25}Ge_{0.25}P_{0.75}S_4$), sulfide glass (e.g., $70Li_2S \cdot 30P_2S_5$, $30Li_2S \cdot 26B_2S_3 \cdot 44LiI$, $63Li_2S \cdot 36SiS_2 \cdot 1Li_3PO_4$, $57Li_2S_3 \cdot 8SiS_2 \cdot 5Li_4SiO_4$, and $50Li_2S \cdot 50GeS_2$), and sulfide-based crystallized glass (e.g., $Li_7P_3S_{11}$ and $Li_{3.25}P_{0.95}S_4$). The sulfide-based solid electrolyte has advantages such as high conductivity of some materials, low-temperature synthesis, and ease of maintaining a path for electrical conduction after charging and discharging because of its relative softness.

Examples of the oxide-based solid electrolyte include a material with a perovskite crystal structure (e.g., $La_{2/3-x}Li_{3x}TiO_3$), a material with a NASICON crystal structure (e.g., $Li_{1-X}Al_XTi_{2-X}(PO_4)_3$), a material with a garnet crystal structure (e.g., $Li_7La_3Zr_2O_{12}$), a material with a LISICON crystal structure (e.g., $Li_{14}ZnGe_4O_{16}$), LLZO ($Li_7La_3Zr_2O_{12}$), oxide glass (e.g., $Li_3PO_4$—$Li_4SiO_4$ and $50Li_4SiO_4 \cdot 50Li_3BO_3$), and oxide-based crystallized glass (e.g., $Li_{1.07}Al_{0.69}Ti_{1.46}(PO_4)_3$ and $Li_{1.5}Al_{0.5}Ge_{1.5}(PO_4)_3$). The oxide-based solid electrolyte has an advantage of stability in the air.

Examples of the halide-based solid electrolyte include $LiAlCl_4$, $Li_3InBr_6$, LiF, LiCl, LiBr, and LiI. Moreover, a composite material in which pores of porous aluminum oxide or porous silica are filled with such a halide-based solid electrolyte can be used as the solid electrolyte.

Alternatively, different solid electrolytes may be mixed and used.

In particular, $Li_{1+x}Al_xTi_{2-x}(PO_4)_3$ ($0<x<1$) having a NASICON crystal structure (hereinafter, LATP) is preferable because LATP contains aluminum and titanium, each of which is the element the positive electrode active material used in the secondary battery of one embodiment of the present invention is allowed to contain, and thus a synergistic effect of improving the cycle performance is expected. Moreover, higher productivity due to the reduction in the number of steps is expected. Note that in this specification and the like, a material having a NASICON crystal structure refers to a compound that is represented by $M_2(XO_4)_3$ (M: transition metal; X: S, P, As, Mo, W, or the like) and has a structure in which $MO_6$ octahedrons and $XO_4$ tetrahedrons that share common corners are arranged three-dimensionally.

[Separator]

The secondary battery preferably includes a separator. The separator can be formed using, for example, paper, nonwoven fabric, glass fiber, ceramics, or synthetic fiber containing nylon (polyamide), vinylon (polyvinyl alcohol-based fiber), polyimide, polyester, acrylic, polyolefin, or polyurethane. The separator is preferably formed to have an envelope-like shape to wrap one of the positive electrode and the negative electrode.

The separator may have a multilayer structure. For example, an organic material film of polypropylene, polyethylene, or the like can be coated with a ceramic-based material, a fluorine-based material, a polyamide-based material, a mixture thereof, or the like. Examples of the ceramic-based material include aluminum oxide particles and silicon oxide particles. Examples of the fluorine-based material include PVDF and polytetrafluoroethylene. Examples of the polyamide-based material include nylon and aramid (meta-based aramid and para-based aramid).

When the separator is coated with the ceramic-based material, the oxidation resistance is improved; hence, deterioration of the separator in charging and discharging at a high voltage can be suppressed and thus the reliability of the secondary battery can be improved. When the separator is coated with the fluorine-based material, the separator is easily brought into close contact with an electrode, resulting in high output characteristics. When the separator is coated with the polyamide-based material, in particular, aramid, heat resistance is improved; thus, the safety of the secondary battery can be improved.

For example, both surfaces of a polypropylene film may be coated with a mixed material of aluminum oxide and aramid. Alternatively, a surface of a polypropylene film that is in contact with the positive electrode may be coated with a mixed material of aluminum oxide and aramid, and a surface of the polypropylene film that is in contact with the negative electrode may be coated with the fluorine-based material.

The use of a separator having a multilayer structure makes it possible to maintain the safety of the secondary battery even when the total thickness of the separator is small, so that the capacity per volume of the secondary battery can be increased.

[Exterior Body]

For the exterior body of the secondary battery, a metal material such as aluminum or a resin material can be used, for example. A film-like exterior body can also be used. As the film, for example, it is possible to use a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided over the metal thin film as the outer surface of the exterior body.

This embodiment can be used in appropriate combination with any of the other embodiments.

Embodiment 4

In this embodiment, details of a positive electrode active material of a secondary battery to be protected using the control circuit of one embodiment of the present invention are described.

It is preferable that the positive electrode active material of the secondary battery allow for charging at a high voltage. An increase in charging voltage can increase the energy density of the secondary battery. As a result, the duration time of the secondary battery can be increased. In addition, a high energy density can be achieved even with a small capacity, which can reduce the size and weight of an electronic device.

Using the control circuit of one embodiment of the present invention makes it possible to detect, control, or inhibit overcharging, overdischarging, a charging overcurrent, a discharging overcurrent, a short circuit current, cell balance, and the like. The control circuit of one embodiment of the present invention detects abnormality highly accurately. For example, in detection operation at the time of overcharging or overdischarging, the difference between the actual voltage of the secondary battery and the voltage set at design time can be extremely small. In a similar manner, the difference between the actual current of the secondary battery and the current set at design time can be extremely small.

Accordingly, even when a positive electrode active material that makes a charging voltage high and has excellent characteristics is used, the safety can be maintained by the control circuit of one embodiment of the present invention and the excellent characteristics of the positive electrode active material can be fully utilized.

The positive electrode active material will be described below.

[Structure of Positive Electrode Active Material]

As described in the above embodiment, a material with a layered rock-salt crystal structure, such as lithium cobalt oxide ($LiCoO_2$), is known to have a high discharging capacity and excel as a positive electrode active material of a secondary battery. As an example of the material with the layered rock-salt crystal structure, a composite oxide represented by $LiMO_2$ is given. As an example of the element M, one or more elements selected from Co, Ni, and Mn can be given. As another example of the element M, in addition to one or more elements selected from Co, Ni, and Mn, one or more elements selected from Al and Mg can be given.

It is known that the Jahn-Teller effect in a transition metal compound varies in degree according to the number of electrons in the d orbital of the transition metal.

In a compound containing nickel, distortion is likely to be caused because of the Jahn-Teller effect in some cases. Accordingly, in the case where high-voltage charging and discharging are performed on $LiNiO_2$, the crystal structure might be broken because of the distortion. It is suggested that the influence of the Jahn-Teller effect is small in $LiCoO_2$; hence, $LiCoO_2$ is preferable because its resistance to high-voltage charging and discharging is higher in some cases.

Figure 13:
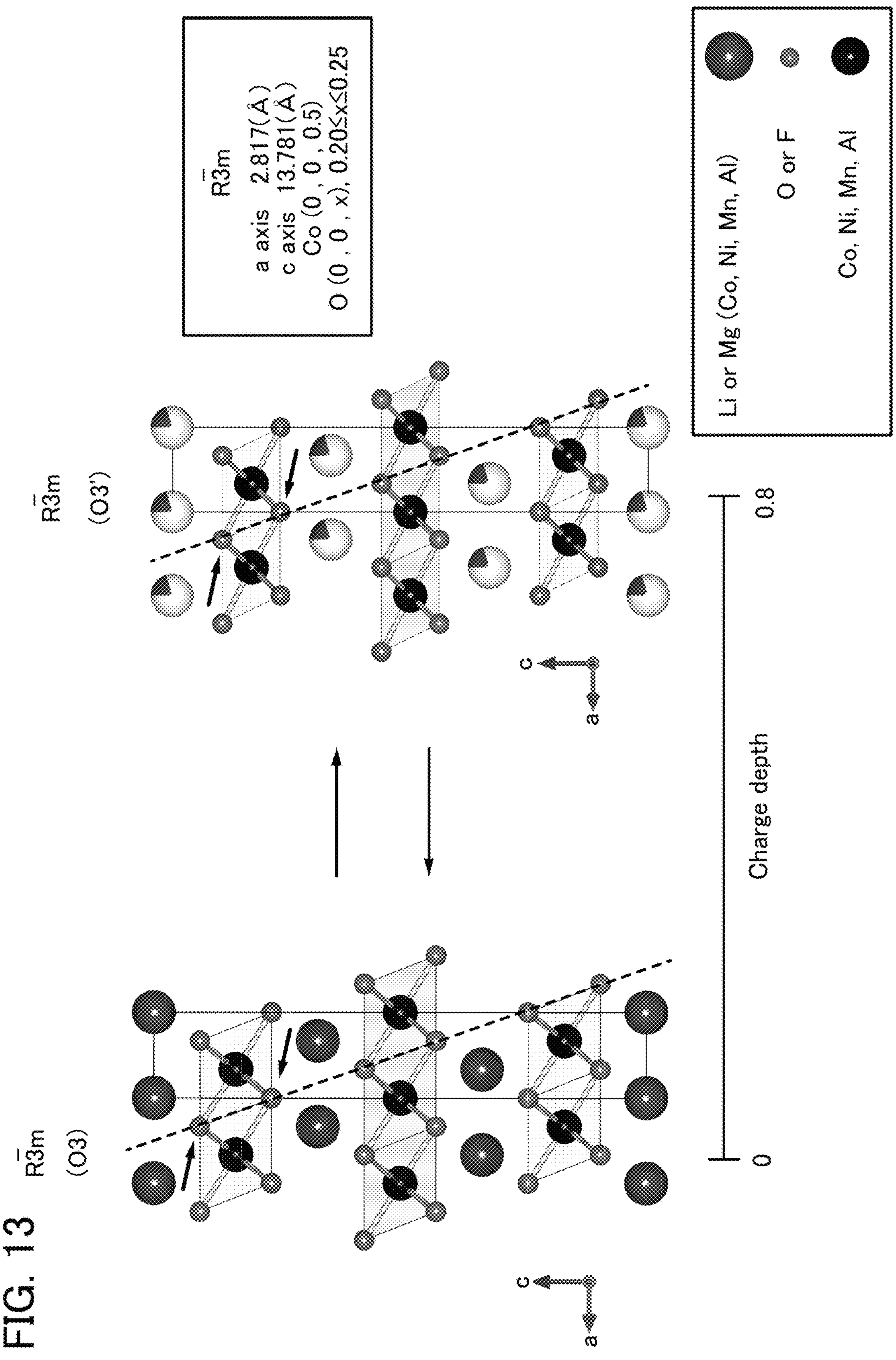
FIG. 13 is a diagram illustrating crystal structures of a positive electrode active material.
Figure 14:
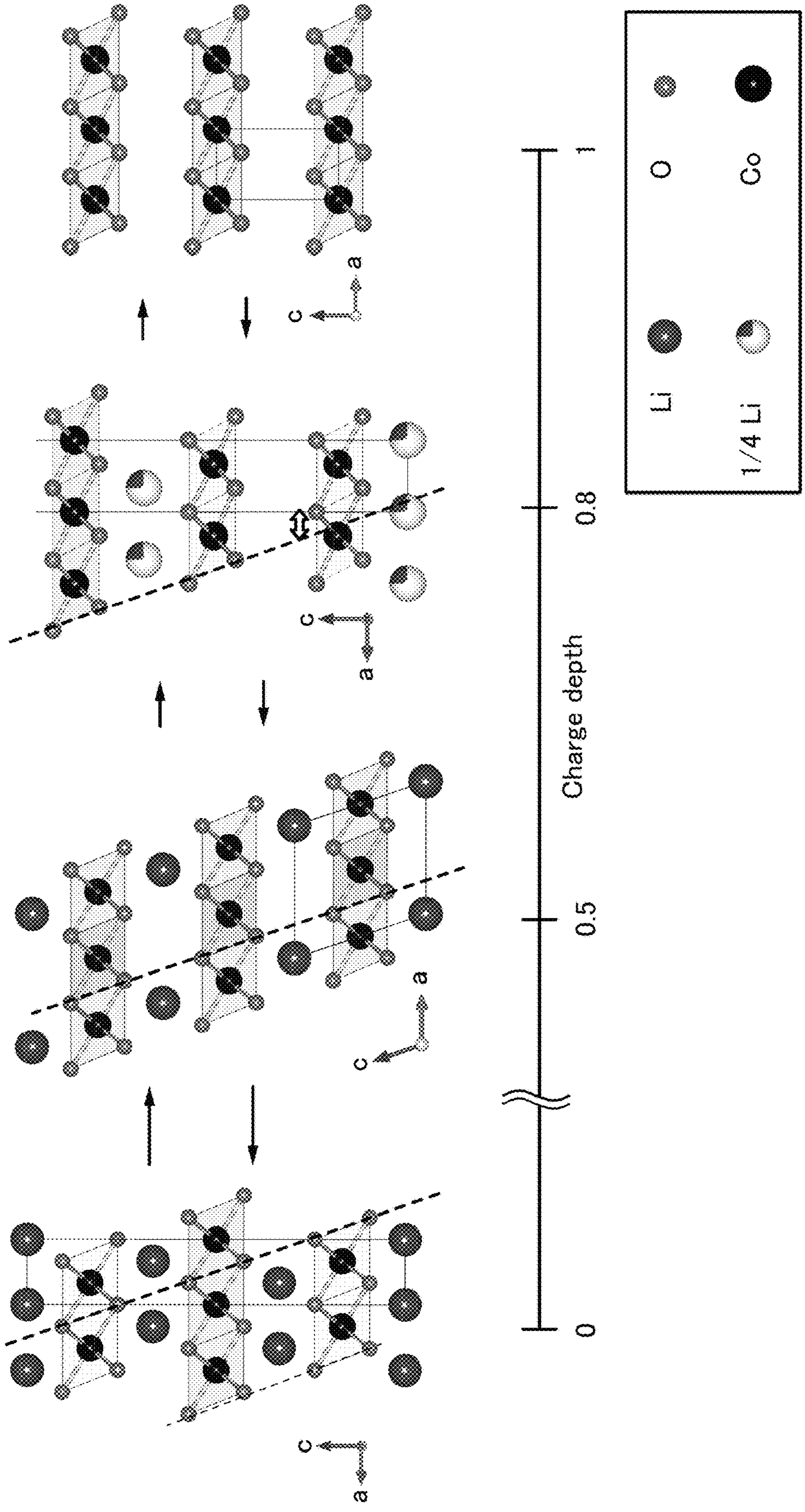
FIG. 14 is a diagram illustrating crystal structures of a positive electrode active material.

The structures and the like of positive electrode active materials are described with reference to FIG. 13 and FIG. 14. With reference to FIG. 13 and FIG. 14, the cases where cobalt is used as a transition metal contained in the positive electrode active materials are described.

The positive electrode active material shown in FIG. 14 is lithium cobalt oxide ($LiCoO_2$) to which a halogen and magnesium are not added, and the crystal structure of the lithium cobalt oxide changes depending on the charge depth. The change in the crystal structure is described with reference to FIG. 14.

As shown in FIG. 14, the lithium cobalt oxide with a charge depth of 0 (in a discharged state) includes a region having the crystal structure belonging to the space group R-3m, and includes three $CoO_2$ layers in a unit cell. Thus, this crystal structure is referred to as an O3 type crystal structure in some cases. Note that the $CoO_2$ layer has a structure in which an octahedral structure with cobalt coordinated to six oxygen atoms continues on a plane in the edge-sharing state.

The lithium cobalt oxide with a charge depth of 1 has the crystal structure belonging to the space group P-3m1 and includes one $CoO_2$ layer in a unit cell. Thus, this crystal structure is referred to as an O1 type crystal structure in some cases.

Moreover, the lithium cobalt oxide when the charge depth is approximately 0.88 has the crystal structure belonging to the space group R-3m. This structure can also be regarded as a structure in which $CoO_2$ structures such as P-3m1 (O1) and $LiCoO_2$ structures such as R-3m (O3) are alternately stacked. Thus, this crystal structure is referred to as an H1-3 type crystal structure in some cases. Note that the number of cobalt atoms per unit cell in the actual H1-3 type crystal structure is twice as large as that of cobalt atoms per unit cell in other structures. However, in this specification including FIG. 14, the c-axis of the H1-3 type crystal structure is described half that of the unit cell for easy comparison with the other structures.

For the H1-3 type crystal structure, the coordinates of cobalt and oxygen in the unit cell can be expressed as follows, for example: Co (0, 0, 0.42150±0.00016), $O_1$ (0, 0, 0.27671±0.00045), and $O_2$ (0, 0, 0.11535±0.00045). $O_1$ and $O_2$ are each an oxygen atom. In this manner, the H1-3 type crystal structure is represented by a unit cell that includes one cobalt atom and two oxygen atoms. Meanwhile, an O3' type crystal structure is preferably represented by a unit cell that includes one cobalt atom and one oxygen atom, as described later. This means that the symmetry of cobalt and oxygen differs between the O3' type crystal structure and the H1-3 type structure, and the amount of change from the O3 structure is smaller in the O3' type crystal structure than in the H1-3 type structure. A preferred unit cell for representing a crystal structure of a positive electrode active material is selected such that the value of GOF (good of fitness) is smaller in the Rietveld analysis of XRD, for example.

When charging at a high voltage of 4.6 V or higher based on the redox potential of a lithium metal or charging with a large charge depth of 0.8 or more and discharging are repeated, the crystal structure of the lithium cobalt oxide changes (i.e., an unbalanced phase change occurs) repeatedly between the H1-3 type crystal structure and the R-3m (O3) structure in a discharged state.

However, there is a large shift in the $CoO_2$ layers between these two crystal structures. As indicated by the dotted line and the arrows in FIG. 14, the $CoO_2$ layer in the H1-3 type crystal structure largely shifts from that in R-3m (O3). Such a dynamic structural change might adversely affect the stability of the crystal structure.

A difference in volume is also large. The O3 type crystal structure in a discharged state and the H1-3 type crystal structure that contain the same number of cobalt atoms have a difference in volume of more than or equal to 3.0%.

In addition, a structure in which $CoO_2$ layers are continuous, such as P-3m1 (O1), included in the H1-3 type crystal structure is highly likely to be unstable.

Thus, the repeated high-voltage charging and discharging break the crystal structure of the lithium cobalt oxide. The break of the crystal structure degrades the cycle performance. This is probably because the break of the crystal structure reduces sites where lithium can stably exist and makes it difficult to insert and extract lithium.

Next, in the positive electrode active material shown in FIG. 13, the shift in $CoO_2$ layers can be small in repeated high-voltage charging and discharging. Furthermore, the change in the volume can be small. Thus, the compound can enable excellent cycle performance. In addition, the compound can have a stable crystal structure in a high-voltage charged state. Thus, the compound inhibits a short circuit from occurring in the case where the high-voltage charged state is maintained; this is preferable because the safety is further improved.

The above-described positive electrode active material has a small change in the crystal structure and a small difference in volume per the same number of transition metal atoms between a sufficiently discharged state and a high-voltage charged state.

FIG. 13 shows the crystal structures before and after charging and discharging. The positive electrode active material is a composite oxide containing lithium, cobalt that is a transition metal, and oxygen. In addition to the above, the positive electrode active material preferably contains magnesium as an additive element. Furthermore, the positive electrode active material preferably contains a halogen such as fluorine or chlorine as an additive element.

The crystal structure with a charge depth of 0 (in the discharged state) in FIG. 13 belongs to R-3m (O3). This crystal structure is the same as that in FIG. 14. Meanwhile, in the case of a charge depth in a sufficiently charged state in FIG. 13, a crystal whose structure is different from the H1-3 type crystal structure shown in FIG. 14 is included. The crystal structure shown in FIG. 13 belongs to the space group R-3m, and is not a spinel crystal structure but a structure in which an ion of cobalt, magnesium, or the like is coordinated to six oxygen atoms and the cation arrangement has symmetry similar to that of the spinel crystal structure. The symmetry of $CoO_2$ layers in the crystal structure shown in FIG. 13 is the same as that in the O3 type structure. Thus, in this specification and the like, the crystal structure shown in FIG. 13 is referred to as the O3' type crystal structure or a pseudo-spinel crystal structure. Note that although the indication of lithium is omitted in the diagram of the O3' type crystal structure illustrated in FIG. 13 to explain the symmetry of cobalt atoms and the symmetry of oxygen atoms, less than or equal to 20 atomic % lithium, for example, with respect to cobalt practically exists between the $CoO_2$ layers. In addition, in both the O3 type crystal structure and the O3' type crystal structure, a slight amount of magnesium preferably exists between the $CoO_2$ layers, i.e., in lithium sites. In addition, a slight amount of halogen such as fluorine preferably exists in oxygen sites at random.

Note that in the O3' type crystal structure, a light element such as lithium is coordinated to four oxygen atoms in some cases; also in that case, the ion arrangement has symmetry similar to that of the spinel structure.

The O3' type crystal structure can also be regarded as a crystal structure that contains Li between layers at random but is similar to a $CdCl_2$ crystal structure. The crystal structure similar to the $CdCl_2$ crystal structure is close to a crystal structure of lithium nickel oxide when charged up to a charge depth of 0.94 ($Li_{0.06}NiO_2$); however, pure lithium cobalt oxide or a layered rock-salt positive electrode active material containing a large amount of cobalt is known not to have this crystal structure in general.

In the above-described positive electrode active material, a change in the crystal structure when high-voltage charging is performed and a large amount of lithium is released is more inhibited than in a positive electrode active material not containing magnesium or the like. As indicated by the dotted lines in FIG. 13, for example, $CoO_2$ layers hardly shift between the crystal structures.

More specifically, the structure of the positive electrode active material shown in FIG. 13 is highly stable even when a charging voltage is high. For example, the positive electrode active material in FIG. 14 that does not contain magnesium or the like has the H1-3 type crystal structure at a charging voltage of approximately 4.6 V with reference to the potential of a lithium metal; however, the positive electrode active material shown in FIG. 13 can maintain the crystal structure belonging to R-3m (O3) even at the charging voltage of approximately 4.6 V. The positive electrode active material shown in FIG. 13 can have the O3' crystal structure even at a higher charging voltage, e.g., approximately 4.65 V to 4.7 V with reference to the potential of a lithium metal. When the charging voltage is further increased to be higher than 4.7 V, sometimes the H1-3 type crystal is eventually observed in the positive electrode active material shown in FIG. 13. In addition, the positive electrode active material shown in FIG. 13 might have the O3' type crystal structure even at a lower charging voltage, e.g., a charging voltage of higher than or equal to 4.5 V and lower than 4.6 V with reference to the potential of a lithium metal.

Note that in the case where graphite is used as a negative electrode active material in a secondary battery, for example, the voltage of the secondary battery is lower than the above-mentioned voltages by the difference between the potential of graphite and the potential of a lithium metal. The potential of graphite is approximately 0.05 V to 0.2 V with reference to the potential of a lithium metal. Thus, even in a secondary battery that contains graphite as a negative electrode active material and has a voltage of higher than or equal to 4.3 V and lower than or equal to 4.5 V, for example, the positive electrode active material shown in FIG. 13 can maintain the crystal structure belonging to R-3m (O3) and moreover, can have the O3' type crystal structure at higher voltages, e.g., a voltage of the secondary battery of higher than 4.5 V and lower than or equal to 4.6 V. In addition, the positive electrode active material shown in FIG. 13 can have the O3' type crystal structure at lower charging voltages, e.g., at a voltage of the secondary battery of higher than or equal to 4.2 V and lower than 4.3 V, in some cases.

Thus, in the positive electrode active material shown in FIG. 13, the crystal structure is less likely to be broken even when charging and discharging are repeated at a high voltage.

In the positive electrode active material, a difference in the volume per unit cell between the O3 type crystal structure with a charge depth of 0 and the O3' type crystal structure with a charge depth of approximately 0.8 is less than or equal to 2.5%, more specifically, less than or equal to 2.2%.

In the unit cell of the O3' type crystal structure, coordinates of cobalt and oxygen can be represented by Co (0, 0, 0.5) and O (0, 0, x) within the range of $0.20 \le x \le 0.25$.

A slight amount of additive element such as magnesium randomly existing between the $CoO_2$ layers, i.e., in lithium sites, has an effect of inhibiting a shift in the $CoO_2$ layers. Thus, when magnesium exists between the $CoO_2$ layers, the O3' type crystal structure is likely to be formed. Therefore, magnesium is preferably distributed throughout a particle of the positive electrode active material. In addition, to distribute magnesium throughout the particle, heat treatment is preferably performed in the formation process of the positive electrode active material.

However, cation mixing occurs when the heat treatment temperature is excessively high, so that an additive element such as magnesium is highly likely to enter the cobalt sites. Magnesium in the cobalt sites does not have the effect of maintaining the R-3m structure in high-voltage charging. Furthermore, heat treatment at an excessively high temperature might have an adverse effect; for example, cobalt might be reduced to have a valence of two or lithium might be evaporated.

In view of the above, a halogen compound such as a fluorine compound is preferably added to lithium cobalt oxide before the heat treatment for distributing magnesium throughout the particle. The addition of the halogen compound decreases the melting point of the lithium cobalt oxide. The decrease in the melting point makes it easier to distribute magnesium throughout the particle at a temperature at which the cation mixing is less likely to occur. Furthermore, it is expected that the existence of the fluorine compound can improve corrosion resistance to hydrofluoric acid generated by decomposition of an electrolyte solution.

When the magnesium concentration is higher than or equal to a predetermined value, the effect of stabilizing a crystal structure becomes small in some cases. This is probably because magnesium enters the cobalt sites in addition to the lithium sites. The number of magnesium atoms contained in the positive electrode active material is preferably 0.001 to 0.1 times, preferably greater than 0.01 times and less than 0.04 times, still further preferably approximately 0.02 times the number of transition metal atoms. The magnesium concentration described here may be a value obtained by element analysis on all the particles of the positive electrode active material using ICP-MS or the like, or may be a value based on the ratio of the raw materials mixed in the formation process of the positive electrode active material, for example.

To lithium cobalt oxide, as a metal other than cobalt (an additive element), one or more metals selected from nickel, aluminum, manganese, titanium, vanadium, and chromium may be added, for example, and in particular, at least one of nickel and aluminum is preferably added. In some cases, manganese, titanium, vanadium, and chromium are likely to have a valence of four stably and thus contribute highly to structural stability. The addition of the additive element may enable the positive electrode active material to have a more stable crystal structure in high-voltage charging, for example. Here, in the positive electrode active material, the additive element is preferably added at a concentration at which the crystallinity of the lithium cobalt oxide is not greatly changed. For example, the additive element is preferably added in an amount with which the aforementioned Jahn-Teller effect is not exhibited.

As shown in the legend in FIG. 13, aluminum and transition metals typified by nickel and manganese preferably exist in cobalt sites, but some of them may exist in lithium sites. Magnesium preferably exists in lithium sites. Part of oxygen may be substituted with fluorine.

As the magnesium concentration in the positive electrode active material increases, the capacity of the positive electrode active material decreases in some cases. As an example, one possible reason is that the amount of lithium that contributes to charging and discharging decreases when magnesium enters the lithium sites. Furthermore, excess magnesium sometimes generates a magnesium compound that does not contribute to charging or discharging. When the positive electrode active material contains nickel as the additive element in addition to magnesium, the capacity per weight and per volume can be increased in some cases. When the positive electrode active material contains aluminum as the additive element in addition to magnesium, the capacity per weight and per volume can be increased in some cases. When the positive electrode active material contains nickel and aluminum in addition to magnesium, the capacity per weight and per volume can be increased in some cases.

The concentrations of the elements, such as magnesium, contained in the positive electrode active material are described below using the number of atoms.

The number of nickel atoms contained in the positive electrode active material is preferably less than or equal to 10%, further preferably less than or equal to 7.5%, still further preferably greater than or equal to 0.05% and less than or equal to 4%, particularly preferably greater than or equal to 0.1% and less than or equal to 2% of the number of cobalt atoms. The nickel concentration described here may be a value obtained by element analysis on all the particles of the positive electrode active material using ICP-MS or the like, or may be a value based on the ratio of the raw materials mixed in the formation process of the positive electrode active material, for example.

When a high-voltage charged state is maintained for a long time, the transition metal dissolves in an electrolyte solution from the positive electrode active material, and the crystal structure might be broken. However, when nickel is included at the above-described proportion, dissolution of the transition metal from the positive electrode active material can be inhibited in some cases. The number of aluminum atoms in the positive electrode active material is preferably greater than or equal to 0.05% and less than or equal to 4%, further preferably greater than or equal to 0.1% and less than or equal to 2% of the number of cobalt atoms. The aluminum concentration described here may be a value obtained by element analysis on all the particles of the positive electrode active material using ICP-MS or the like, or may be a value based on the ratio of the raw materials mixed in the formation process of the positive electrode active material, for example.

It is preferable that the positive electrode active material contain an additive element X, and phosphorus be used as the additive element X. The positive electrode active material of one embodiment of the present invention further preferably includes a compound containing phosphorus and oxygen.

When the positive electrode active material includes a compound containing the additive element X, sometimes a short circuit is less likely to occur while the high-voltage charged state is maintained.

In the case where the positive electrode active material contains phosphorus as the additive element X, phosphorus may react with hydrogen fluoride generated by the decomposition of the electrolyte solution, which might decrease the hydrogen fluoride concentration in the electrolyte solution.

In the case where the electrolyte solution contains $LiPF_6$, hydrogen fluoride might be generated by hydrolysis. In some cases, hydrogen fluoride is generated by the reaction of PVDF used as a component of the positive electrode and alkali. The decrease in hydrogen fluoride concentration in the electrolyte solution can inhibit corrosion of a current collector and/or separation of a coating film in some cases. Furthermore, the decrease in hydrogen fluoride concentration in the electrolyte solution can inhibit a reduction in adhesion properties due to gelling and/or insolubilization of PVDF in some cases.

When containing magnesium in addition to the additive element X, the positive electrode active material is extremely stable in the high-voltage charged state. When the additive element X is phosphorus, the number of phosphorus atoms is preferably greater than or equal to 1% and less than or equal to 20%, further preferably greater than or equal to 2% and less than or equal to 10%, still further preferably greater than or equal to 3% and less than or equal to 8% of the number of cobalt atoms. In addition, the number of magnesium atoms is preferably greater than or equal to 0.1% and less than or equal to 10%, further preferably greater than or equal to 0.5% and less than or equal to 5%, still further preferably greater than or equal to 0.7% and less than or equal to 4% of the number of cobalt atoms. The phosphorus concentration and the magnesium concentration described here may each be a value obtained by element analysis on all the particles of the positive electrode active material using ICP-MS or the like, or may be a value based on the ratio of the raw materials mixed in the formation process of the positive electrode active material, for example.

In the case where the positive electrode active material has a crack, phosphorus, more specifically, a compound containing phosphorus and oxygen, in the inner portion of the crack may inhibit crack development, for example.

As is obvious from oxygen atoms indicated by the arrows in FIG. 13, the symmetry of the oxygen atoms slightly differs between the O3 type crystal structure and the O3' type crystal structure. Specifically, the oxygen atoms in the O3 type crystal structure are arranged along the (−1 0 2) plane indicated by a dotted line, whereas the oxygen atoms in the O3' type crystal structure are not strictly arranged along the (−1 0 2) plane. This is because, in the O3' type crystal structure, an increase in tetravalent cobalt with a reduction in lithium expands the Jahn-Teller distortion and causes a distortion of the octahedral structure of $CoO_6$. In addition, repelling of oxygen atoms in the $CoO_2$ layer becomes stronger along with a decrease in the amount of lithium, which also affects the difference in symmetry of oxygen atoms.

Magnesium is preferably distributed throughout the particle of the positive electrode active material, and further preferably, the magnesium concentration in the surface portion is higher than the average in the whole particle. For example, the magnesium concentration in the surface portion which is measured by XPS or the like is preferably higher than the average magnesium concentration in all the particles measured by ICP-MS or the like.

In the case where the positive electrode active material contains an element other than cobalt, for example, one or more metals selected from nickel, aluminum, manganese, iron, and chromium, the concentration of the metal(s) in the vicinity of the surface of the particle is preferably higher than the average concentration of the metal(s) in the whole particle. For example, the concentration of the element other than cobalt in the surface portion measured by XPS or the like is preferably higher than the average concentration of the element in all the particles measured by ICP-MS or the like.

The surface of the particle is a kind of crystal defects and lithium is extracted from the surface during charging; thus, the lithium concentration in the surface of the particle tends to be lower than that in the inner portion of the particle. Therefore, the surface of the particle tends to be unstable and its crystal structure is likely to break. The higher the magnesium concentration in the surface portion is, the more effectively the change in the crystal structure can be inhibited. In addition, when a magnesium concentration in the surface portion is high, it is expected that the corrosion resistance to hydrofluoric acid generated by the decomposition of the electrolyte solution is improved.

In addition, the concentration of halogen such as fluorine in the surface portion of the positive electrode active material is preferably higher than the average concentration in the whole particle. When a halogen exists in the surface portion that is a region in contact with an electrolyte solution, the corrosion resistance to hydrofluoric acid can be effectively improved.

As described above, the surface portion of the positive electrode active material preferably has higher concentrations of additive elements such as magnesium and fluorine than the inner portion and a composition different from that in the inner portion. The surface portion having such a composition preferably has a crystal structure stable at room temperature. Thus, the surface portion may have a crystal structure different from that of the inner portion. For example, at least part of the surface portion of the positive electrode active material may have a rock-salt crystal structure. Furthermore, in the case where the surface portion and the inner portion have different crystal structures, the orientations of crystals in the surface portion and the inner portion are preferably substantially aligned with each other.

Anions of a layered rock-salt crystal and anions of a rock-salt crystal form a cubic close-packed structure (face-centered cubic lattice structure). Anions of an O3' type crystal are also presumed to form a cubic close-packed structure. When these crystals are in contact with each other, there is a crystal plane at which orientations of cubic close-packed structures composed of anions are aligned. Note that a space group of the layered rock-salt crystal and the O3' type crystal is R-3m, which is different from a space group Fm-3m of a rock-salt crystal (a space group of a general rock-salt crystal) and a space group Fd-3m of a rock-salt crystal (a space group of a rock-salt crystal having the simplest symmetry); thus, the Miller index of the crystal plane satisfying the above conditions in the layered rock-salt crystal and the O3' type crystal is different from that in the rock-salt crystal. In this specification, a state where the orientations of the cubic close-packed structures composed of anions in the layered rock-salt crystal, the O3' type crystal, and the rock-salt crystal are aligned is sometimes referred to as a state where crystal orientations are substantially aligned.

Whether the crystal orientations in two regions are substantially aligned with each other can be judged from a TEM (transmission electron microscope) image, a STEM (scanning transmission electron microscope) image, a HAADF-STEM (high-angle annular dark field scanning transmission electron microscope) image, an ABF-STEM (annular bright-field scanning transmission electron microscope) image, and the like. X-ray diffraction (XRD), electron diffraction, neutron diffraction, and the like can also be used for judging. When the crystal orientations are substantially aligned with each other, a state where an angle between the orientations of lines in each of which cations and anions are alternately arranged is less than or equal to 5°, preferably less than or equal to 2.5° is observed from a TEM image and the like. Note that in a TEM image and the like, a light element typified by oxygen or fluorine cannot be clearly observed in some cases; in such a case, alignment of orientations can be judged by arrangement of metal elements.

Only with the structure where the surface portion contains only MgO or MgO and CoO(II) forms a solid solution, it is difficult to insert and extract lithium. Thus, the surface portion should contain at least cobalt, and further contain lithium in the discharged state to have a path through which lithium is inserted and extracted. In addition, the concentration of cobalt is preferably higher than that of magnesium.

The additive element X is preferably positioned in the surface portion of the particle of the positive electrode active material. For example, the positive electrode active material may be covered with a coating film containing the additive element X <Grain Boundary>

The additive element X contained in the positive electrode active material may randomly exist in the inner portion at a slight concentration, but part of the additive element is further preferably segregated at a grain boundary.

In other words, the concentration of the additive element X in the crystal grain boundary and its vicinity of the positive electrode active material is preferably higher than that in the other regions in the inner portion.

Like the particle surface, the crystal grain boundary is also a plane defect. Thus, the crystal grain boundary tends to be unstable and its crystal structure easily starts to change. Therefore, the higher the concentration of the additive element X in the crystal grain boundary and its vicinity is, the more effectively the change in the crystal structure can be inhibited.

In the case where the concentration of the addition element X is high in the grain boundary and its vicinity, even when a crack is generated along the grain boundary of the particle of the positive electrode active material, the concentration of the addition element X is increased in the vicinity of the surface generated by the crack. Thus, the positive electrode active material after the cracks are generated can also have increased corrosion resistance to hydrofluoric acid.

Note that in this specification and the like, the vicinity of the crystal grain boundary refers to a region extending up to approximately 10 nm from the grain boundary.

<Particle Size>

Too large a particle size of the positive electrode active material causes problems such as difficulty in lithium diffusion and too much surface roughness of an active material layer in coating to a current collector. By contrast, too small a particle size causes problems such as difficulty in loading of the active material layer in coating to the current collector and overreaction with an electrolyte solution. Therefore, an average particle diameter (D50, also referred to as median diameter) is preferably greater than or equal to 1 μm and less than or equal to 100 μm, further preferably greater than or equal to 2 μm and less than or equal to 40 μm, still further preferably greater than or equal to 5 μm and less than or equal to 30 μm.

<Analysis Method>

Whether or not a positive electrode active material has the O3' type crystal structure when charged at a high voltage can be determined by analyzing a high-voltage charged positive electrode using XRD, electron diffraction, neutron diffraction, electron spin resonance (ESR), nuclear magnetic resonance (NMR), or the like. XRD is particularly preferable because XRD makes it possible that the symmetry of a transition metal such as cobalt contained in the positive electrode active material is analyzed with high resolution, the degrees of crystallinity and the crystal orientations are compared, the distortion of lattice periodicity and the crystallite size are analyzed, and a positive electrode obtained only by disassembling a secondary battery is measured with sufficient accuracy, for example.

As described so far, the positive electrode active material has a feature of a small crystal structure change between the high-voltage charged state and the discharged state. A material 50 wt % or more of which has the crystal structure that largely changes between the high-voltage charged state and the discharged state is not preferable because the material cannot withstand the high-voltage charging and discharging. In addition, it should be noted that an objective crystal structure is not obtained in some cases only by addition of additive elements. For example, in the high-voltage charged state, lithium cobalt oxide containing magnesium and fluorine has the O3' type crystal structure at 60 wt % or more in some cases, and has the H1-3 type crystal structure at 50 wt % or more in other cases. In some cases, lithium cobalt oxide containing magnesium and fluorine may have the O3' type crystal structure at almost 100 wt % at a predetermined voltage, and increasing the voltage to a voltage higher than the predetermined voltage may cause the H1-3 type crystal structure. Thus, analysis of the crystal structure, including XRD, is needed to determine whether or not a positive electrode active material is the positive electrode active material.

Note that the crystal structure of a positive electrode active material in the high-voltage charged state or the discharged state may be changed by exposure to the air. For example, the O3' type crystal structure changes into the H1-3 type crystal structure in some cases. Thus, all samples are preferably handled in an inert atmosphere such as an argon atmosphere.

Embodiment 5

In this embodiment, an example in which the control circuit of a secondary battery described in the above embodiment is made into an electronic component will be described with reference to FIG. 15.

Figure 15:
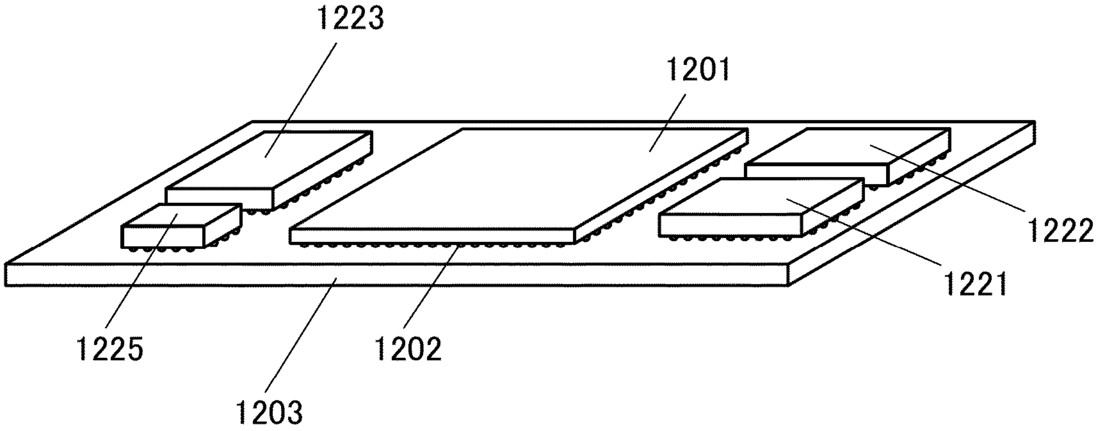
FIG. 15 is a diagram showing an example of an electronic component.

FIG. 15 illustrates an example in which a plurality of chips are provided over a printed circuit board (PCB) 1203. In FIG. 15, a chip 1201 is provided over the printed circuit board 1203. The control circuit of one embodiment of the present invention is provided in the chip 1201. A plurality of bumps 1202 are provided on a rear surface of the chip 1201 and are electrically connected to the printed circuit board 1203.

Providing the control circuit of one embodiment of the present invention can reduce the capacity of the electronic component. Furthermore, the power consumption of the electronic component can be reduced.

The control circuit of one embodiment of the present invention allows for integration of chips; accordingly, the volume occupied by the control circuit can be small in portable terminals and other various electronic devices, and thus the electronic devices can be downsized.

The control circuit of one embodiment of the present invention has low power consumption, which can increase the duration time of the secondary battery. Furthermore, the volume occupied by the battery can be increased thanks to the downsizing of the control circuit. As a result, the duration time of the secondary battery can be increased.

The printed circuit board 1203 is preferably provided with an integrated circuit 1223 as a second chip. The integrated circuit 1223 has a function of supplying a control signal, power, or the like to the chip 1201.

Memory devices such as a DRAM 1221 or a FeRAM 1222 may be provided as a variety of chips provided on the printed circuit board 1203. The printed circuit board 1203 may be provided with a chip 1225 as a chip having a function of performing wireless communication.

The integrated circuit 1223 may have at least one of a function of performing image processing and a function of performing product-sum operation.

The integrated circuit 1223 may include one or both of an A/D (analog/digital) converter circuit and a D/A (digital/analog) converter circuit.

This embodiment can be combined with the description of the other embodiments as appropriate.

Embodiment 6

This embodiment describes structures of a power storage system to which the electronic component provided with the control circuit described in the above embodiment can be applied.

[Cylindrical Secondary Battery]

Figure 16A:
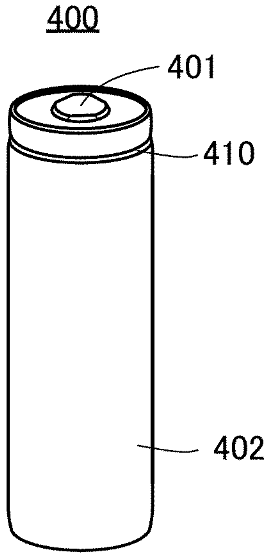
FIG. 16A is a diagram illustrating an electric device of one embodiment of the present invention.

An example of a cylindrical secondary battery is described with reference to FIG. 16A. A cylindrical secondary battery 400 includes, as illustrated in FIG. 16A, a positive electrode cap (battery lid) 401 on a top surface and a battery can (outer can) 402 on a side surface and a bottom surface. The positive electrode cap 401 and the battery can (outer can) 402 are insulated from each other by a gasket (insulating packing) 410.

Figure 16B:
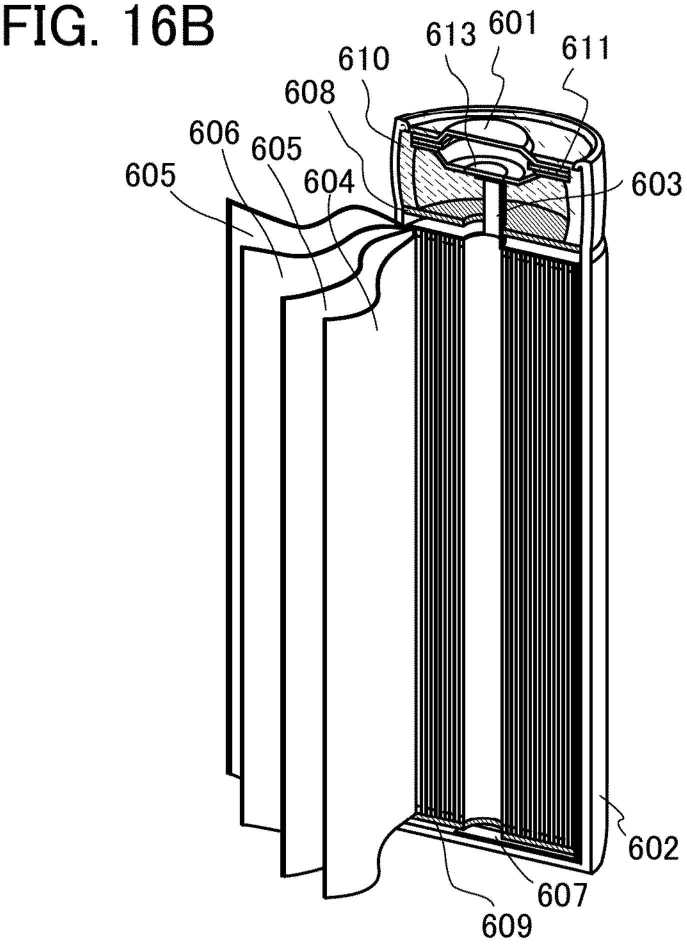
FIG. 16B is a diagram illustrating an electric device of one embodiment of the present invention.

FIG. 16B is a schematic cross-sectional view of a cylindrical secondary battery. The cylindrical secondary battery illustrated in FIG. 16B includes a positive electrode cap (battery lid) 601 on a top surface and a battery can (outer can) 602 on a side surface and a bottom surface. The positive electrode cap and the battery can (outer can) 602 are insulated from each other by a gasket (insulating packing) 610.

Inside the battery can 602 having a hollow cylindrical shape, a battery element in which a strip-like positive electrode 604 and a strip-like negative electrode 606 are wound with a separator 605 located therebetween is provided. Although not illustrated, the battery element is wound around a center pin. One end of the battery can 602 is close and the other end thereof is open. For the battery can 602, a metal having corrosion resistance to an electrolyte solution, such as nickel, aluminum, or titanium, an alloy of such a metal, and an alloy of such a metal and another metal (e.g., stainless steel) can be used. The battery can 602 is preferably covered with nickel, aluminum, or the like in order to prevent corrosion due to the electrolyte solution. Inside the battery can 602, the battery element in which the positive electrode, the negative electrode, and the separator are wound is provided between a pair of insulating plates 608 and 609 that face each other. Furthermore, a nonaqueous electrolyte solution (not illustrated) is injected inside the battery can 602 provided with the battery element. As the nonaqueous electrolyte, a nonaqueous electrolyte that is similar to that for a coin-type secondary battery can be used.

Since a positive electrode and a negative electrode that are used for a cylindrical storage battery are wound, active materials are preferably formed on both surfaces of current collectors. A positive electrode terminal (positive electrode current collecting lead) 603 is electrically connected to the positive electrode 604, and a negative electrode terminal (negative electrode current collecting lead) 607 is electrically connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 613 and the bottom of the battery can 602, respectively. The safety valve mechanism 613 is electrically connected to the positive electrode cap 601 through a PTC (Positive Temperature Coefficient) element 611. The safety valve mechanism 613 cuts off electrical connection between the positive electrode cap 601 and the positive electrode 604 when the internal pressure of the battery exceeds a predetermined threshold. In addition, the PTC element 611 is a thermally sensitive resistor whose resistance increases as temperature rises, and limits the amount of current by increasing the resistance to prevent abnormal heat generation. Barium titanate ($BaTiO_3$)-based semiconductor ceramics or the like can be used for the PTC element.

Figure 16C:
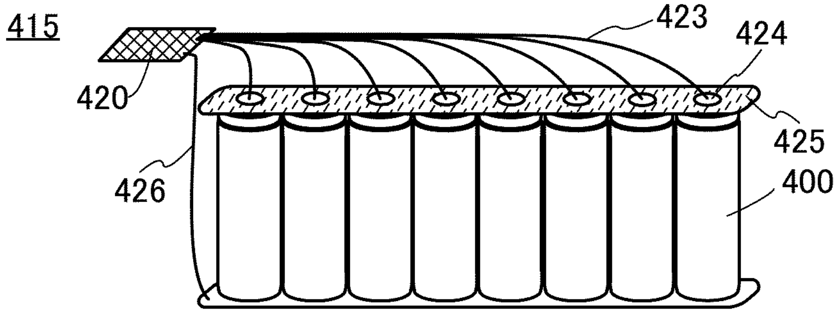
FIG. 16C is a diagram illustrating an electric device of one embodiment of the present invention.

FIG. 16C illustrates an example of a power storage system 415. The power storage system 415 includes a plurality of the secondary batteries 400. Positive electrodes of the secondary batteries 400 are in contact with and electrically connected to conductors 424 isolated by an insulator 425. The conductor 424 is electrically connected to a control circuit 420 through a wiring 423. Negative electrodes of the secondary batteries 400 are electrically connected to the control circuit 420 through a wiring 426. As the control circuit 420, the control circuit described in the above embodiment can be used.

Figure 16D:
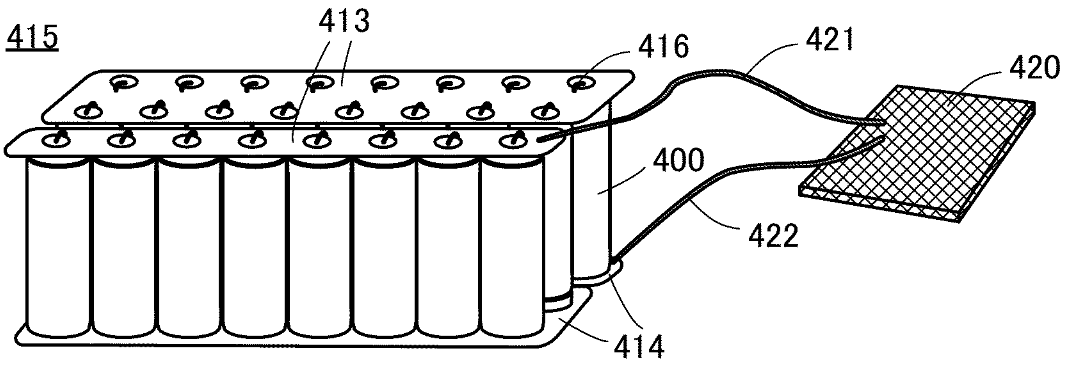
FIG. 16D is a diagram illustrating the electric device of one embodiment of the present invention.

FIG. 16D illustrates an example of the power storage system 415. The power storage system 415 includes the plurality of secondary batteries 400, and the plurality of secondary batteries 400 are sandwiched between a conductive plate 413 and a conductive plate 414. The plurality of secondary batteries 400 are electrically connected to the conductive plate 413 and the conductive plate 414 through a wiring 416. The plurality of secondary batteries 400 may be connected in parallel, connected in series, or connected in series after being connected in parallel. With the power storage system 415 that includes the plurality of secondary batteries 400, large electric power can be extracted.

The case where the plurality of secondary batteries 400 are electrically connected in parallel and then further electrically connected in series is considered. In such a case, one control circuit is electrically connected to the plurality of secondary batteries electrically connected in parallel.

A temperature control device may be provided between the plurality of secondary batteries 400. When the secondary batteries 400 are heated excessively, the temperature control device can cool them, and when the secondary batteries 400 get too cold, the temperature control device can heat them. Thus, the performance of the power storage system 415 is not easily influenced by the outside temperature.

In FIG. 16D, the power storage system 415 is electrically connected to the control circuit 420 through a wiring 421 and a wiring 422. As the control circuit 420, the control circuit described in the above embodiment can be used. The wiring 421 is electrically connected to the positive electrodes of the plurality of secondary batteries 400 through the conductive plate 413. The wiring 422 is electrically connected to the negative electrodes of the plurality of secondary batteries 400 through the conductive plate 414.

Figure 24A:
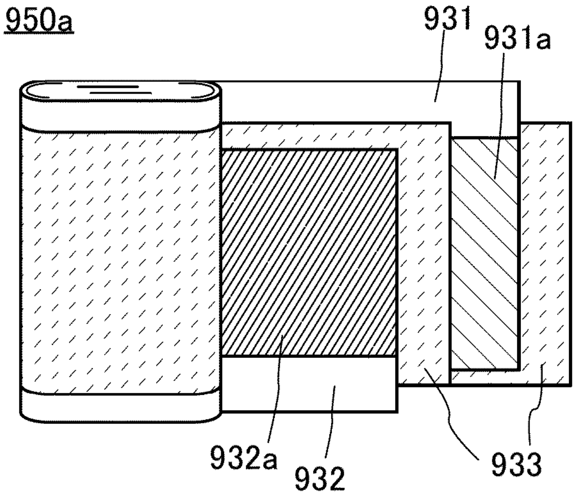
FIG. 24A to FIG. 24C are diagrams illustrating examples of a secondary battery.
Figure 24B:
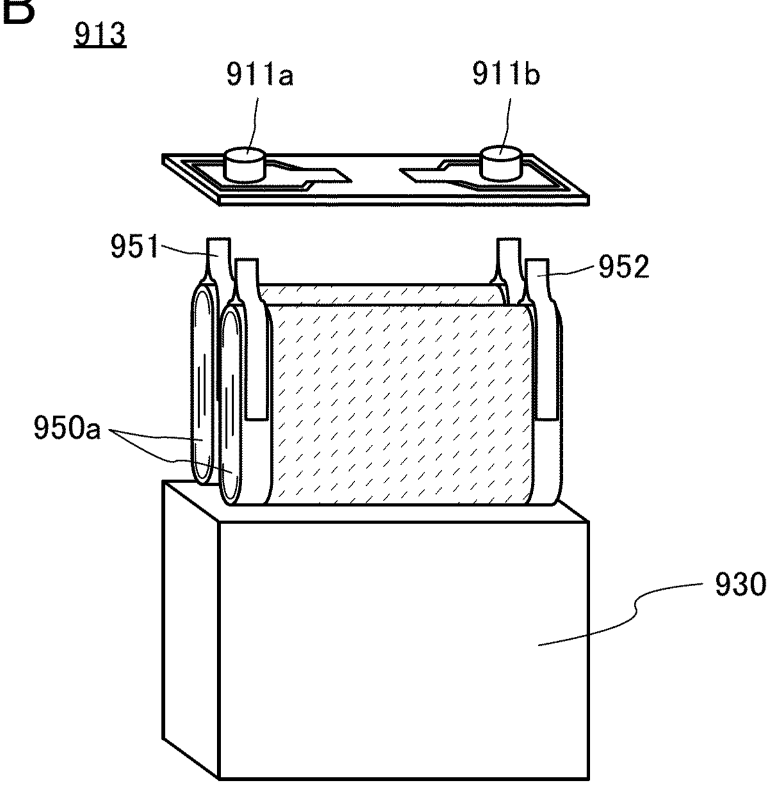
Figure 24C:
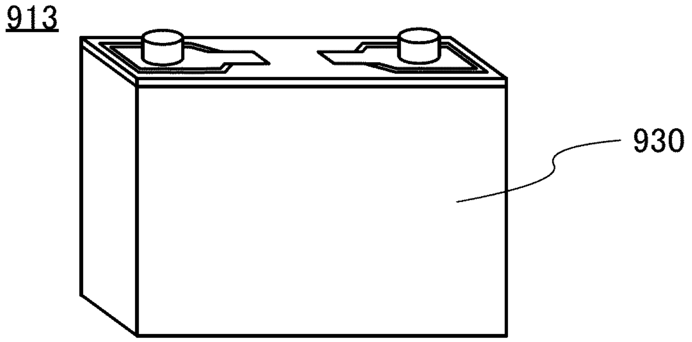

As illustrated in FIG. 24A to FIG. 24C, a secondary battery 913 may include a wound body 950*a*. The wound body 950*a* illustrated in FIG. 24A includes a negative electrode 931, a positive electrode 932, and separators 933. The negative electrode 931 includes a negative electrode active material layer 931*a*. The positive electrode 932 includes a positive electrode active material layer 932*a*. The separator 933 has a larger width than the negative electrode active material layer 931*a* and the positive electrode active material layer 932*a*, and is wound to overlap with the negative electrode active material layer 931*a* and the positive electrode active material layer 932*a*. In terms of safety, the width of the negative electrode active material layer 931*a* is preferably larger than that of the positive electrode active material layer 932*a*. The wound body 950*a* having such a shape is preferable because of its high degree of safety and high productivity.

As illustrated in FIG. 24B, the negative electrode 931 is electrically connected to a terminal 951. The terminal 951 is electrically connected to a terminal 911*a*. The positive electrode 932 is electrically connected to a terminal 952. The terminal 952 is electrically connected to a terminal 911*b*.

As illustrated in FIG. 24C, the wound body 950*a* and an electrolyte solution are covered with the housing 930, whereby the secondary battery 913 is obtained. The housing 930 is preferably provided with a safety valve, an overcurrent protection element, and the like.

As illustrated in FIG. 24B, the secondary battery 913 may include a plurality of the wound bodies 950*a*. The use of the plurality of wound bodies 950*a* enables the secondary battery 913 to have higher charging and discharging capacity.

When the positive electrode active material described in the above embodiment is used in the positive electrode 932, the secondary battery 913 with high charging and discharging capacity and excellent cycle performance can be obtained.

[Secondary Battery Pack]

Next, examples of a power storage device of one embodiment of the present invention will be described with reference to FIG. 17.

Figure 17A:
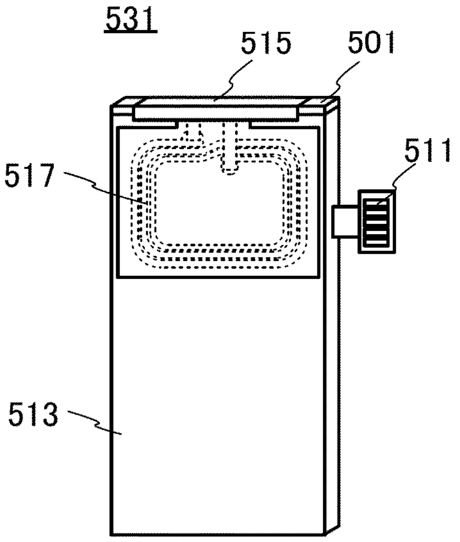
FIG. 17A is a diagram illustrating an electric device of one embodiment of the present invention.
Figure 17B:
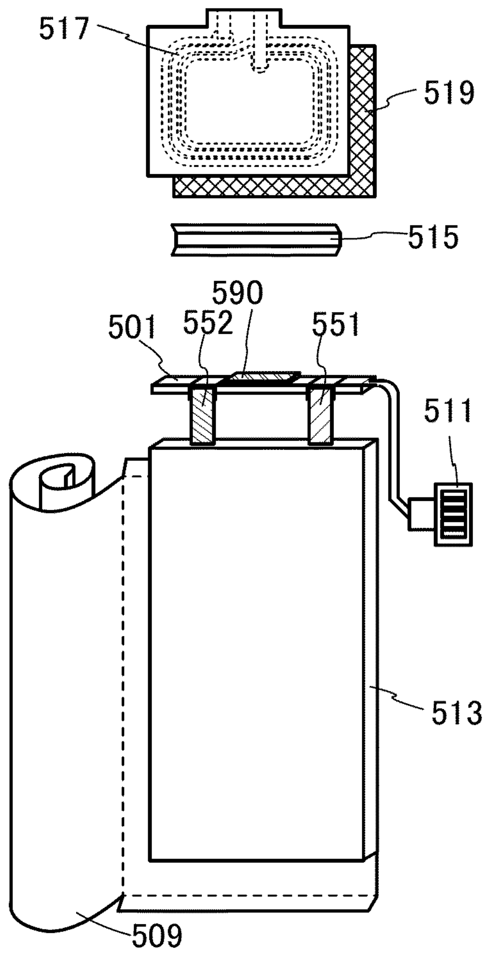
FIG. 17B is a diagram illustrating the electric device of one embodiment of the present invention.

FIG. 17A is an external view of a secondary battery pack 531. FIG. 17B illustrates a structure of the secondary battery pack 531. The secondary battery pack 531 includes a circuit board 501 and a secondary battery 513. A label 509 is attached onto the secondary battery 513. The circuit board 501 is fixed by a sealant 515. The secondary battery pack 531 also includes an antenna 517.

The circuit board 501 includes a control circuit 590. As the control circuit 590, the control circuit described in the above embodiment can be used. For example, as illustrated in FIG. 17B, the control circuit 590 is provided over the circuit board 501. The circuit board 501 is electrically connected to a terminal 511. The circuit board 501 is electrically connected to the antenna 517, one 551 of a positive electrode lead and a negative electrode lead of the secondary battery 513, and the other 552 of the positive electrode lead and the negative electrode lead.

Figure 17C:
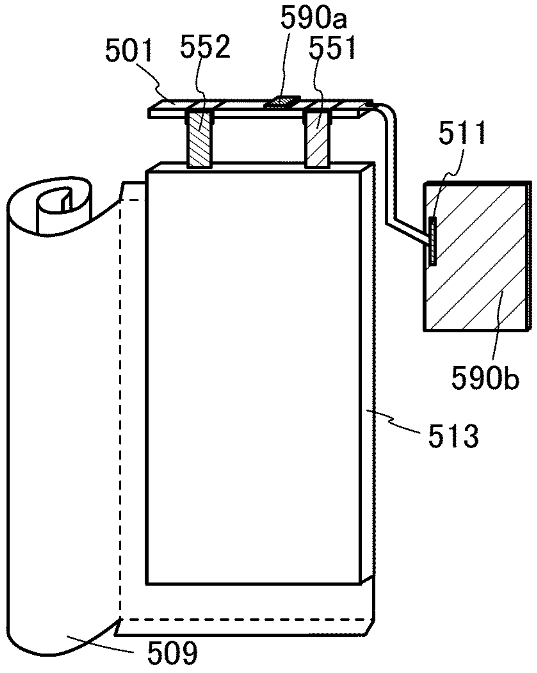
FIG. 17C is a diagram illustrating the electric device of one embodiment of the present invention.

Alternatively, as illustrated in FIG. 17C, a circuit system 590*a* provided over the circuit board 501 and a circuit system 590*b* electrically connected to the circuit board 501 through the terminal 511 may be included. For example, a part of the control circuit of one embodiment of the present invention is provided in the circuit system 590*a*, and another part of the control circuit of one embodiment of the present invention is provided in the circuit system 590*b*.

The shape of the antenna 517 is not limited to a coil shape and may be a linear shape or a plate shape. An antenna such as a planar antenna, an aperture antenna, a traveling-wave antenna, an EH antenna, a magnetic-field antenna, or a dielectric antenna may be used. Alternatively, the antenna 517 may be a flat-plate conductor. This flat-plate conductor can serve as one of conductors for electric field coupling. That is, the antenna 517 may serve as one of two conductors of a capacitor. Thus, electric power can be transmitted and received not only by an electromagnetic field or a magnetic field but also by an electric field.

The secondary battery pack 531 includes a layer 519 between the antenna 517 and the secondary battery 513. The layer 519 has a function of blocking an electromagnetic field from the secondary battery 513, for example. For the layer 519, a magnetic material can be used, for instance.

The secondary battery 513 is obtained, for example, by winding a sheet of a stack in which the negative electrode and the positive electrode overlap with each other with the separator positioned therebetween.

This embodiment can be combined with the description of the other embodiments as appropriate.

Embodiment 7

This embodiment describes examples in which the power storage system of one embodiment of the present invention is mounted on a vehicle. Examples of vehicles include automobiles, motorcycles, and bicycles.

Mounting the power storage system on vehicles enables production of next-generation clean energy vehicles such as hybrid electric vehicles (HVs), electric vehicles (EVs), and plug-in hybrid electric vehicles (PHVs).

Figure 18A:
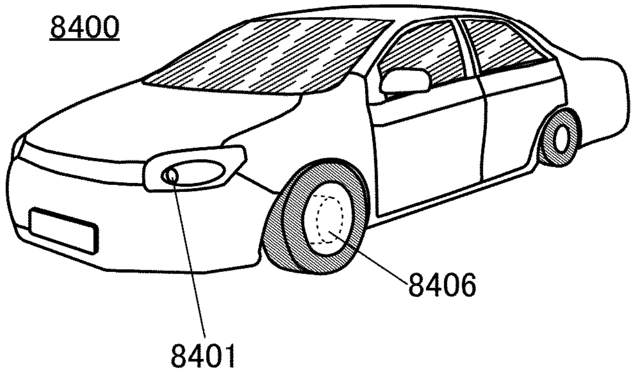
FIG. 18A is a diagram illustrating an electric device of one embodiment of the present invention.

FIG. 18 shows examples of vehicles that include the power storage system of one embodiment of the present invention. An automobile 8400 illustrated in FIG. 18A is an electric vehicle that runs on an electric motor as a power source. Alternatively, the automobile 8400 is a hybrid electric vehicle capable of running appropriately using either an electric motor or an engine as a power source. The use of one embodiment of the present invention makes it possible to obtain a high-mileage vehicle. The automobile 8400 includes a power storage system. The power storage system not only drives an electric motor 8406 but also can supply electric power to a light-emitting device such as a headlight 8401 or a room light (not illustrated).

The power storage system can also supply electric power to a display device of a speedometer, a tachometer, or the like included in the automobile 8400. Furthermore, the power storage system can supply electric power to a navigation system or the like included in the automobile 8400.

Figure 18B:
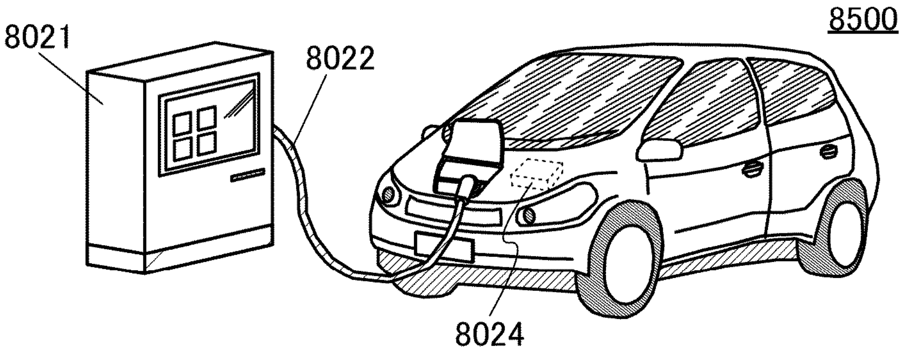
FIG. 18B is a diagram illustrating an electric device of one embodiment of the present invention.

An automobile 8500 illustrated in FIG. 18B can be charged when the power storage system 8024 included in the automobile 8500 is supplied with electric power from external charging equipment by a plug-in system, a contactless power feeding system, or the like. FIG. 18B illustrates the state in which the power storage system 8024 included in the automobile 8500 is charged with a ground-based charging apparatus 8021 through a cable 8022. In charging, a given method such as CHAdeMO (registered trademark) or Combined Charging System may be employed as a charging method, the standard of a connector, or the like as appropriate. The charging apparatus 8021 may be a charging station provided in a commerce facility or a power source in a house. With the use of a plug-in technique, the power storage system 8024 included in the automobile 8500 can be charged by being supplied with electric power from the outside, for example. The charging can be performed by converting AC electric power into DC electric power through a converter, such as an AC-DC converter.

Although not illustrated, the vehicle can include a power receiving device so as to be charged by being supplied with electric power from an above-ground power transmitting device in a contactless manner. In the case of the contactless power feeding system, by fitting a power transmitting device in a road or an exterior wall, charging can be performed not only when the vehicle is stopped but also when driven. In addition, the contactless power feeding system may be utilized to perform transmission and reception of electric power between vehicles. A solar cell may be provided in the exterior of the vehicle to charge the power storage system when the vehicle stops or moves. To supply electric power in such a contactless manner, an electromagnetic induction method or a magnetic resonance method can be used.

Figure 18C:
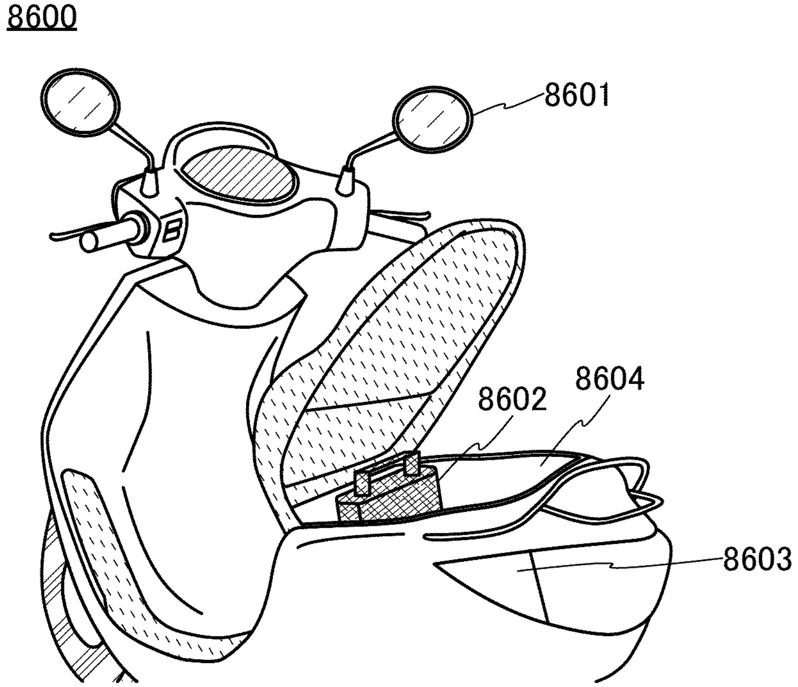
FIG. 18C is a diagram illustrating an electric device of one embodiment of the present invention.

FIG. 18C shows an example of a two-wheeled vehicle that includes the power storage system of one embodiment of the present invention. A motor scooter 8600 illustrated in FIG. 18C includes a power storage system 8602, side mirrors 8601, and indicator lights 8603. The power storage system 8602 can supply electricity to the indicator lights 8603.

In the motor scooter 8600 illustrated in FIG. 18C, the power storage system 8602 can be stored in a storage unit under seat 8604. The power storage system 8602 can be stored in the storage unit under seat 8604 even when the storage unit under seat 8604 is small.

Figure 19A:
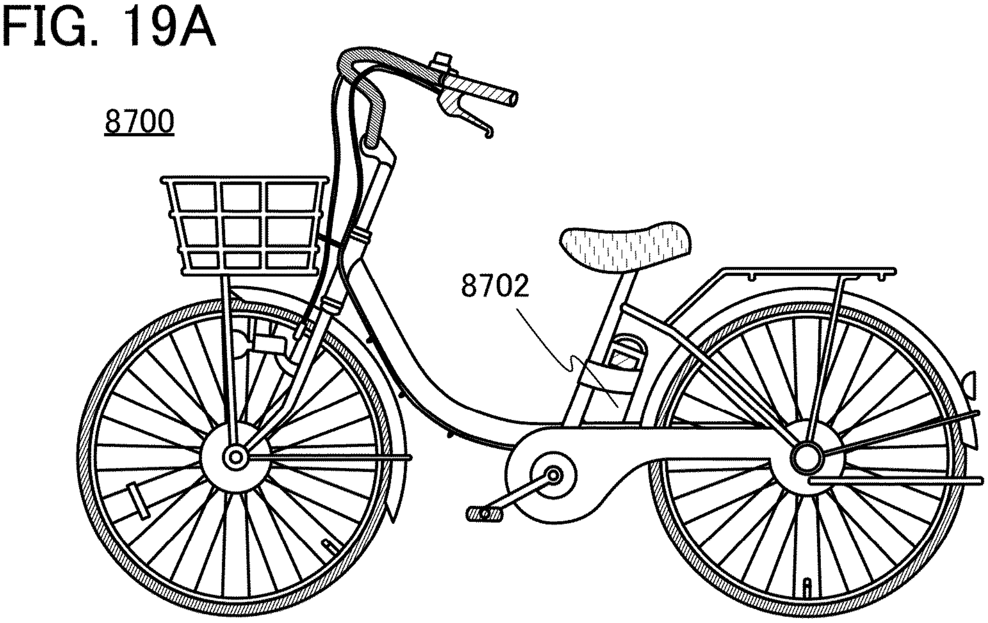
FIG. 19A is a diagram illustrating an electric device of one embodiment of the present invention.

FIG. 19A shows an example of an electric bicycle that includes the power storage system of one embodiment of the present invention. The power storage system of one embodiment of the present invention can be used for an electric bicycle 8700 illustrated in FIG. 19A. The power storage system of one embodiment of the present invention includes a plurality of storage batteries, a protection circuit, and a neural network, for example.

Figure 19B:
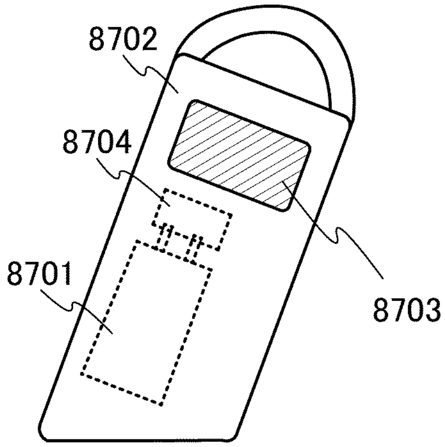
FIG. 19B is a diagram illustrating an electric device of one embodiment of the present invention.

The electric bicycle 8700 includes a power storage system 8702. The power storage system 8702 can supply electricity to a motor that assists a rider. The power storage system 8702 is portable, and FIG. 19B illustrates the state where the power storage system 8702 is detached from the bicycle. A plurality of storage batteries 8701 included in the power storage system of one embodiment of the present invention are incorporated in the power storage system 8702, and the remaining battery capacity and the like can be displayed on a display portion 8703. The power storage system 8702 also includes a control circuit 8704 of one embodiment of the present invention. The control circuit 8704 is electrically connected to a positive electrode and a negative electrode of the storage battery 8701. The control circuit described in the above embodiment can be used as the control circuit 8704.

This embodiment can be combined with the description of the other embodiments as appropriate.

Embodiment 8

This embodiment describes examples in which the power storage system described in the above embodiment is mounted on an electronic device.

Figure 20A:
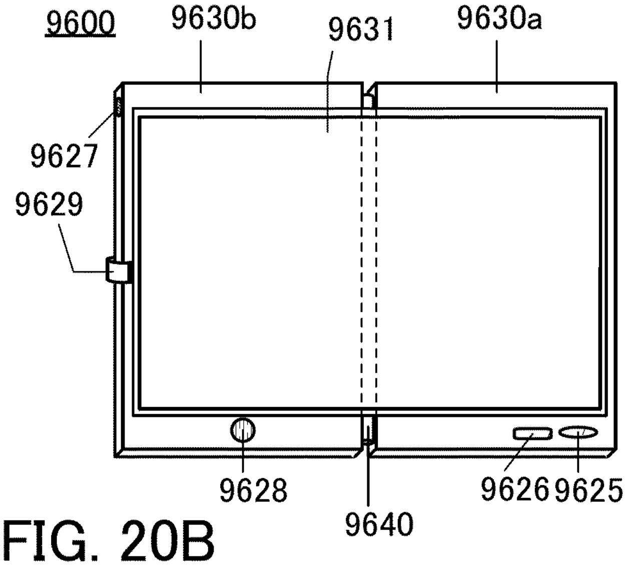
FIG. 20A is a diagram illustrating an electric device of one embodiment of the present invention.
Figure 20B:
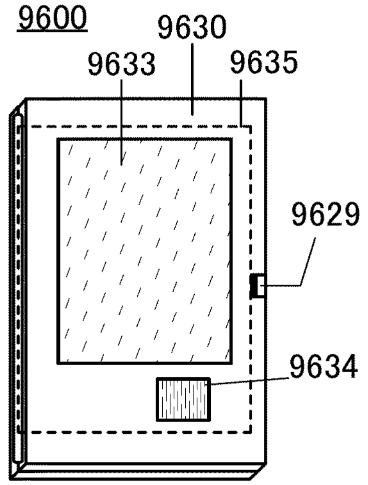
FIG. 20B is a diagram illustrating the electric device of one embodiment of the present invention.

Next, FIG. 20A and FIG. 20B show an example of a foldable tablet terminal (including a clamshell tablet). A tablet terminal 9600 illustrated in FIG. 20A and FIG. 20B includes a housing 9630*a*, a housing 9630*b*, a movable portion 9640 connecting the housing 9630*a* and the housing 9630*b*, a display portion 9631, a display mode changing switch 9626, a power switch 9627, a power saving mode changing switch 9625, a fastener 9629, and an operation switch 9628. When a flexible panel is used for the display portion 9631, the tablet terminal can have a larger display portion. FIG. 20A illustrates the tablet terminal 9600 that is opened, and FIG. 20B illustrates the tablet terminal 9600 that is closed.

The tablet terminal 9600 includes a power storage unit 9635 inside the housing 9630*a* and the housing 9630*b*. The power storage unit 9635 is provided across the housing 9630*a* and the housing 9630*b*, passing through the movable portion 9640.

Part of the display portion 9631 can be a touch panel region and data can be input when a displayed operation key is touched. When a position where a keyboard display switching button is displayed on the touch panel is touched with a finger, a stylus, or the like, keyboard buttons can be displayed on the display portion 9631.

The display mode changing switch 9626 can select switching of the orientations of display between portrait display, landscape display, and the like, switching between monochrome display and color display, and the like. The power saving mode changing switch 9625 can optimize display luminance in accordance with the amount of external light at the time when the tablet terminal 9600 is in use, which is measured with an optical sensor incorporated in the tablet terminal 9600. Another detection device including, for example, a sensor for detecting inclination, such as a gyroscope sensor or an acceleration sensor, may be incorporated in the tablet terminal, in addition to the optical sensor.

FIG. 20B shows the tablet terminal 9600 that is closed, and the tablet terminal 9600 includes the housing 9630, a solar cell 9633, and the power storage system of one embodiment of the present invention. The power storage system includes a control circuit 9634 and the power storage unit 9635. The control circuit described in the above embodiment can be used as the control circuit 9634.

The tablet terminal 9600 can be folded in half such that the housing 9630*a* and the housing 9630*b* overlap with each other when the tablet terminal 9600 is not in use. The display portion 9631 can be protected when the tablet terminal 9600 is folded, which increases the durability of the tablet terminal 9600.

The tablet terminal illustrated in FIG. 20A and FIG. 20B can also have a function of displaying various kinds of information (a still image, a moving image, a text image, and the like), a function of displaying a calendar, a date, the time, or the like on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processor, and the like. Note that the solar cell 9633 can be provided on one or both surfaces of the housing 9630 and the power storage unit 9635 can be charged efficiently.

Figure 20C:
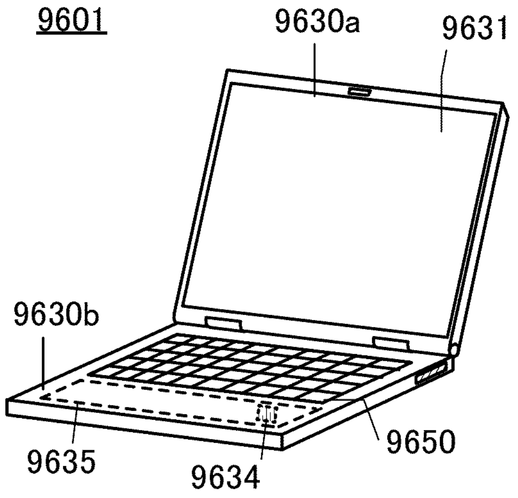
FIG. 20C is a diagram illustrating an electric device of one embodiment of the present invention.

Note that although FIG. 20A and FIG. 20B illustrate a structure in which the battery control circuit described in the above embodiment is used for a tablet terminal that can be folded in half, another structure may be employed. For example, application to a clamshell notebook personal computer is possible as illustrated in FIG. 20C. FIG. 20C illustrates a notebook personal computer 9601 including a display portion 9631 in a housing 9630*a* and a keyboard portion 9650 in a housing 9630*b*. The notebook personal computer 9601 includes the control circuit 9634 and the power storage unit 9635 which are described with reference to FIG. 20A and FIG. 20B. The control circuit described in the above embodiment can be used as the control circuit 9634.

Figure 21:
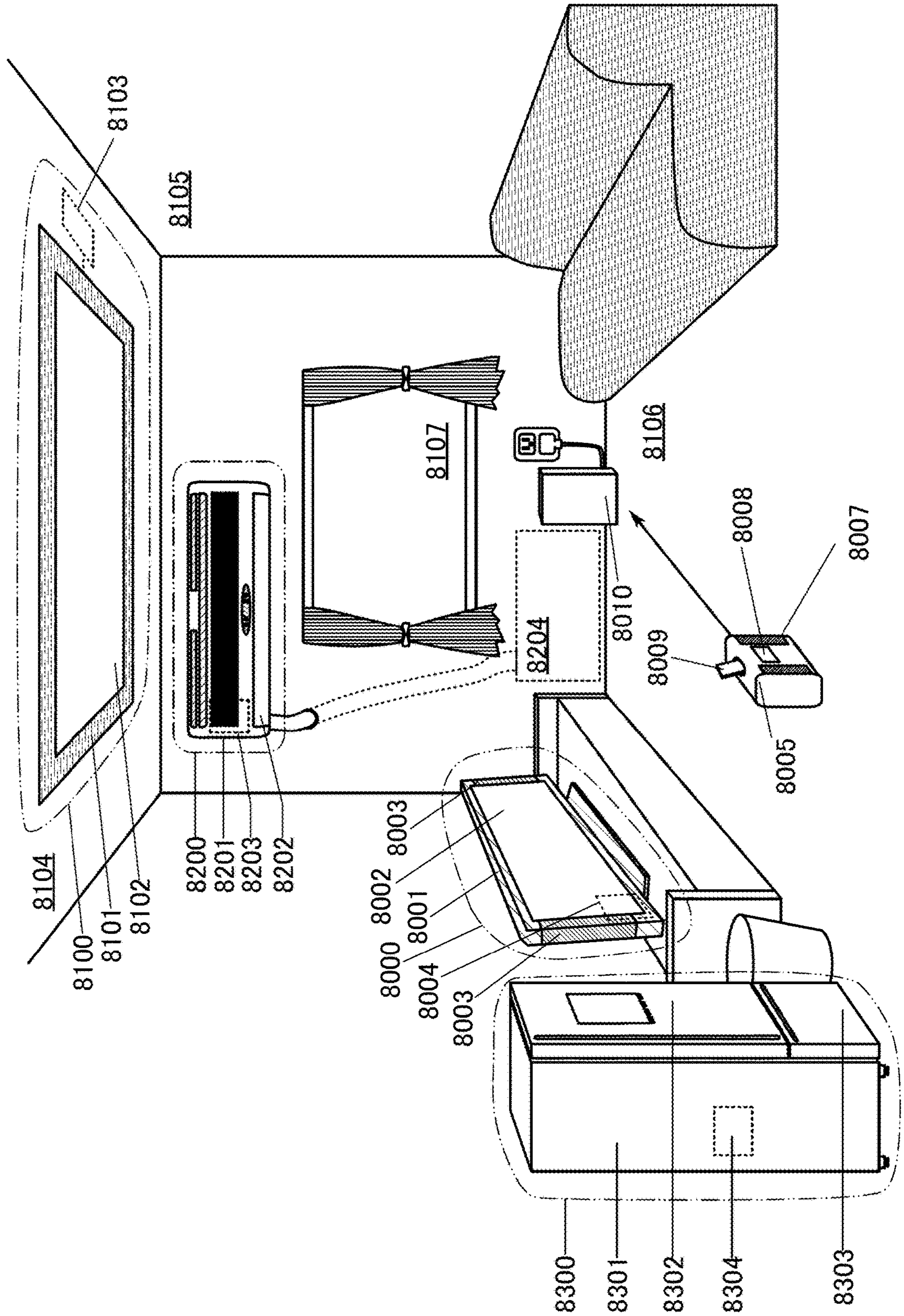
FIG. 21 is a diagram illustrating electric devices of embodiments of the present invention.

FIG. 21 illustrates other examples of electronic devices. In FIG. 21, a display device 8000 is an example of an electronic device that includes the power storage system of one embodiment of the present invention. Specifically, the display device 8000 corresponds to a display device for TV broadcast reception and includes a housing 8001, a display portion 8002, speaker portions 8003, a secondary battery 8004, and the like. The power storage system of one embodiment of the present invention is provided in the housing 8001. The display device 8000 can receive electric power from a commercial power supply. Alternatively, the display device 8000 can use electric power stored in the secondary battery 8004.

A semiconductor display device such as a liquid crystal display device, a light-emitting device in which a light-emitting element such as an organic EL element is provided in each pixel, an electrophoretic display device, a DMD (Digital Micromirror Device), a PDP (Plasma Display Panel), or an FED (Field Emission Display) can be used for the display portion 8002.

An audio input device 8005 also includes a secondary battery. The audio input device 8005 includes the power storage system described in the above embodiment. The audio input device 8005 includes a plurality of sensors (e.g., an optical sensor, a temperature sensor, a humidity sensor, a pressure sensor, an illuminance sensor, and a motion sensor) including a microphone, in addition to wireless communication elements. In accordance with an instruction spoken by a user, the audio input device 8005 can operate another device, for example, control power on/off of the display device 8000 and adjust the amount of light from a lighting device 8100. The audio input device 8005 is capable of audio operation of a peripheral device and replaces a manual remote controller.

The audio input device 8005 includes at least one of a wheel and a mechanical transfer means and is configured to be capable of, while listening to an instruction precisely with the incorporated microphone by moving in the direction in which speaking by a user can be heard, displaying the content on a display portion 8008 or performing a touch input operation on the display portion 8008.

The audio input device 8005 can also function as a charging dock of a portable information terminal 8009 such as a smartphone. Electric power can be transmitted and received with a wire or wirelessly between the portable information terminal 8009 and the audio input device 8005. The portable information terminal 8009 does not particularly need to be carried indoors, and a load on the secondary battery and degradation thereof are desirably avoided while a necessary capacity is ensured. Thus, management, maintenance, and the like of the secondary battery are desirably performed by the audio input device 8005. Since the audio input device 8005 includes the speaker 8007 and the microphone, hands-free conversation is possible even while the portable information terminal 8009 is charged. When the capacity of the secondary battery of the audio input device 8005 decreases, the audio input device 8005 moves in the direction indicated by the arrow and is charged by wireless charging from a charging module 8010 connected to an external power source.

The audio input device 8005 may be put on a stand. The audio input device 8005 may be provided with at least one of a wheel and a mechanical transfer means to move to a desired position. Alternatively, a stand or a wheel is not provided and the audio input device 8005 may be fixed to a desired position, for example, on the floor or the like.

Note that the display device includes, in its category, all of information display devices for personal computers, advertisement displays, and the like besides TV broadcast reception.

In FIG. 21, the tabletop lighting device 8100 is an example of an electronic device that includes a secondary battery 8103 controlled by a microprocessor for controlling charging (including an APS). Specifically, the lighting device 8100 includes a housing 8101, a light source 8102, the secondary battery 8103, and the like. Although FIG. 21 illustrates the case where the secondary battery 8103 is provided in a ceiling 8104 on which the housing 8101 and the light source 8102 are installed, the secondary battery 8103 may be provided in the housing 8101. The lighting device 8100 can receive electric power from a commercial power supply. Alternatively, the lighting device 8100 can use electric power stored in the secondary battery 8103.

Note that although the installation lighting device 8100 provided on the ceiling 8104 is illustrated in FIG. 21 as an example, the secondary battery 8103 can be used in an installation lighting device provided in, for example, a sidewall 8105, a floor 8106, a window 8107, or the like other than the ceiling 8104. Alternatively, the secondary battery 8103 can be used in a tabletop lighting device or the like.

As the light source 8102, an artificial light source which emits light artificially by using electric power can be used. Specifically, an incandescent lamp, a discharge lamp such as a fluorescent lamp, and a light-emitting element such as an LED or an organic EL element are given as examples of the artificial light source.

In FIG. 21, an air conditioner including an indoor unit 8200 and an outdoor unit 8204 is an example of an electronic device that includes a secondary battery 8203. Specifically, the indoor unit 8200 includes a housing 8201, an air outlet 8202, the secondary battery 8203, and the like. Although FIG. 21 illustrates the case where the secondary battery 8203 is provided in the indoor unit 8200, the secondary battery 8203 may be provided in the outdoor unit 8204. Alternatively, the secondary batteries 8203 may be provided in both the indoor unit 8200 and the outdoor unit 8204. The air conditioner can receive electric power from a commercial power supply. Alternatively, the air conditioner can use electric power stored in the secondary battery 8203.

In FIG. 21, an electric refrigerator-freezer 8300 is an example of an electronic device that includes a secondary battery 8304. Specifically, the electric refrigerator-freezer 8300 includes a housing 8301, a door for a refrigerator compartment 8302, a door for a freezer compartment 8303, the secondary battery 8304, and the like. The secondary battery 8304 is provided in the housing 8301 in FIG. 21. The electric refrigerator-freezer 8300 can receive electric power from a commercial power supply. Alternatively, the electric refrigerator-freezer 8300 can use electric power stored in the secondary battery 8304.

In addition, in a time period when electronic devices are not used, particularly when the proportion of the amount of electric power which is actually used to the total amount of electric power which can be supplied from a commercial power source (such a proportion is referred to as a usage rate of electric power) is low, electric power can be stored in the secondary battery, whereby an increase in the usage rate of electric power can be reduced in a time period when the electronic devices are used. For example, in the case of the electric refrigerator-freezer 8300, electric power can be stored in the secondary battery 8304 in night time when the temperature is low and the door for the refrigerator compartment 8302 and the door for the freezer compartment 8303 are not opened and closed. On the other hand, in daytime when the temperature is high and the door for the refrigerator compartment 8302 and the door for the freezer compartment 8303 are opened and closed, the secondary battery 8304 is used as an auxiliary power source; thus, the usage rate of electric power in daytime can be reduced.

A secondary battery can be provided in a variety of electronic devices as well as the above-described electronic devices. According to one embodiment of the present invention, the secondary battery can have excellent cycle performance. Thus, when the microprocessor for controlling charging (including an APS) of one embodiment of the present invention is mounted on the electronic device described in this embodiment, the electronic device can have a longer lifetime. This embodiment can be implemented in appropriate combination with the other embodiments.

FIG. 22A to FIG. 22E show examples of electronic devices that include the power storage system of one embodiment of the present invention. Examples of electronic devices to which the power storage system of one embodiment of the present invention is applied are television sets (also referred to as televisions or television receivers), monitors of computers or the like, digital cameras, digital video cameras, digital photo frames, mobile phones (also referred to as cellular phones or mobile phone devices), portable game machines, portable information terminals, audio reproducing devices, large game machines such as pachinko machines, and the like.

Figure 22A:
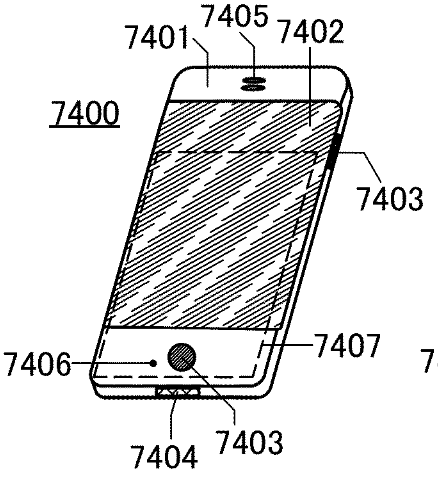
FIG. 22A is a diagram illustrating an electric device of one embodiment of the present invention.

FIG. 22A shows an example of a mobile phone. A mobile phone 7400 includes operation buttons 7403, an external connection port 7404, a speaker 7405, a microphone 7406, and the like in addition to a display portion 7402 incorporated in a housing 7401. The mobile phone 7400 includes the power storage system of one embodiment of the present invention. The power storage system of one embodiment of the present invention includes a storage battery 7407 and the control circuit described in the above embodiment.

Figure 22B:
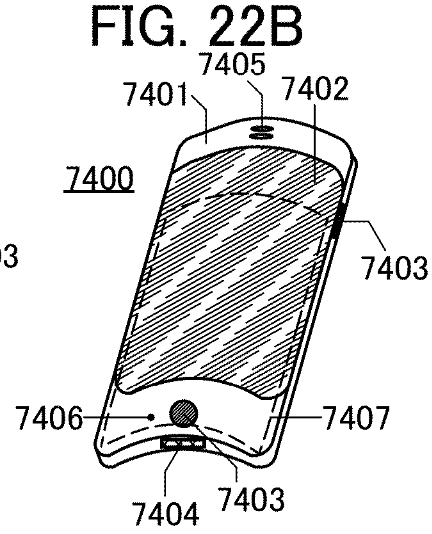
FIG. 22B is a diagram illustrating the electric device of one embodiment of the present invention.
Figure 22C:
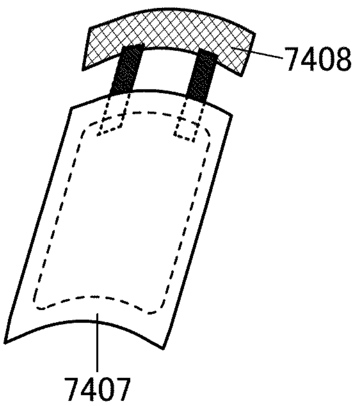
FIG. 22C is a diagram illustrating an electric device of one embodiment of the present invention.

FIG. 22B illustrates the state where the mobile phone 7400 is curved. When the mobile phone 7400 is entirely curved by external force, the storage battery 7407 provided therein may also be curved. In such a case, a storage battery having flexibility is preferably used as the storage battery 7407. FIG. 22C illustrates the state where the storage battery having flexibility is curved. A control circuit 7408 is electrically connected to the storage battery. The control circuit described in the above embodiment can be used as the control circuit 7408.

A storage battery having a flexible shape can also be incorporated along a curved inside/outside wall surface of a house or a building or a curved interior/exterior surface of an automobile.

Figure 22D:
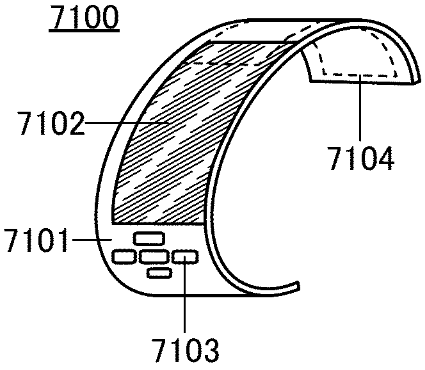
FIG. 22D is a diagram illustrating an electric device of one embodiment of the present invention.

FIG. 22D shows an example of a bangle-type display device. A portable display device 7100 includes a housing 7101, a display portion 7102, operation buttons 7103, and the power storage system of one embodiment of the present invention. The power storage system of one embodiment of the present invention includes a storage battery 7104 and the control circuit described in the above embodiment.

Figure 22E:
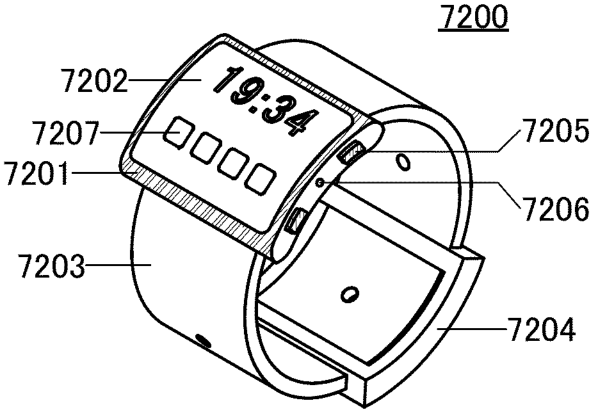
FIG. 22E is a diagram illustrating an electric device of one embodiment of the present invention.

FIG. 22E shows an example of a watch-type portable information terminal. A portable information terminal 7200 includes a housing 7201, a display portion 7202, a band 7203, a buckle 7204, an operation button 7205, an input/output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. The display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, execution and cancellation of a silent mode, and execution and cancellation of a power saving mode can be performed. For example, the functions of the operation button 7205 can also be set freely by the operating system incorporated in the portable information terminal 7200.

The portable information terminal 7200 can perform near field communication conformable to a communication standard. For example, mutual communication with a headset capable of wireless communication allows hands-free calling.

The portable information terminal 7200 includes the input/output terminal 7206, and data can be directly transmitted to and received from another information terminal via a connector. In addition, charging via the input/output terminal 7206 is also possible. The charging operation may be performed by wireless power feeding without using the input/output terminal 7206.

The portable information terminal 7200 includes the power storage system of one embodiment of the present invention. The power storage system includes a storage battery and the control circuit described in the above embodiment.

The portable information terminal 7200 preferably includes a sensor. As the sensor, for example, one or more of a human body sensor such as a fingerprint sensor, a pulse sensor, or a temperature sensor, a touch sensor, a pressure sensitive sensor, an acceleration sensor, and the like is preferably mounted.

This embodiment can be combined with the description of the other embodiments as appropriate.

Figure 23:
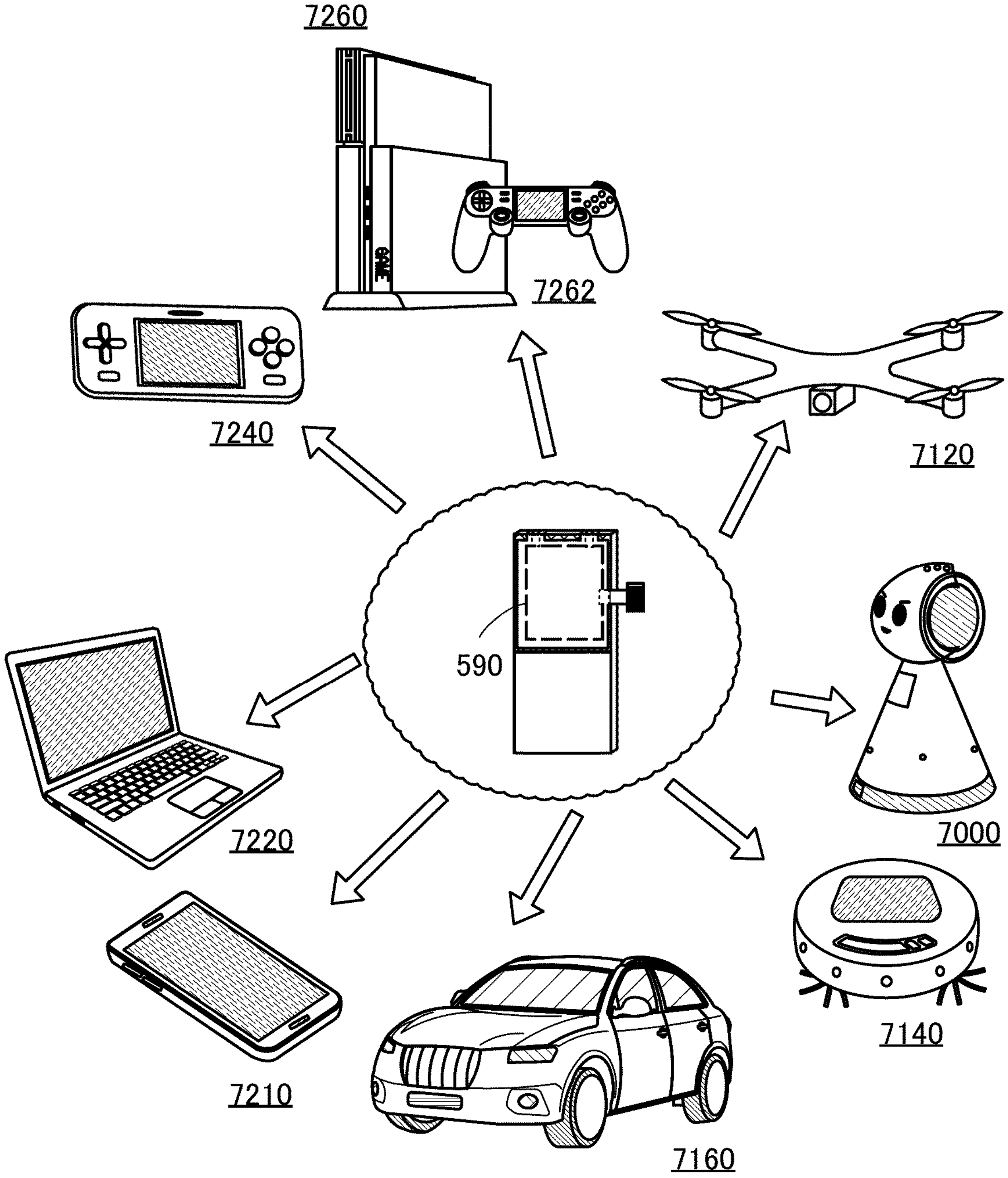
FIG. 23 shows an example of a system of one embodiment of the present invention.

Examples of electronic devices each including the control circuit of one embodiment of the present invention will be described with reference to FIG. 23.

A cleaning robot 7140 includes a secondary battery, a display provided on the top surface, a plurality of cameras provided on the side surface, a brush, an operation button, various kinds of sensors, and the like. Although not illustrated, the cleaning robot 7140 is provided with a tire, an inlet, and the like. The cleaning robot 7140 can run autonomously, detect dust, and vacuum the dust through the inlet provided on the bottom surface. The use of a semiconductor device provided with the control circuit of one embodiment of the present invention, which is electrically connected to the secondary battery of the cleaning robot 7140, allows a reduction in the number of components and detection of an abnormality, such as a micro-short circuit, of the secondary battery.

The cleaning robot 7140 includes a secondary battery, an illuminance sensor, a microphone, a camera, a speaker, a display, various kinds of sensors (e.g., an infrared ray sensor, an ultrasonic wave sensor, an acceleration sensor, a piezoelectric sensor, an optical sensor, and a gyro sensor), a moving mechanism, and the like. The semiconductor device provided with the control circuit of one embodiment of the present invention is used for the secondary battery of the cleaning robot 7140; thus, control, protection, and the like of the secondary battery are possible.

The microphone has a function of detecting acoustic signals of a speaking voice of a user, an environmental sound, and the like. The speaker has a function of outputting audio signals such as a voice and a warning beep. The cleaning robot 7140 can analyze an audio signal input via the microphone and can output a necessary audio signal from the speaker. The cleaning robot 7140 can communicate with the user with use of the microphone and the speaker.

The camera has a function of taking images of the surroundings of the cleaning robot 7140. The cleaning robot 7140 has a function of moving with use of the moving mechanism. The cleaning robot 7140 can take images of the surroundings with use of the camera and analyze the images to sense whether there is an obstacle in the way of the movement.

A robot 7000 includes a secondary battery, an illuminance sensor, a microphone, a camera, a speaker, a display portion, an obstacle sensor, a moving mechanism, an arithmetic unit, and the like.

The microphone has a function of detecting a speaking voice of a user, an environmental sound, and the like. The speaker has a function of outputting sound. The robot 7000 can communicate with the user using the microphone and the speaker.

The display portion has a function of displaying various kinds of information. The robot 7000 can display information desired by the user on the display portion. The display portion may be provided with a touch panel. Moreover, the display portion may be a detachable information terminal, in which case charging and data communication can be performed when the display portion is set at the home position of the robot 7000.

The camera has a function of taking images of the surroundings of the robot 7000. The obstacle sensor can detect the presence of an obstacle in the direction where the robot 7000 advances with the moving mechanism. The robot 7000 can move safely by recognizing the surroundings with the camera and the obstacle sensor.

The robot 7000 includes, in its internal region, the secondary battery of one embodiment of the present invention and a semiconductor device or an electronic component. A semiconductor device provided with the control circuit of one embodiment of the present invention is used for the secondary battery of the robot 7000; thus, control, protection, and the like of the secondary battery are possible.

A flying object 7120 includes propellers, a camera, a secondary battery, and the like and has a function of flying autonomously.

A semiconductor device provided with the control circuit of one embodiment of the present invention is used for the secondary battery of the flying object 7120; thus, control, protection, and the like of the secondary battery as well as a reduction in weight are possible.

An electric vehicle 7160 is shown as an example of a moving object. The electric vehicle 7160 includes a secondary battery, tires, a brake, a steering gear, a camera, and the like. The use of a semiconductor device provided with the control circuit of one embodiment of the present invention, which is electrically connected to the secondary battery of the electric vehicle 7160, allows a reduction in the number of components and detection of an abnormality, such as a micro-short circuit, of the secondary battery.

Note that although an electric vehicle is described above as an example of a moving object, the moving object is not limited to an electric vehicle. Examples of the moving object include a train, a monorail train, a ship, and a flying object (a helicopter, an unmanned aircraft (a drone), an airplane, and a rocket). The use of a semiconductor device provided with the control circuit of one embodiment of the present invention, which is electrically connected to secondary batteries of these moving objects, allows a reduction in the number of components and detection of an abnormality, such as a micro-short circuit, of the secondary batteries.

A battery pack provided with the control circuit of one embodiment of the present invention can be incorporated in a smartphone 7210, a PC 7220 (personal computer), a game machine 7240, and the like. The control circuit of one embodiment of the present invention may be attached to the battery pack.

The smartphone 7210 is an example of a portable information terminal. The smartphone 7210 includes a microphone, a camera, a speaker, various kinds of sensors, and a display portion. These peripheral devices are controlled with a semiconductor device provided with the control circuit. The use of the semiconductor device provided with the control circuit of one embodiment of the present invention, which is electrically connected to the secondary battery of the smartphone 7210, can reduce the number of components, control and protect the secondary battery, and increase the safety.

The PC 7220 is an example of a notebook PC. The use of a semiconductor device provided with the control circuit of one embodiment of the present invention, which is electrically connected to the secondary battery of the notebook PC, can reduce the number of components, control and protect the secondary battery, and increase the safety.

The game machine 7240 is an example of a portable game machine. A game machine 7260 is an example of a home-use stationary game machine. To the game machine 7260, a controller 7262 is connected with or without a wire. The use of a semiconductor device provided with the control circuit of one embodiment of the present invention in the controller 7262 can reduce the number of components, control and protect the secondary battery, and increase the safety.

This embodiment can be implemented in an appropriate combination with the structures described in the other embodiments and the like.

Embodiment 9

This embodiment describes examples where a power storage system that includes the control circuit of one embodiment of the present invention and a secondary battery is mounted on electronic devices or moving vehicles.

First, FIG. 25A to FIG. 25D show examples where a power storage system that includes the control circuit described in the above embodiment and a secondary battery is mounted on electronic devices. Examples of the electronic device to which the power storage system is applied include television sets (also referred to as televisions or television receivers), monitors of computers or the like, digital cameras, digital video cameras, digital photo frames, mobile phones (also referred to as cellular phones or mobile phone devices), portable game machines, portable information terminals, audio reproducing devices, and large game machines such as pachinko machines.

A secondary battery can be used in moving vehicles, typically automobiles. Examples of the automobiles include next-generation clean energy vehicles such as hybrid vehicles (HVs), electric vehicles (EVs), and plug-in hybrid vehicles (PHVs), and the secondary battery can be used as one of the power sources provided in the automobiles. The moving vehicle is not limited to an automobile. Examples of moving vehicles include a train, a monorail train, a ship, a flying object (a helicopter, an unmanned aircraft (a drone), an airplane, and a rocket), an electric bicycle, and an electric motorcycle, and to these moving vehicles, the power storage system that includes the control circuit one embodiment of the present invention and the secondary battery can be applied.

The power storage system that includes the control circuit one embodiment of the present invention and the secondary battery may be used in a ground-based charging apparatus provided in a house or a charging station provided in a commerce facility.

Figure 25A:
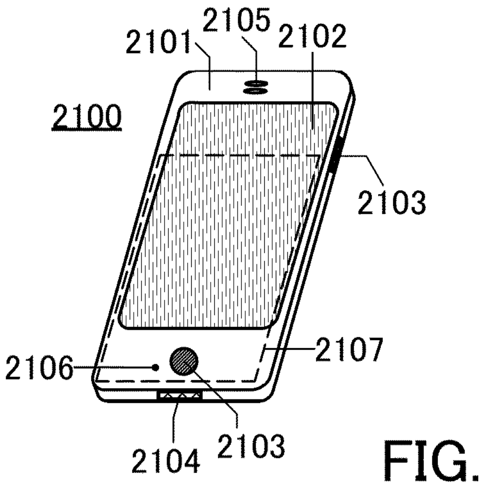
FIG. 25A to FIG. 25E are perspective views showing electric devices.

FIG. 25A illustrates an example of a mobile phone. A mobile phone 2100 includes a housing 2101 in which a display portion 2102 is incorporated, an operation button 2103, an external connection port 2104, a speaker 2105, a microphone 2106, and the like. Note that the mobile phone 2100 includes a power storage system 2107.

The mobile phone 2100 is capable of executing a variety of applications such as mobile phone calls, e-mailing, viewing and editing texts, music reproduction, Internet communication, and computer games.

With the operation button 2103, a variety of functions such as time setting, power on/off operation, wireless communication on/off operation, execution and cancellation of a silent mode, and execution and cancellation of a power saving mode can be performed. For example, the functions of the operation button 2103 can also be set freely by an operating system incorporated in the mobile phone 2100.

In addition, the mobile phone 2100 can execute near field communication conformable to a communication standard. For example, mutual communication with a headset capable of wireless communication allows hands-free calling.

Moreover, the mobile phone 2100 includes the external connection port 2104, and data can be directly transmitted to and received from another information terminal via a connector. In addition, charging can be performed via the external connection port 2104. Note that the charging operation may be performed by wireless power feeding without using the external connection port 2104.

The mobile phone 2100 preferably includes a sensor. As the sensor, for example, at least one of a human body sensor such as a fingerprint sensor, a pulse sensor, or a temperature sensor, a touch sensor, a pressure sensitive sensor, an acceleration sensor, and the like is preferably mounted.

Figure 25B:
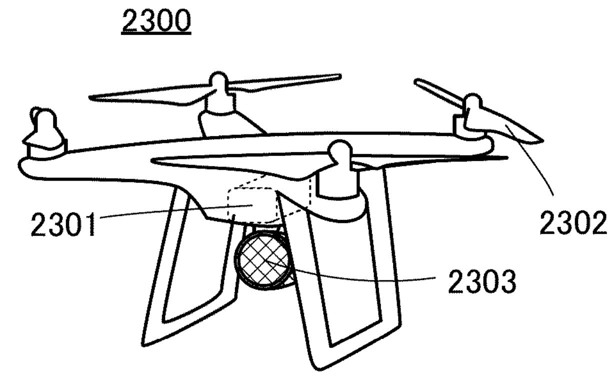

FIG. 25B illustrates an unmanned aircraft 2300 that includes a plurality of rotors 2302. The unmanned aircraft 2300 is also referred to as a drone. The unmanned aircraft 2300 includes a power storage system 2301 of one embodiment of the present invention, a camera 2303, and an antenna (not illustrated). The unmanned aircraft 2300 can be remotely controlled through the antenna. The power storage system of one embodiment of the present invention is preferable as a secondary battery mounted on the unmanned aircraft 2300 because it has a high level of safety and thus can be used safely for a long time over a long period.

Figure 25C:
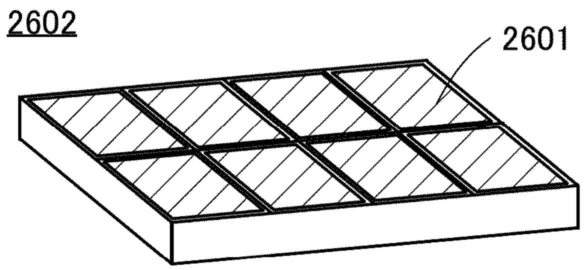

Furthermore, as illustrated in FIG. 25C, a power storage system 2602 of one embodiment of the present invention may be mounted on a hybrid electric vehicle (HV), an electric vehicle (EV), a plug-in hybrid electric vehicle (PHV), or another electronic device. The power storage system 2602 includes a plurality of the secondary batteries 2601.

Figure 25D:
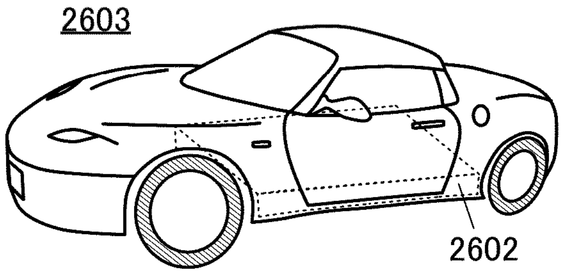

FIG. 25D illustrates an example of a vehicle that includes the power storage system 2602. A vehicle 2603 is an electric vehicle that runs using an electric motor as a power source. Alternatively, the vehicle 2603 is a hybrid electric vehicle that can run using a power source appropriately selected from an electric motor and an engine. The vehicle 2603 using the electric motor includes a plurality of ECUs (Electronic Control Units) and performs engine control or the like by the ECUs. The ECU includes a microcomputer. The ECU is connected to a CAN (Controller Area Network) provided in the electric vehicle. The CAN is a type of a serial communication standard used as an in-vehicle LAN. When the power storage system of one embodiment of the present invention functions as a power source of the ECU, a vehicle with a high level of safety and a high mileage can be obtained.

The power storage system not only drives the electric motor (not illustrated) but also can supply electric power to one or more light-emitting devices such as a headlight and a room light. Furthermore, the power storage system can supply electric power to a display device and a semiconductor device included in the vehicle 2603, such as a speedometer, a tachometer, and a navigation system.

In the vehicle 2603, the secondary batteries 2601 included in the power storage system 2602 can be charged by being supplied with electric power from external charging equipment by a plug-in system, a contactless power feeding system, or the like.

Figure 25E:
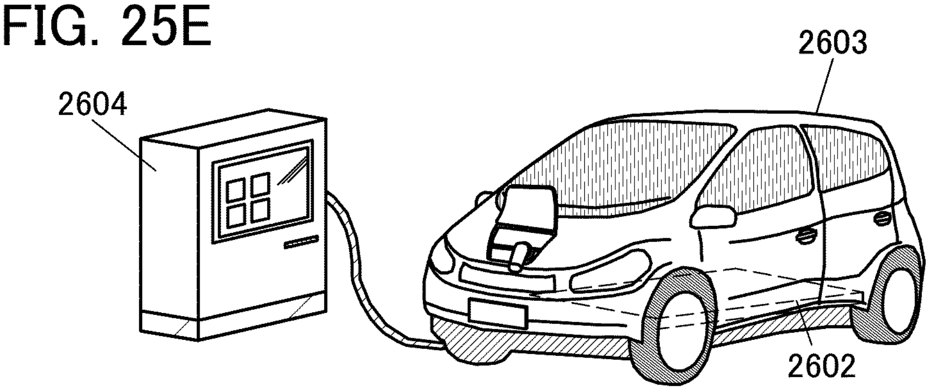

FIG. 25E illustrates a state in which the vehicle 2603 is charged from ground-based charging equipment 2604 through a cable. In charging, a given method such as CHAdeMO (registered trademark) or Combined Charging System may be employed as a charging method, the standard of a connector, or the like as appropriate. For example, with a plug-in technique, the power storage system 2602 mounted on the vehicle 2603 can be charged by being supplied with electric power from the outside. Charging can be performed by converting AC power into DC power through a converter such as an ACDC converter. The charging equipment 2604 may be provided in a house as illustrated in FIG. 25E, or may be a charging station provided in a commercial facility.

Although not illustrated, the vehicle can include a power receiving device so as to be charged by being supplied with electric power from an above-ground power transmitting device in a contactless manner. In the case of the contactless power feeding system, by fitting a power transmitting device in a road or an exterior wall, charging can be performed not only when the vehicle is stopped but also when driven. In addition, this contactless power feeding system may be utilized to transmit and receive electric power between vehicles. Furthermore, a solar cell may be provided in the exterior of the vehicle to charge the secondary battery when the vehicle stops or moves. To supply electric power in such a contactless manner, an electromagnetic induction method or a magnetic resonance method can be used.

Next, examples of the power storage system of one embodiment of the present invention are described with reference to FIG. 26A and FIG. 26B.

Figure 26A:
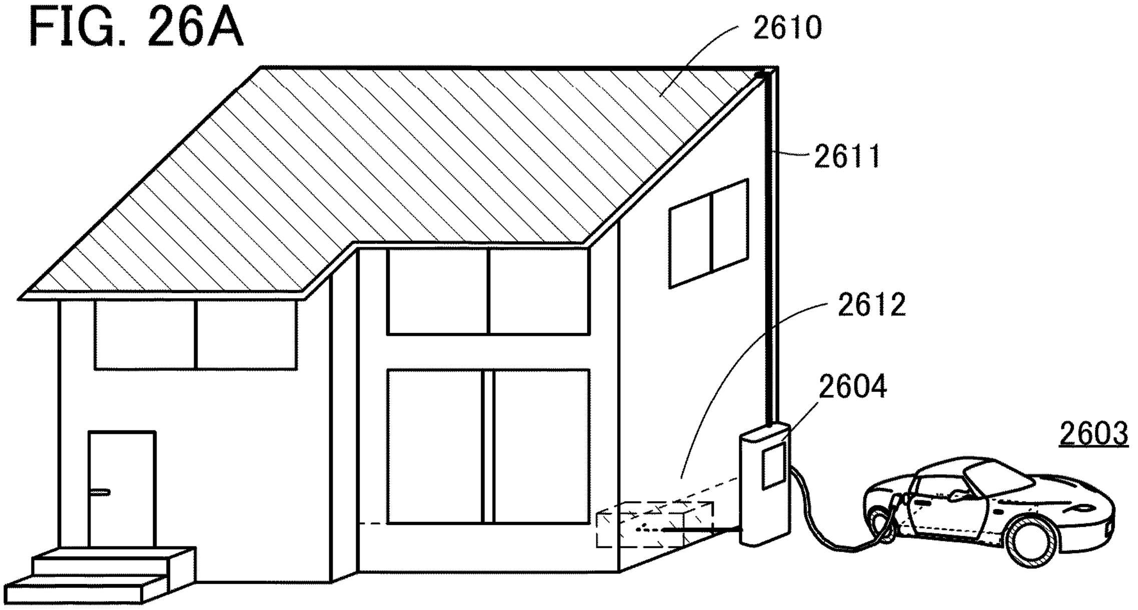
FIG. 26A and FIG. 26B are diagrams illustrating a power storage system of one embodiment of the present invention.

A house illustrated in FIG. 26A includes a solar panel 2610 and a power storage system 2612 that includes the control circuit of one embodiment of the present invention and a secondary battery. The power storage system 2612 is electrically connected to the solar panel 2610 through a wiring 2611 or the like. The power storage system 2612 may be electrically connected to the ground-based charging equipment 2604. The power storage system 2612 can be charged with electric power generated by the solar panel 2610. The power storage system 2602 included in the vehicle 2603 can be charged with the electric power stored in the power storage system 2612 through the charging equipment 2604. The power storage system 2612 is preferably provided in an underfloor space. When the power storage system 2612 is provided in the underfloor space, the space on the floor can be effectively used. Alternatively, the power storage system 2612 may be provided on the floor.

The electric power stored in the power storage system 2612 can also be supplied to other electronic devices in the house. Thus, with the use of the power storage system 2612 of one embodiment of the present invention as an uninterruptible power source, electronic devices can be used even when electric power cannot be supplied from a commercial power source due to power failure or the like.

Figure 26B:
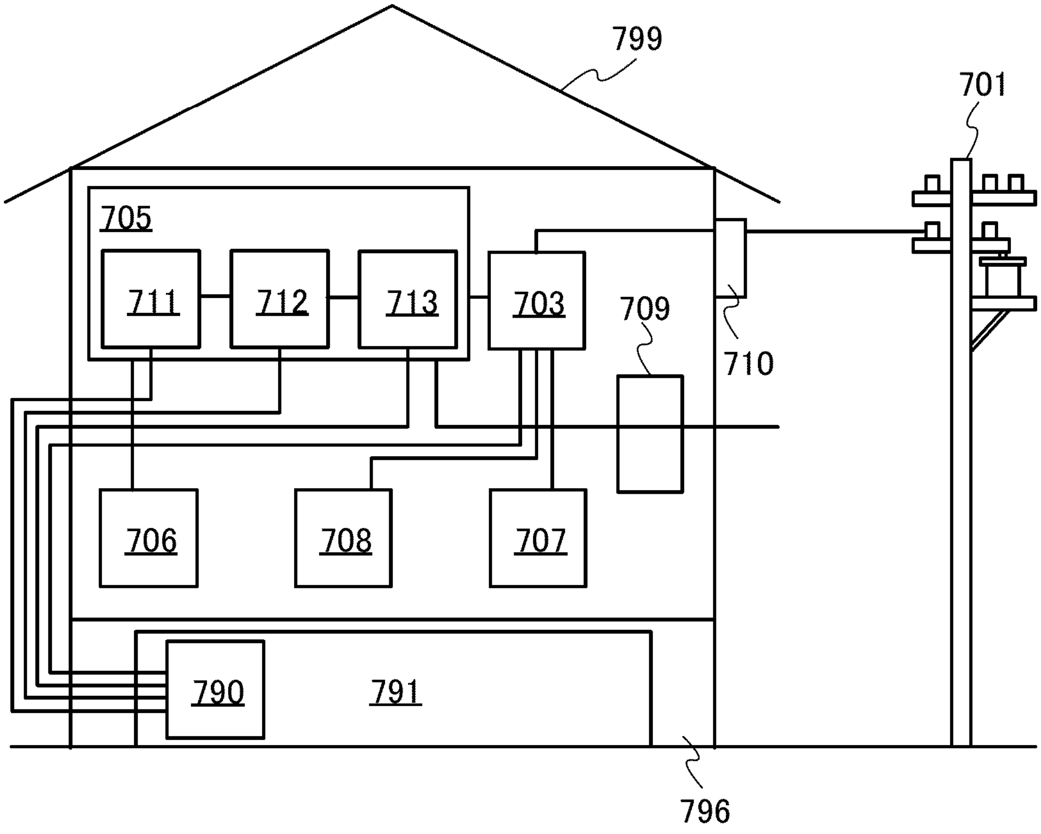

FIG. 26B illustrates an example of the power storage system of one embodiment of the present invention. As illustrated in FIG. 26B, a power storage system 791 of one embodiment of the present invention is provided in an underfloor space 796 of a building 799.

The power storage system 791 is provided with a control device 790, and the control device 790 is electrically connected to a distribution board 703, a power storage controller (also referred to as control device) 705, an indicator 706, and a router 709 through wirings.

Electric power is transmitted from a commercial power source 701 to the distribution board 703 through a service wire mounting portion 710. Moreover, electric power is transmitted to the distribution board 703 from the power storage system 791 and the commercial power source 701, and the distribution board 703 supplies the transmitted electric power to a general load 707 and a power storage load 708 through outlets (not illustrated).

The general load 707 is, for example, an electric device such as a TV or a personal computer. The power storage load 708 is, for example, an electric device such as a microwave, a refrigerator, or an air conditioner.

The power storage controller 705 includes a measuring portion 711, a predicting portion 712, and a planning portion 713. The measuring portion 711 has a function of measuring the amount of electric power consumed by the general load 707 and the power storage load 708 during a day (e.g., from midnight to midnight). The measuring portion 711 may have a function of measuring the amount of electric power of the power storage system 791 and the amount of electric power supplied from the commercial power source 701. The predicting portion 712 has a function of predicting, on the basis of the amount of electric power consumed by the general load 707 and the power storage load 708 during a given day, the demand for electric power consumed by the general load 707 and the power storage load 708 during the next day. The planning portion 713 has a function of making a charging and discharging plan of the power storage system 791 on the basis of the demand for electric power predicted by the predicting portion 712.

The amount of electric power consumed by the general load 707 and the power storage load 708 and measured by the measuring portion 711 can be checked with the indicator 706. It can be checked with an electric device such as a TV or a personal computer through the router 709. Furthermore, it can be checked with a portable electronic terminal such as a smartphone or a tablet through the router 709. With the indicator 706, the electric device, or the portable electronic terminal, for example, the demand for electric power depending on a time period (or per hour) that is predicted by the predicting portion 712 can be checked.

This embodiment can be used in appropriate combination with any of the other embodiments.

(Notes on Description of this Specification and the Like)

The description of the above embodiments and each structure in the embodiments are noted below.

The structure described in each embodiment can be combined with any of the structures described in the other embodiments as appropriate to constitute one embodiment of the present invention. In addition, in the case where a plurality of structure examples are described in one embodiment, the structure examples can be combined as appropriate.

Note that content (or part of the content) described in one embodiment can be applied to, combined with, or replaced with another content (or part of the content) described in the embodiment and/or content (or part of the content) described in another embodiment or other embodiments.

Note that in each embodiment, content described in the embodiment is content described using a variety of diagrams or content described with text disclosed in the specification.

Note that by combining a diagram (or part thereof) described in one embodiment with another part of the diagram, a different diagram (or part thereof) described in the embodiment, and/or a diagram (or part thereof) described in another embodiment or other embodiments, much more diagrams can be formed.

In this specification and the like, components are classified on the basis of the functions and shown as independent blocks in block diagrams. However, in an actual circuit or the like, it is difficult to separate components on the basis of the functions, and there are such a case where one circuit is associated with a plurality of functions and a case where a plurality of circuits are associated with one function. Therefore, blocks in the block diagrams are not limited by the components described in the specification, and the description can be changed appropriately depending on the situation.

In the drawings, the size, the layer thickness, or the region is shown with given magnitude for description convenience. Therefore, the size, the layer thickness, or the region is not necessarily limited to the illustrated scale. Note that the drawings are schematically shown for clarity, and embodiments of the present invention are not limited to shapes, values or the like shown in the drawings. For example, variation in signal, voltage, or current due to noise, variation in signal, voltage, or current due to difference in timing, or the like can be included.

In this specification and the like, expressions "one of a source and a drain" (or a first electrode or a first terminal) and "the other of the source and the drain" (or a second electrode or a second terminal) for the other of the source and the drain are used in the description of the connection relation of a transistor. This is because the source and the drain of the transistor change depending on the structure, operating conditions, or the like of the transistor. Note that the source or the drain of the transistor can also be referred to as a source (drain) terminal, a source (drain) electrode, or the like as appropriate depending on the situation.

In this specification and the like, the terms "electrode" and "wiring" do not functionally limit these components. For example, an "electrode" is used as part of a "wiring" in some cases, and vice versa. Furthermore, the term "electrode" or "wiring" also includes the case where a plurality of "electrodes" or "wirings" are formed in an integrated manner, for example.

In this specification and the like, "voltage" and "potential" can be interchanged with each other as appropriate. The voltage refers to a potential difference from a reference potential, and when the reference potential is a ground voltage, for example, the voltage can be rephrased into the potential. The ground potential does not necessarily mean 0 V. Note that potentials are relative values, and a potential applied to a wiring or the like is sometimes changed depending on the reference potential.

Note that in this specification and the like, the terms such as “film” and “layer” can be interchanged with each other depending on the case or according to circumstances. For example, the term “conductive layer” can be changed into the term “conductive film” in some cases. As another example, the term “insulating film” can be changed into the term “insulating layer” in some cases.

In this specification and the like, a switch has a function of controlling whether a current flows or not by being in a conducting state (an on state) or a non-conducting (an off state). Alternatively, a switch has a function of changing a current path.

In this specification and the like, channel length refers to, for example, the distance between a source and a drain in a region where a semiconductor (or a portion where a current flows in a semiconductor when a transistor is in an on state) and a gate overlap with each other or a region where a channel is formed in a top view of the transistor.

In this specification and the like, channel width refers to, for example, the length of a portion where a source and a drain face each other in a region where a semiconductor (or a portion where a current flows in a semiconductor when a transistor is in an on state) and a gate electrode overlap with each other or a region where a channel is formed.

In this specification and the like, the expression “A and B are connected” includes the case where A and B are electrically connected as well as the case where A and B are directly connected. Here, the expression “A and B are electrically connected” means the case where electrical signals can be transmitted and received between A and B when an object having any electric action exists between A and B.

REFERENCE NUMERALS

10: capacitor, 11: transistor, 51: curve, 52: curve, 99: switch, 99_1: switch, 99_2: switch, 99_3: switch, 110: conductor, 111: assembled battery, 113_1: comparator, 113_2: comparator, 113_3: comparator, 113_4: comparator, 113_5: comparator, **120*a*: lower electrode, 120*b*: upper electrode, 121: control portion, 122: voltage generation portion, 127: detection portion, 128: detection portion, 130: insulator, 131: switch, 140: charger, 141: switch, 150A: power transistor, 150B: power transistor, 152*a*: insulator, 152*b*: insulator, 155: insulator, 190: power storage system, 191: control circuit, 192: secondary battery, 193: load, 210: insulator, 286: insulator, 287: insulator, 311: substrate, 313: semiconductor region, 314*a*: low-resistance region, 314*b*: low-resistance region, 315: insulator, 316: conductor, 320: insulator, 322: insulator, 324: insulator, 326: insulator, 328: conductor, 330: conductor, 350: insulator, 352: insulator, 354: insulator, 356: conductor, 357: conductor, 400: secondary battery, 401: positive electrode cap, 413: conductive plate, 414: conductive plate, 415: power storage system, 416: wiring, 420: control circuit, 421: wiring, 422: wiring, 423: wiring, 424: conductor, 425: insulator, 426: wiring, 501: circuit board, 509: label, 511: terminal, 513: secondary battery, 515: sealant, 517: antenna, 519: layer, 531: secondary battery pack, 551: one of positive electrode lead and negative electrode lead, 552: the other of positive electrode lead and negative electrode lead, 590: control circuit, 590*a*: circuit system, 590*b*: circuit system, 601: positive electrode cap, 602: battery can, 603: positive electrode terminal, 604: positive electrode, 605: separator, 606: negative electrode, 607: negative electrode terminal, 608: insulating plate, 609: insulating plate, 611: PTC element, 613: safety valve mechanism, 701: commercial power source, 703: distribution board, 705: power storage controller, 706: indicator, 707: general load, 708: power storage load, 709: router, 710: service wire mounting portion, 711: measuring portion, 712: predicting portion, 713: planning portion, 790: control device, 791: power storage system, 796: underfloor space, 799: building, 911*a*: terminal, 911*b*: terminal, 913: secondary battery, 930: housing, 931: negative electrode, 931*a*: negative electrode active material layer, 932: positive electrode, 932*a*: positive electrode active material layer, 933: separator, 950*a*: wound body, 951: terminal, 952: terminal, 1201: chip, 1202: bump, 1203: printed circuit board, 1213: analog arithmetic portion, 1221: DRAM, 1222: FeRAM, 1223: integrated circuit, 1225: chip, 2100: mobile phone, 2101: housing, 2102: display portion, 2103: operation button, 2104: external connection port, 2105: speaker, 2106: microphone, 2107: power storage system, 2300: unmanned aircraft, 2301: power storage system, 2302: rotor, 2303: camera, 2601: secondary battery, 2602: power storage system, 2603: vehicle, 2604: charging equipment, 2610: solar panel, 2611: wiring, 2612: power storage system, 7000: robot, 7100: portable display device, 7101: housing, 7102: display portion, 7103: operation button, 7104: storage battery, 7120: flying object, 7140: cleaning robot, 7160: electric vehicle, 7200: portable information terminal, 7201: housing, 7202: display portion, 7203: band, 7204: buckle, 7205: operation button, 7206: input/output terminal, 7207: icon, 7210: smartphone, 7220: PC, 7240: game machine, 7260: game machine, 7262: controller, 7400: mobile phone, 7401: housing, 7402: display portion, 7403: operation button, 7404: external connection port, 7405: speaker, 7406: microphone, 7407: storage battery, 7408: control circuit, 8000: display device, 8001: housing, 8002: display portion, 8003: speaker portion, 8004: secondary battery, 8005: audio input device, 8007: speaker, 8008: display portion, 8009: portable information terminal, 8010: charging module, 8021: charging apparatus, 8022: cable, 8024: power storage system, 8100: lighting device, 8101: housing, 8102: light source, 8103: secondary battery, 8104: ceiling, 8105: sidewall, 8106: floor, 8107: window, 8200: indoor unit, 8201: housing, 8202: air outlet, 8203: secondary battery, 8204: outdoor unit, 8300: electric refrigerator-freezer, 8301: housing, 8302: door for refrigerator compartment, 8303: door for freezer compartment, 8304: secondary battery, 8400: automobile, 8401: headlight, 8406: electric motor, 8500: automobile, 8600: motor scooter, 8601: side mirror, 8602: power storage system, 8603: indicator light, 8604: storage unit under seat, 8700: electric bicycle, 8701: storage battery, 8702: power storage system, 8703: display portion, 8704: control circuit, 9600: tablet terminal, 9601: notebook personal computer, 9625: switch, 9626: switch, 9627: power switch, 9628: operation switch, 9629: fastener, 9630: housing, 9630*a*: housing, 9630*b*: housing, 9631: display portion, 9633**:

solar cell, 9634: control circuit, 9635: power storage unit, 9640: movable portion, 9650: keyboard portion This application is based on Japanese Patent Application Serial No. 2020-158043 filed on Sep. 22, 2020 and Japanese Patent Application Serial No. 2020-161089 filed on Sep. 25, 2020, the entire contents of both are hereby incorporated herein by reference.

The invention claimed is:

1. A control circuit comprising a first resistance circuit, a second resistance circuit, a third resistance circuit, a first comparator, a second comparator, and a memory circuit, wherein the first comparator comprises a first input terminal, a second input terminal, and a first output terminal outputting a comparison result of the first input terminal and the second input terminal, wherein one terminal of the first resistance circuit is electrically connected to a positive electrode of a secondary battery, wherein the other terminal of the first resistance circuit is electrically connected to the first input terminal and one terminal of the second resistance circuit, wherein the second comparator comprises a third input terminal, a fourth input terminal, and a second output terminal outputting a comparison result of the third input terminal and the fourth input terminal, wherein the other terminal of the second resistance circuit is electrically connected to the third input terminal and one terminal of the third resistance circuit, wherein the other terminal of the third resistance circuit is electrically connected to a negative electrode of the secondary battery, wherein the memory circuit is configured to retain first data, wherein the control circuit is configured to generate a first signal and a second signal by using the first data, to adjust resistance of the first resistance circuit by supplying the first signal to the first resistance circuit, to adjust resistance of the second resistance circuit by supplying the second signal to the second resistance circuit, and to stop one of charging and discharging of the secondary battery in accordance with output from the first output terminal, wherein the control circuit is configured to generate a third signal by using the first data, to adjust resistance of the third resistance circuit by supplying the third signal to the third resistance circuit, and to stop the other of the charging and the discharging of the secondary battery in accordance with output from the second output terminal, and wherein the memory circuit comprises a capacitor comprising a ferroelectric layer.

2. The control circuit according to claim 1, wherein the first resistance circuit comprises a plurality of pairs of one resistor and one switch, wherein the one switch of the pair of the one resistor and the one switch is configured to change a current flowing in the one resistor, and wherein the control circuit is configured to control, by using the first signal, operation of the switch of each of the plurality of pairs.

3. The control circuit according to claim 1, wherein the second input terminal is supplied with a signal corresponding to an upper limit of a charging voltage or a signal corresponding to a lower limit of a discharging voltage.

4. The control circuit according to claim 1, wherein one of a signal corresponding to an upper limit of a charging voltage and a signal corresponding to a lower limit of a discharging voltage is supplied to the second input terminal and the other is supplied to the fourth input terminal.

5. An electronic device comprising:

the control circuit according to claim 1; and a secondary battery.

6. A control circuit comprising:

a first terminal electrically connected to a positive electrode of a secondary battery;

a second terminal electrically connected to a negative electrode of the secondary battery;

a third terminal electrically connected to a gate of a power transistor controlling electrical connection between the secondary battery and a charger or a load;

a detection portion electrically connected to the first terminal and the second terminal;

a control portion electrically connected to the detection portion; and a memory circuit electrically connected to the control portion, wherein the memory circuit comprises a memory cell comprising a ferroelectric layer between a pair of electrodes, a transistor electrically connected to the memory cell, and a decoder to which a signal from the memory cell is output, wherein the detection portion comprises a first resistance circuit, a second resistance circuit, a third resistance circuit, a first comparator, and a second comparator, wherein the first comparator is electrically connected to the first resistance circuit and the second resistance circuit, wherein the second comparator is electrically connected to the second resistance circuit and the third resistance circuit, wherein the detection portion is configured to adjust resistance of the first resistance circuit, resistance of the second resistance circuit, and resistance of the third resistance circuit in accordance with data stored in the memory circuit, and wherein the control portion is configured to determine that the secondary battery is overdischarged in accordance with a result of comparing a reference potential input from the detection portion and a potential of the first terminal or a potential of the second terminal, and to output a signal with which the power transistor is brought into an off state to the third terminal when the secondary battery is determined to be overdischarged.

7. The control circuit according to claim 6, wherein the data is written to the memory circuit by supply of a signal from outside of the control circuit, and the control circuit comprises a fourth terminal to which the signal from the outside is input.

8. The control circuit according to claim 6, wherein a ferroelectric material of the ferroelectric layer of the memory circuit comprises an oxide comprising hafnium and zirconium.

9. The control circuit according to claim 6, wherein a ferroelectric material of the ferroelectric layer has an orthorhombic crystal structure.

10. The control circuit according to claim 6, wherein the pair of electrodes of the memory circuit comprise titanium nitride.

11. The control circuit according to claim 6, wherein the transistor is a Si transistor.

12. An electronic device comprising:
the control circuit according to claim 6; and
a secondary battery.

13. A control circuit comprising:
a first terminal electrically connected to a positive electrode of a secondary battery;
a second terminal electrically connected to a negative electrode of the secondary battery;
a third terminal electrically connected to a gate of a power transistor controlling electrical connection between the secondary battery and a charger or a load;
a detection portion electrically connected to the first terminal and the second terminal;
a control portion electrically connected to the detection portion; and
a memory circuit electrically connected to the control portion,
wherein the memory circuit comprises a memory cell comprising a ferroelectric layer between a pair of electrodes, a transistor electrically connected to the memory cell, and a decoder to which a signal from the memory cell is output,
wherein the detection portion comprises a first resistance circuit, a second resistance circuit, a third resistance circuit, a first comparator, and a second comparator,
wherein the first comparator is electrically connected to the first resistance circuit and the second resistance circuit,
wherein the second comparator is electrically connected to the second resistance circuit and the third resistance circuit,
wherein the detection portion is configured to adjust resistance of the first resistance circuit, resistance of the second resistance circuit, and resistance of the third resistance circuit in accordance with data stored in the memory circuit, and
wherein the control portion is configured to determine that the secondary battery is overcharged in accordance with a result of comparing a reference potential input from the detection portion and a potential of the first terminal or a potential of the second terminal, and to output a signal with which the power transistor is brought into an off state to the third terminal when the secondary battery is determined to be overcharged.

14. The control circuit according to claim 13,
wherein the data is written to the memory circuit by supply of a signal from outside of the control circuit, and the control circuit comprises a fourth terminal to which the signal from the outside is input.

15. The control circuit according to claim 13,
wherein a ferroelectric material of the ferroelectric layer of the memory circuit comprises an oxide comprising hafnium and zirconium.

16. The control circuit according to claim 13,
wherein a ferroelectric material of the ferroelectric layer has an orthorhombic crystal structure.

17. The control circuit according to claim 13,
wherein the pair of electrodes of the memory circuit comprise titanium nitride.

18. The control circuit according to claim 13,
wherein the transistor is a Si transistor.

19. An electronic device comprising:
the control circuit according to claim 13; and
a secondary battery.

* * * * *